(12) United States Patent
Nakamura

(10) Patent No.: US 7,405,890 B2
(45) Date of Patent: Jul. 29, 2008

(54) IMAGING LENS

(75) Inventor: Akira Nakamura, Kawaguchi (JP)

(73) Assignee: Enplas Corporation, Saitama (JP)

(*) Notice: Subject to any disclaimer, the term of this patent is extended or adjusted under 35 U.S.C. 154(b) by 0 days.

(21) Appl. No.: 11/656,829

(22) Filed: Jan. 23, 2007

(65) Prior Publication Data
US 2007/0183062 A1 Aug. 9, 2007

(30) Foreign Application Priority Data
Feb. 3, 2006 (JP) .............................. 2006-027058

(51) Int. Cl.
G02B 9/34 (2006.01)
G02B 13/04 (2006.01)

(52) U.S. Cl. ......................... 359/781; 359/753; 359/771
(58) Field of Classification Search ................. 359/749, 359/753, 754, 771, 781
See application file for complete search history.

(56) References Cited

U.S. PATENT DOCUMENTS

2006/0187557 A1* 8/2006 Yamakawa ................... 359/771
2006/0227434 A1* 10/2006 Hirose et al. ................. 359/749

FOREIGN PATENT DOCUMENTS

| JP | 04-238312 | 8/1992 |
| JP | 09-015492 | 1/1997 |
| JP | 2002-244031 | 8/2002 |
| JP | 2003-232998 | 8/2003 |
| JP | 2005-227426 | 8/2005 |

* cited by examiner

Primary Examiner—David N. Spector
(74) Attorney, Agent, or Firm—William L. Androlia; H. Henry Koda

(57) ABSTRACT

It is to provide a super-wide-angle imaging lens that can be reduced in size and weight, maintain excellent optical performance, and is low in cost. The imaging lens comprises, in order from an object side towards an image surface side, a first lens which is a meniscus lens having a negative power whose convex surface faces the object side, a second lens having a negative power whose concave surface faces the image surface side, a third lens having a positive power whose convex surface faces the object side, a diaphragm, and a fourth lens having a positive power whose convex surface faces the image surface side, wherein conditions expressed by each of following expressions (1) to (4) are to be satisfied: $0 \leq d_2/fl \leq 2.0$, $0 \leq d_4/fl \leq 2.0$, $-4.5 \leq f_2/fl \leq -1.5$, and $-4.5 \leq (r_5-r_6)/(r_5+r_6) \leq -0.2$ (where, fl: focal distance of the entire lens system, $f_2$: focal distance of the second lens, $d_2$: space between the first lens and the second lens on the optical axis, and $d_4$: space between the second lens and the third lens on the optical axis.).

4 Claims, 47 Drawing Sheets

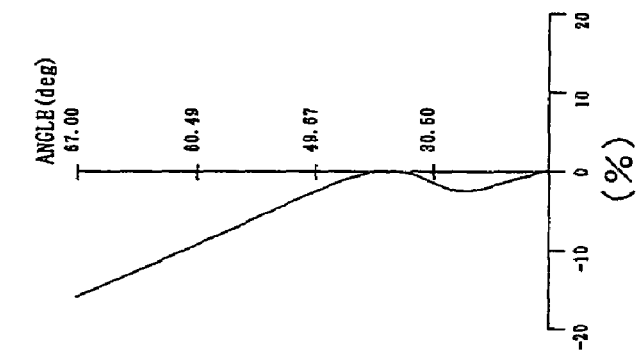
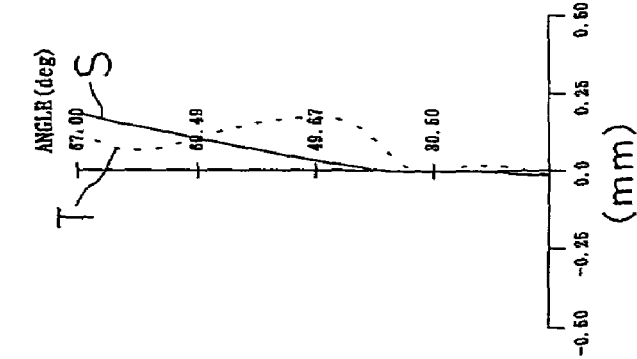
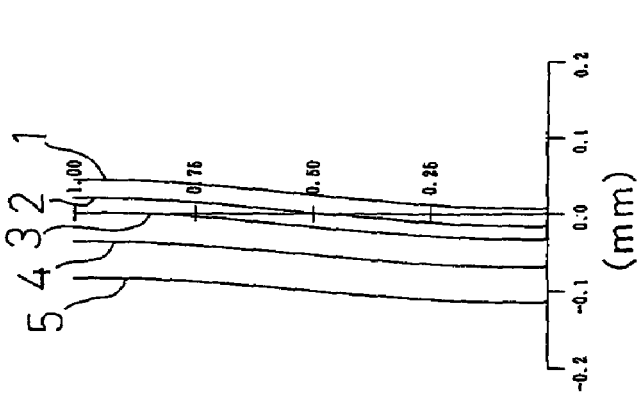
FIG. 5

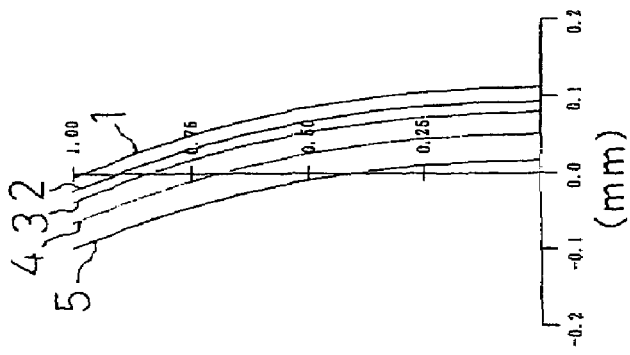
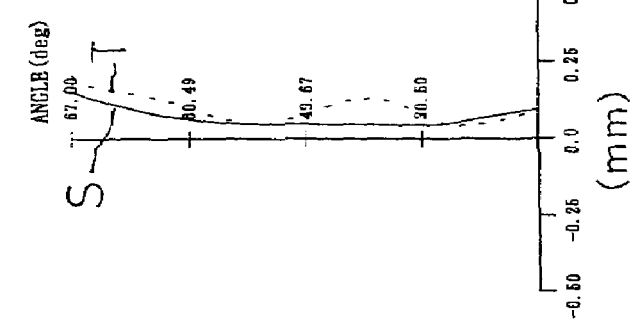
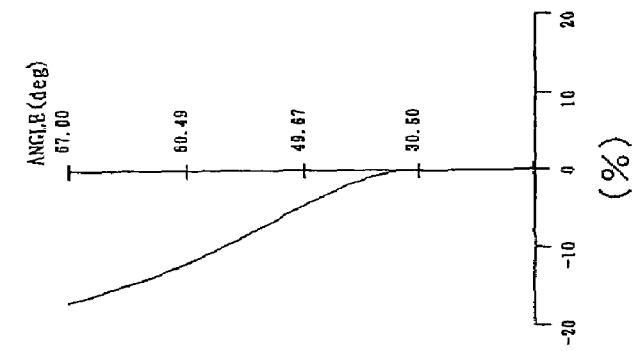
FIG. 27

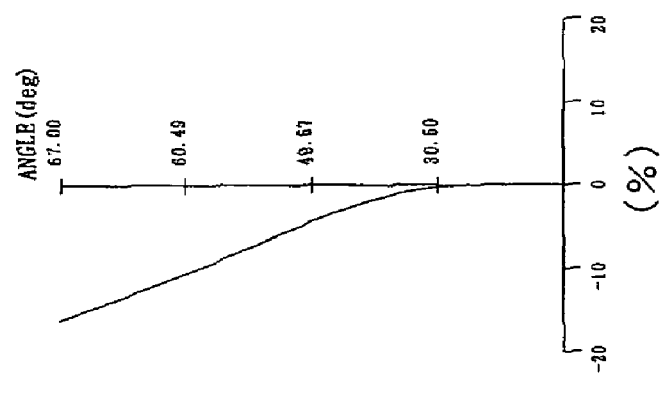
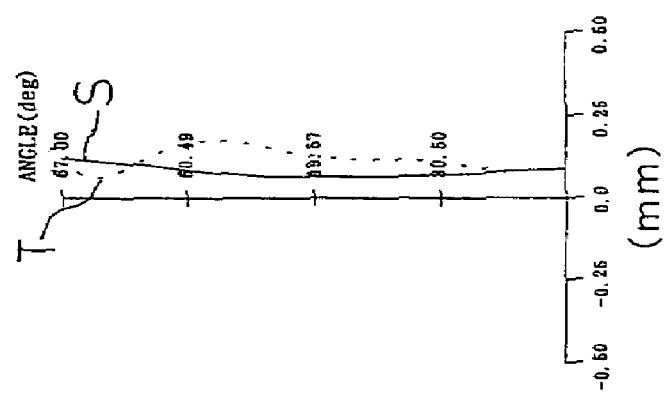
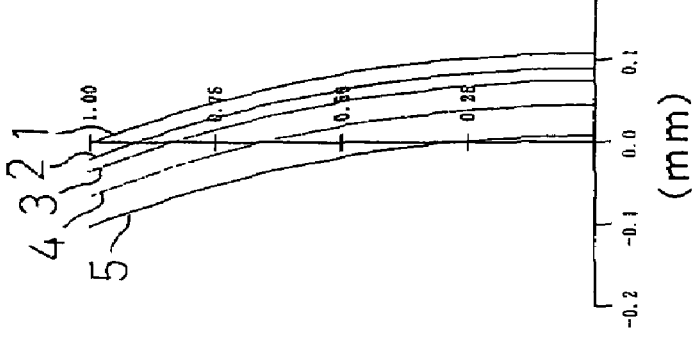
FIG. 37

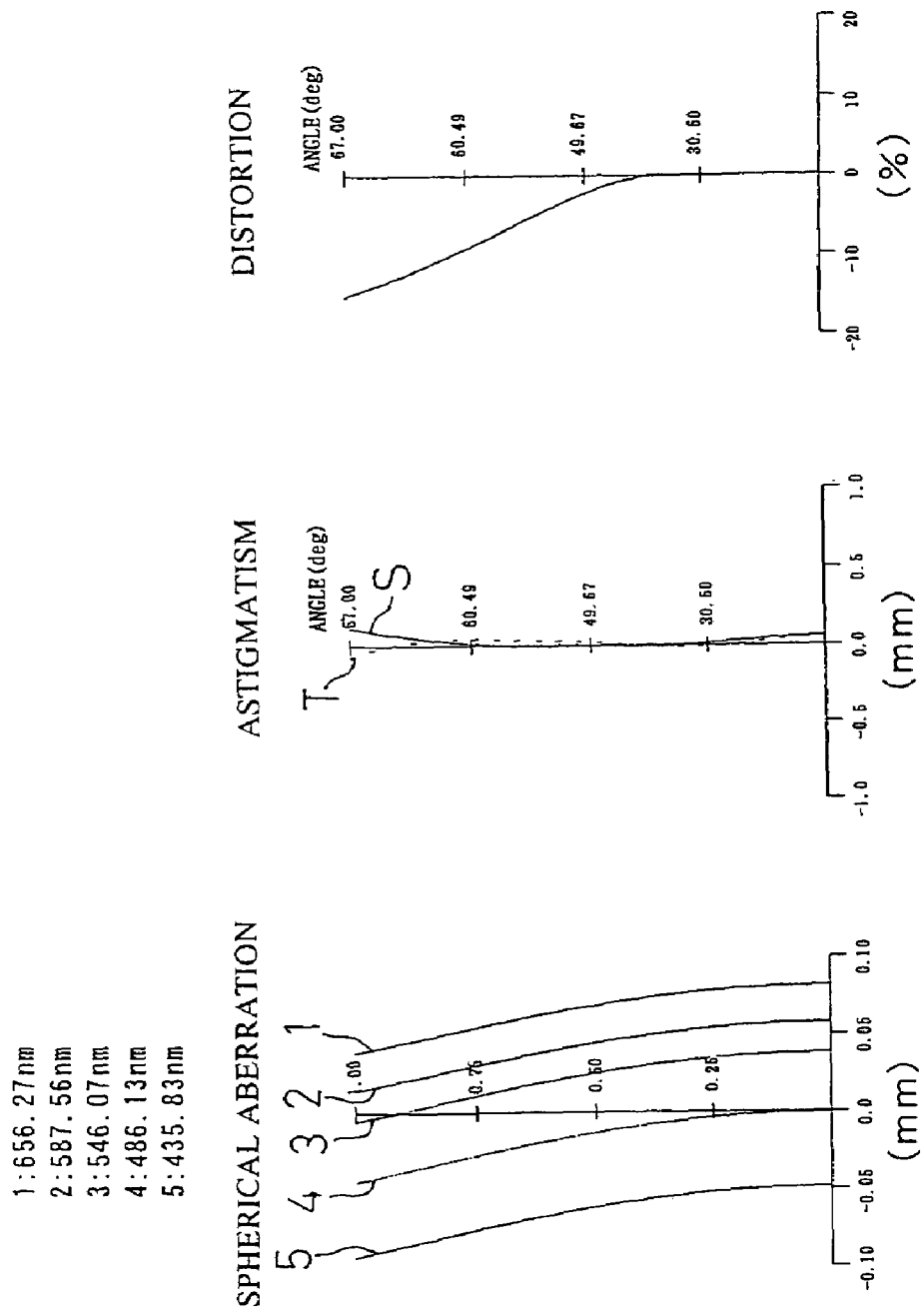

IMAGING LENS

BACKGROUND OF THE INVENTION

1. Field of the Invention

The present invention relates to an imaging lens. In particular, the present invention relates to an imaging lens having a super-wide-angle, four-lens structure that is suitable for forming a image of objects within a wide range on an image-taking surface of a solid image pickup device such as a charge-coupled device (CCD), a complementary metal oxide semiconductor (CMOS), etc. The imaging lens is mounted on an imaging device, such as a camera used to check the rear of an automobile.

2. Description of the Related Art

In recent years, cameras used to check the rear of an automobile are being mounted on automobiles. Images of the rear exterior of the automobile imaged by the camera are displayed on a monitor provided inside of the automobile. As a result, assistance can be provided for driving operations performed when backing up the automobile.

In this type of camera, an image of objects within a wide range is required to be formed on an image-taking surface of a solid image pickup device such as the CCD, the CMOS, etc. Therefore, the imaging lens used in such a camera is required to be a super-wide-angle imaging lens having an angle of view exceeding 130°.

In addition, recently, there has been an increasing demand for such cameras to be smaller and lighter. In accompaniment to this demand, the super-wide-angle imaging lens mounted on such cameras is also required to be small and light.

[Patent Literature 1] Japanese Patent Unexamined Publication 2003-232998

However, conventional super-wide-angle imaging lenses have a large number of lenses and the overall length of the imaging lens is often long. Such imaging lenses are not suitable for achieving reduction in size and weight.

Furthermore, even when the super-wide-angle imaging lens is small, the cost of the imaging lens rises since expensive lenses, such as a gradient index lens, are used. In addition, optical performance deteriorates due to the effect of aberrations, such as distortion.

SUMMARY OF THE INVENTION

The present invention has been achieved in light of the above-described problems. An object of the invention is to provide a super-wide-angle imaging lens that can be reduced in size and weight, while maintaining excellent optical performance, and is low in cost.

In order to achieve the aforementioned object, the imaging lens according to a first aspect of the present invention comprises, in order from an object side to an image surface side: a first lens which is a meniscus lens having a negative power whose convex surface faces the object side, a second lens which is a lens having a negative power whose concave surface faces the image surface side, a third lens which is a lens having a positive power whose convex surface faces the object side, a diaphragm, and a fourth lens which is a lens having a positive power whose convex surface faces the image surface side, wherein conditions expressed by each of following expressions (1) to (4) are to be satisfied:

$$0 \leq d_2/f1 \leq 2.0 \tag{1}$$

$$0 \leq d_4/f1 \leq 2.0 \tag{2}$$

$$-4.5 \leq f_2/f1 \leq -1.5 \tag{3}$$

$$-4.5 \leq (r_5 - r_6) \leq -0.2 \tag{4}$$

where,
f1: focal distance of the entire lens system
$f_2$: focal distance of the second lens
$d_2$: space between the first lens and the second lens on the optical axis
$d_4$: space between the second lens and the third lens on the optical axis
$r_5$: center radius curvature of the object side face of the third lens
$r_6$: center radius curvature of the imaging surface side face of the third lens.

In the first aspect of the invention, a simple four-lens lens structure can be used. Furthermore, each condition expressed by the expressions (1) to (4) is satisfied. Therefore, the overall length can be shortened, the lens radii of the first lens and the second lens can be reduced, and exacerbation of distortion, astigmatism, and field curvature can be suppressed without fail.

An imaging lens according to a second aspect is the imaging lens according to the first aspect, wherein, further, the object side face of the fourth lens is convex and the fourth lens satisfies the conditions expressed by the following expression (5):

$$0.8 \leq (r_8 - r_9)/(r_8 + r_9) \leq 4.0 \tag{5}$$

where,
$r_8$: center radius curvature of the object side face of the fourth lens
$r_9$: center radius curvature of the imaging surface side face of the fourth lens.

In the second aspect of the present invention, further, the object side face of the fourth lens is convex and the fourth lens satisfies the condition expressed by the expression (5). Therefore, the exacerbation of distortion, astigmatism, and field curvature can be more effectively suppressed.

An imaging lens according to a third aspect is the imaging lens according to the second aspect, wherein, further, the object side face of the fourth lens has an aspherical shape in which the curvature radius increases from the center towards the periphery.

In the third aspect of the invention, the astigmatism, the field curvature (one side), and negative distortion in the periphery can be successfully corrected.

An imaging lens according to a fourth aspect is the imaging lens according to any one of aspects 1 to 3, wherein, further, the object side face of the second lens has an aspherical shape that curves toward the image surface side, from the center toward the periphery.

In the fourth aspect of the present invention, the overall length can be further shortened, the lens diameter of the second lens can be further reduced, and the exacerbation of the astigmatism and the field curvature can be more effectively suppressed.

With the imaging lens according to the first aspect of the present invention, a simple four-lens lens structure can be used. Furthermore, each condition expressed by the expressions (1) to (4) is satisfied. Therefore, the overall length can be shortened, the lens radii of the first lens and the second lens can be reduced, and the exacerbation of the distortion, the astigmatism, and the field curvature can be effectively suppressed. As a result, a super-wide-angle imaging lens that can be reduced in size and weight, while maintaining excellent optical performance, and is low in cost can be achieved.

Further, with the imaging lens according to the second aspect, the object side face of the fourth lens is convex and the fourth lens satisfies the condition expressed by the expression (5). Therefore, the exacerbation of distortion, astigmatism, and field curvature can be more effectively suppressed. As a result, in addition to the effects of the imaging lens according to the first aspect, the imaging lens according to the second aspect can achieve a super-wide-angle imaging lens that has a more superior optical performance.

Further, with the imaging lens according to the third aspect, the astigmatism, the field curvature (one side), and the negative distortion in the periphery can be successfully corrected. As a result, in addition to the effects of the imaging lens according to the second aspect, the imaging lens according to the third aspect can achieve a super-wide-angle imaging lens that has a more superior optical performance.

Further, with the imaging lens according to the fourth aspect, the overall length can be further shortened, the lens diameter of the second lens can be further reduced, and the exacerbation of the astigmatism and the field curvature can be more effectively suppressed. As a result, in addition to the effects of the imaging lens according to any one of aspects 1 to 3, the imaging lens according to the fourth aspect can achieve a super-side-angle imaging lens that is small and light and has excellent optical performance.

BRIEF DESCRIPTION OF THE DRAWINGS

FIG. 5 shows graphs for describing the spherical aberration, astigmatism, and distortion of the imaging lens shown in FIG. 4;

FIG. 27 shows graphs for describing the spherical aberration, astigmatism, and distortion of the imaging lens shown in FIG. 26;

FIG. 37 shows graphs for describing the spherical aberration, astigmatism, and distortion of the imaging lens shown in FIG. 36;

FIG. 47 shows graphs for describing the spherical aberration, astigmatism, and distortion of the imaging lens shown in FIG. 46;

DETAILED DESCRIPTION OF THE PREFERRED EMBODIMENT

An embodiment of the imaging lens according to the present invention will be described hereinafter with reference to FIG. 1.

The imaging lens according to the embodiment is a super-wide-angle imaging lens having an angle of view of 130°

Figure 1:
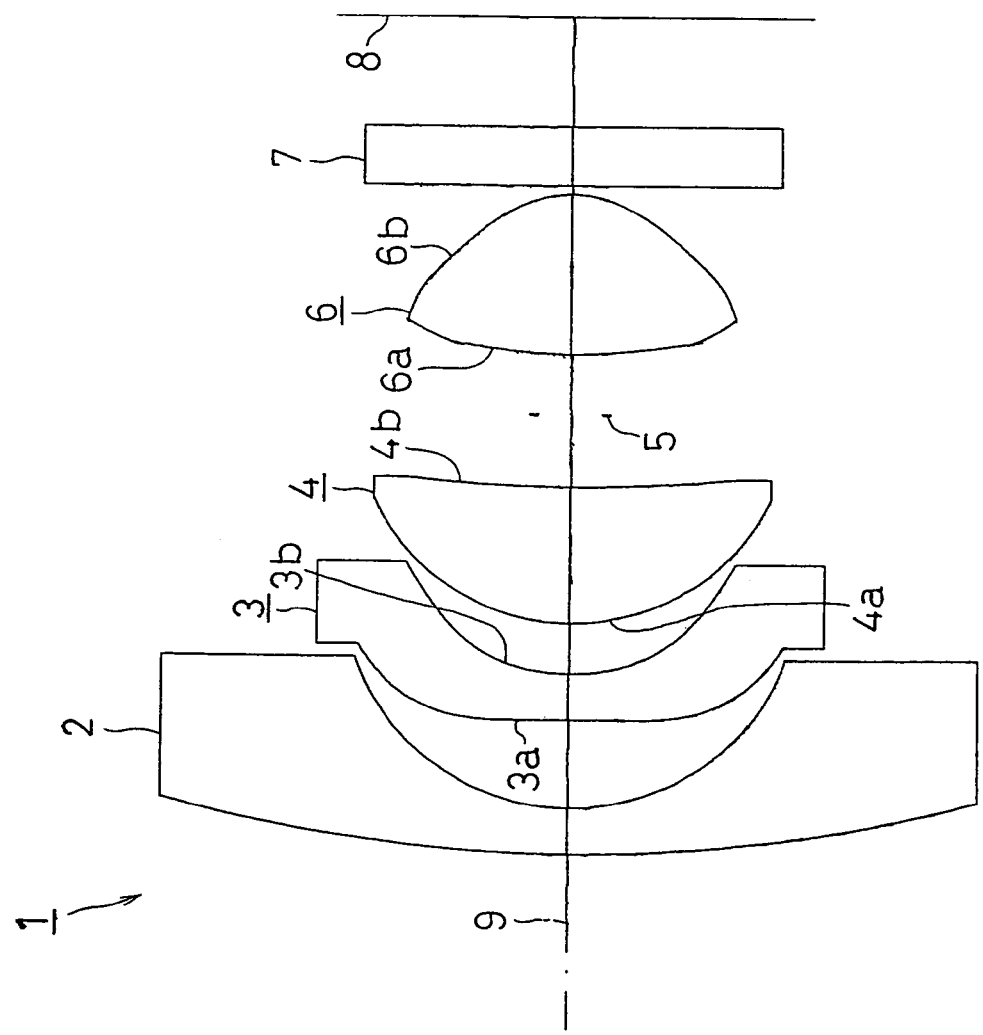
FIG. 1 is a schematic diagram for showing an embodiment of the imaging lens according to the present invention.

As shown in FIG. 1, an imaging lens 1 according to the embodiment comprises, in order from the object side toward the image surface side, a glass first lens 2 which is a meniscus lens having a negative power whose convex surface faces the object side, a resin-type second lens 3 having a negative power whose concave surface faces the image surface side, a glass third lens 4 having a positive power whose convex surface faces the object side, a diaphragm 5, and a resin-type fourth lens 6 having a positive power whose convex surface faces the image surface side.

Herein, each of the lens surfaces on the object side and the image surface side of the first lens 2 to the fourth lens 6 is respectively referred to as a first face and a second face.

On the second face 6b of the fourth lens 6, there are respectively disposed various filters 7 such as a cover glass, an IR cut filter, and a lowpass filter, and an image-taking surface 8 which is a light-receiving surface of an image sensor element such as a CCD or a CMOS. The filter 7 may be omitted as required.

In this way, according to the embodiment, the super-wide-angle imaging lens 1 can be achieved at a low cost by the simple four-lens (the first lens 2 to the fourth lens 6) lens structure. In addition, the imaging lens 1 can be manufactured at an even lower cost by forming each lens 2, lens 3, lens 4, and lens 6 from resin.

In addition, according to the embodiment, the imaging lens 1 satisfies each condition expressed by the following expressions (1) to (4).

$$0 \leq d_2/fl \leq 2.0 \quad (1)$$

$$0 \leq d_4/fl \leq 2.0 \quad (2)$$

$$-4.5 \leq f_2/fl \leq -1.5 \quad (3)$$

$$-4.5 \leq (r_5-r_6)/(r_5+r_6) \leq -0.2 \quad (4)$$

where, fl in the expressions (1) to (3) is the focal distance of the entire lens system. $f_2$ in the expression (3) is the focal distance of the second lens 3. $d_2$ in the expression (1) is the space between the first lens 2 and the second lens 3 on an optical axis 9. $d_4$ in the expression (2) is the space between the second lens 3 and the third lens 4 on the optical axis 9. $r_5$ in the expression (4) is the center radius curvature of the first face 4a of the third lens 4. $r_6$ in the expression (4) is the center radius curvature of the second face 4b of the third lens 4.

When the value of $d_2/fl$ is smaller than the value (0) shown in the expression (1), the first lens 2 and the second lens 3 cannot be disposed.

At the same time, when the value of $d_2/fl$ exceeds the value (2.0) shown in the expression (1), the overall length becomes too long and goes against the demand for reduction in size and weight. Moreover, the negative distortion, the astigmatism, and the field curvature are exacerbated.

Therefore, according to the embodiment, by the value of $d_2/fl$ being set to satisfy the expression (1), the overall length can be shortened and the lens diameter of the first lens 2 can be reduced. As a result, the difference in thickness between the center section and the peripheral section in the first lens 2 can be reduced while maintaining the power of the first lens 2. As a result, the exacerbation of the negative distortion, the astigmatism, and the field curvature can be suppressed.

It is more preferable for the relation between $d_2$ and fl to satisfy an expression $0.3 \leq d_2/fl \leq 1.7$.

Further, when the value of $d_4/fl$ is smaller than the value (0) shown in the expression (2), the second lens 3 and the third lens 4 cannot be disposed.

At the same time, when the value of $d_4/fl$ exceeds the value (2.0) shown in the expression (2), the overall length becomes too long and goes against the demand for reduction in size and weight. Moreover, the negative distortion, the astigmatism, and the field curvature are exacerbated.

Therefore, according to the embodiment, by the value of $d_4/fl$ being set to satisfy the expression (2), the overall length can be shortened and the lens diameter of the second lens 3 can be reduced. As a result, the difference in thickness between the center section and the peripheral section in the second lens 3 can be reduced while maintaining the power of the second lens 3. As a result, the exacerbation of the negative distortion, the astigmatism, and the field curvature can be more effectively suppressed. In addition, the effect of the above-described suppression of the exacerbation of the negative distortion, the astigmatism, and the field curvature by the first lens 2 can be enhanced.

It is more preferable for the relation between $d_4$ and fl to satisfy an expression $0.2 \leq d_4/fl \leq 1.4$.

Further, when the value of $f_2/fl$ is smaller than the value (−4.5) shown in the expression (3), the overall length becomes too long and goes against the demand for reduction in size and weight, or the power of the first lens 2 becomes too powerful and the negative distortion, the astigmatism, and the field curvature becomes difficult to correct.

At the same time, when the value of $f_2/fl$ exceeds the value (−1.5) shown in the expression (3), the exacerbation of the negative distortion, the astigmatism, and the field curvature in the second lens 3 increases and correction becomes difficult.

Therefore, according to the embodiment, by the value of $f_2/fl$ being set to satisfy the expression (3), power is gained by the second lens 3 positioned closer to the diaphragm 5 than the first lens 2. As a result, a compact lens system that has a super-wide-angle and can secure sufficient back focus distance, while suppressing the exacerbation of the negative distortion, the astigmatism, and the field curvature, can be achieved.

It is more preferable for the relation between $f_2$ and fl to satisfy an expression $-4 \leq f_2/fl \leq -2.5$.

Further, when the value of $(r_5-r_6)/(r_5+r_6)$ is smaller than the value (−4.5) shown in the expression (4), the incident angle of the light ray incident on the second face 4b of the third lens 4 for a wide angle of view is too sharp. Therefore, the astigmatism and the field curvature are exacerbated.

At the same time, when the value of $(r_5-r_6)/(r_5+r_6)$ exceeds the value (−0.2) shown in the expression (4), the incident angle of the light ray incident on the second face 4b of the third lens 4 for a wide angle of view is too obtuse. Therefore, the effect of the correction of the distortion becomes insufficient. In addition, the angle of the second face 4b becomes sharp and the shape becomes difficult to manufacture.

Therefore, by the value of $(r_5-r_6)/(r_5+r_6)$ being set to satisfy the expression (4), the distortion can be successfully corrected and the exacerbation of the astigmatism and the field curvature can be more effectively suppressed.

It is more preferable for the relation between $(r_5-r_6)$ and $(r_5+r_6)$ to satisfy an expression $-3.5 \leq (r_5-r_6)/(r_5+r_6) \leq -0.5$.

In addition to the above-described structure, it is more preferable for the first face 6a of the fourth lens 6 to be convex and the fourth lens 6 to satisfy the following expression (5).

$$0.8 \leq (r_8-r_9)/(r_8+r_9) \leq 4.0 \quad (5)$$

where, $r_8$ in the expression (5) is a center radius curvature of the first face 6a of the fourth lens 6. $r_9$ in the expression (5) is a center radius curvature of the second face 6b of the fourth lens 6.

When the value of $(r_8-r_9)/(r_8+r_9)$ is smaller than the value (0.8) shown in the expression (5), the incident angle of the light ray incident on the second face 6b of the fourth lens 6 for a wide angle of view is too sharp. Therefore, the distortion, the astigmatism, and the field curvature become difficult to correct.

At the same time, when the value of $(r_8-r_9)/(r_8+r_9)$ exceeds the value (4.0) shown in the expression (5), the incident angle of the light ray incident on the first face 6a of the fourth lens 6 for a wide angle of view is too sharp. Therefore, the distortion, the astigmatism, and the field curvature become difficult to correct.

Therefore, by the value of $(r_8-r_9)/(r_8+r_9)$ being set to satisfy the expression (5), the second face 6b of the fourth lens 6 can have sufficient curvature. As a result, the exacerbation of the distortion, the astigmatism, and the field curvature can be more effectively suppressed.

It is more preferable for the relation between $(r_8-r_9)$ and $(r_8+r_9)$ to satisfy an expression $1.3 \leq (r_8-r_9)/(r_8+r_9) \leq 3.1$.

In addition to the above-described structure, it is more preferable for the first face 6a of the fourth lens 6 to have an aspherical shape in which the curvature radius increases from the center (optical axis 9) towards the periphery.

As a result, the astigmatism, the field curvature (one side), and the negative distortion in the periphery can be successfully corrected, while the fourth lens 6 gains power.

In addition to the above-described structure, it is more preferable for the first face 3a of the second lens 3 to have an aspherical shape that curves toward the second face 3b, from the center toward the periphery.

As a result, the overall length can be further shortened, the lens diameter (effective diameter) of the second lens 3 can be further reduced, and the exacerbation of the astigmatism and the field curvature can be more effectively suppressed.

EXAMPLES

Next, EXAMPLES of the present invention will be described with reference to FIG. 2 to FIG. 47.

In the EXAMPLES, F no denotes F number, ω denotes the angle of view (angle of view of opposing angles), and r denotes the curvature radius of the optical surface (the center radius curvature in the case of a lens). Further, d denotes a distance to the next optical surface, nd denotes the index of refraction when the d line (yellow) is irradiated, and vd denotes the Abbe number of each optical system also when the d line is irradiated.

k, A, B, C, and D denote each coefficient in a following expression (6). Specifically, the shape of the aspherical surface of the lens is expressed by the following expression provided that the direction of the optical axis 9 is taken as the Z axis, the direction orthogonal to the optical axis 9 as the X axis, the traveling direction of light is positive, k is the constant of cone, A, B, C, and D are the aspherical coefficients, and r is the center radius curvature.

$$Z(X) = r^{-1}X^2/[+\{1-(k+1)r^{-2}X^2\}^{1/2}]$$

$$+AX^4+BX^6+CX^8+DX^{10}+EX \quad (6)$$

First Example

Figure 2:
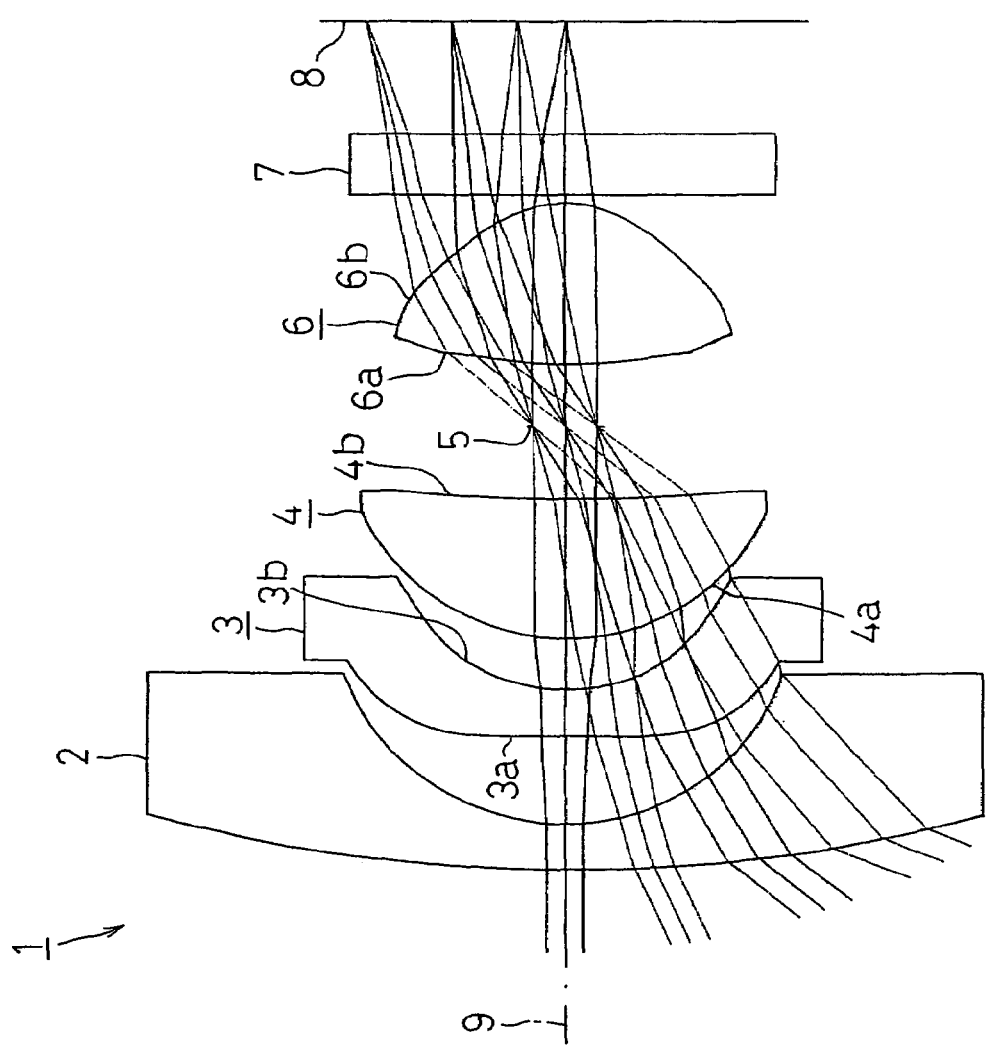
FIG. 2 is a schematic diagram for showing FIRST EXAMPLE of the imaging lens according to the present invention.

FIG. 2 shows a FIRST EXAMPLE of the present invention. In the FIRST EXAMPLE, a cover glass serving as the filter 7 is disposed between the second face 6b of the fourth lens 6 and the imaging surface 8.

The imaging lens 1 of the FIRST EXAMPLE was set under the following conditions:

| Lens Data | | | | |
|---|---|---|---|---|
| fl = 1.18 mm, f$_2$ = −3.92 mm, F no = 2.8, ω = 134° | | | | |
| Face Number (Object Point) | r | d | nd | vd |
| 1 (First Face of First Lens) | 17.763 | 0.550 | 1.729 | 54.67 |
| 2 (Second Face of First Lens) | 2.635 | 1.057 | | |
| 3 (First Face of Second Lens) | −33.032 | 0.550 | 1.530 | 55.50 |
| 4 (Second Face of Second Lens) | 2.225 | 0.593 | | |
| 5 (First Face of Third Lens) | 2.514 | 1.652 | 1.847 | 23.78 |
| 6 (Second Face of Third Lens) | 19.219 | 0.844 | | |
| 7 (Diaphragm) | ∞ | 0.726 | | |
| 8 (First Face of Fourth Lens) | 4.512 | 1.928 | 1.530 | 55.50 |
| 9 (Second Face of Fourth Lens) | −1.200 | 0.100 | | |
| 10 (First Face of Cover Glass) | ∞ | 0.700 | 1.523 | 58.59 |
| 11 (Second Face of Cover Glass) (Image Surface) | ∞ | | | |

-continued

| Face Number | k | A | B | C | D | E |
|---|---|---|---|---|---|---|
| 3 | 0.00 | 1.96E−2 | 3.94E−3 | 1.15E−3 | 1.66E−4 | −8.95E−6 |
| 4 | 0.00 | −6.94E−3 | 1.46E−2 | 5.48E−4 | −8.89E−4 | 4.02E−5 |
| 8 | 0.00 | −5.92E−2 | 4.36E−2 | −1.48E−2 | 8.98E−4 | 0.00 |
| 9 | −0.98 | 2.53E−2 | −1.11E−3 | −8.89E−3 | 6.34E−3 | −1.19E−3 |

Under such conditions, $d_2/fl=0.90$ was achieved, thereby satisfying the expression (1). $d_4/fl=0.50$ was achieved, thereby satisfying the expression (2). $f_2/fl=-3.32$ was achieved, thereby satisfying the expression (3). $(r_5-r_6)/(r_5+r_6)=-0.77$ was achieved, thereby satisfying the expression (4). $(r_8-r_9)/(r_8+r_9)=1.72$ was achieved, thereby satisfying the expression (5).

Figure 3:
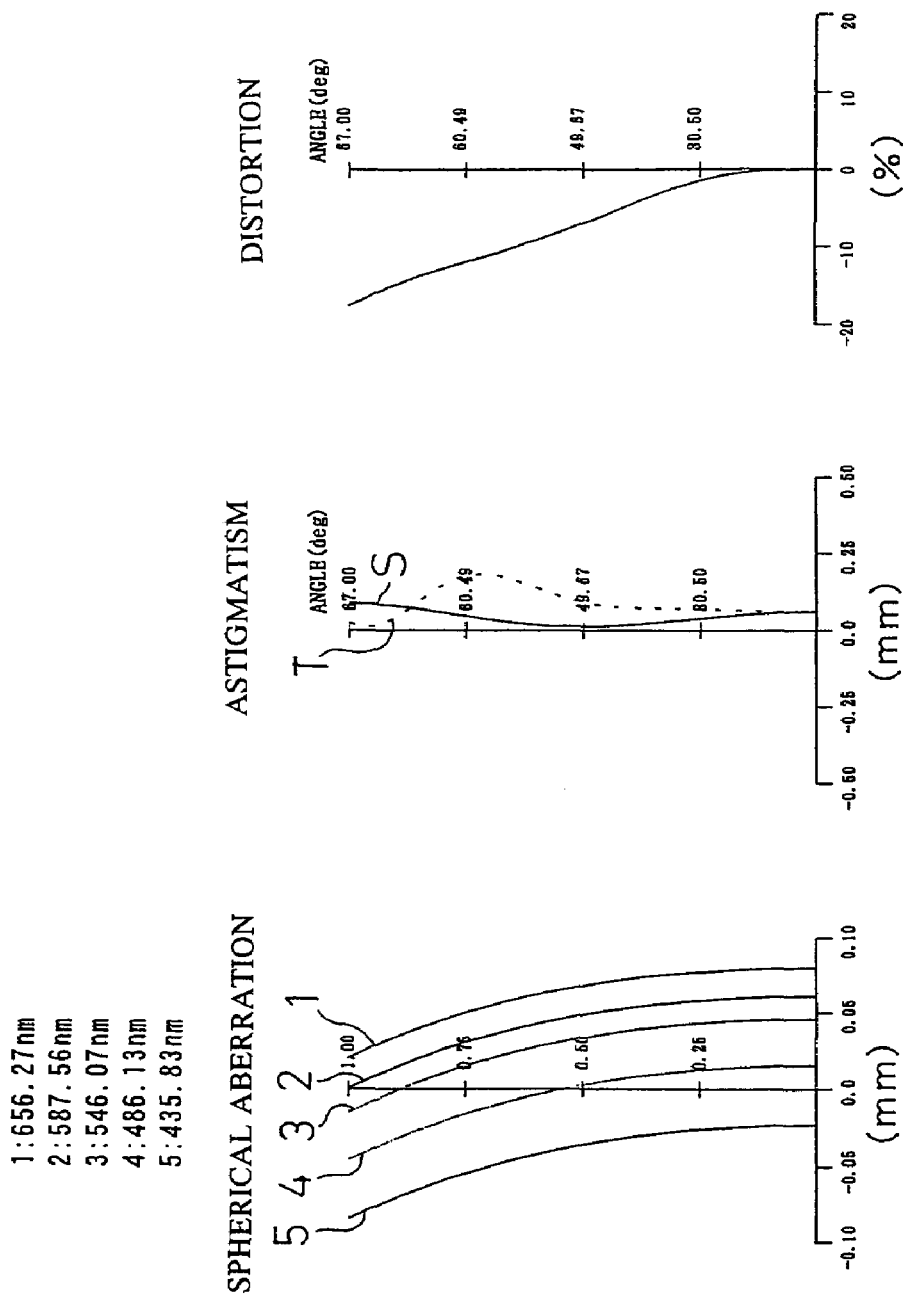
FIG. 3 shows graphs for describing the spherical aberration, astigmatism, and distortion of the imaging lens shown in FIG. 2.

FIG. 3 shows the spherical aberration, the astigmatism, and the distortion in the imaging lens 1 of the FIRST EXAMPLE.

According to the result, each of the spherical aberration, the astigmatism, and the distortion was almost satisfied. It can be seen from the result that a sufficient optical property can be obtained.

Second Example

Figure 4:
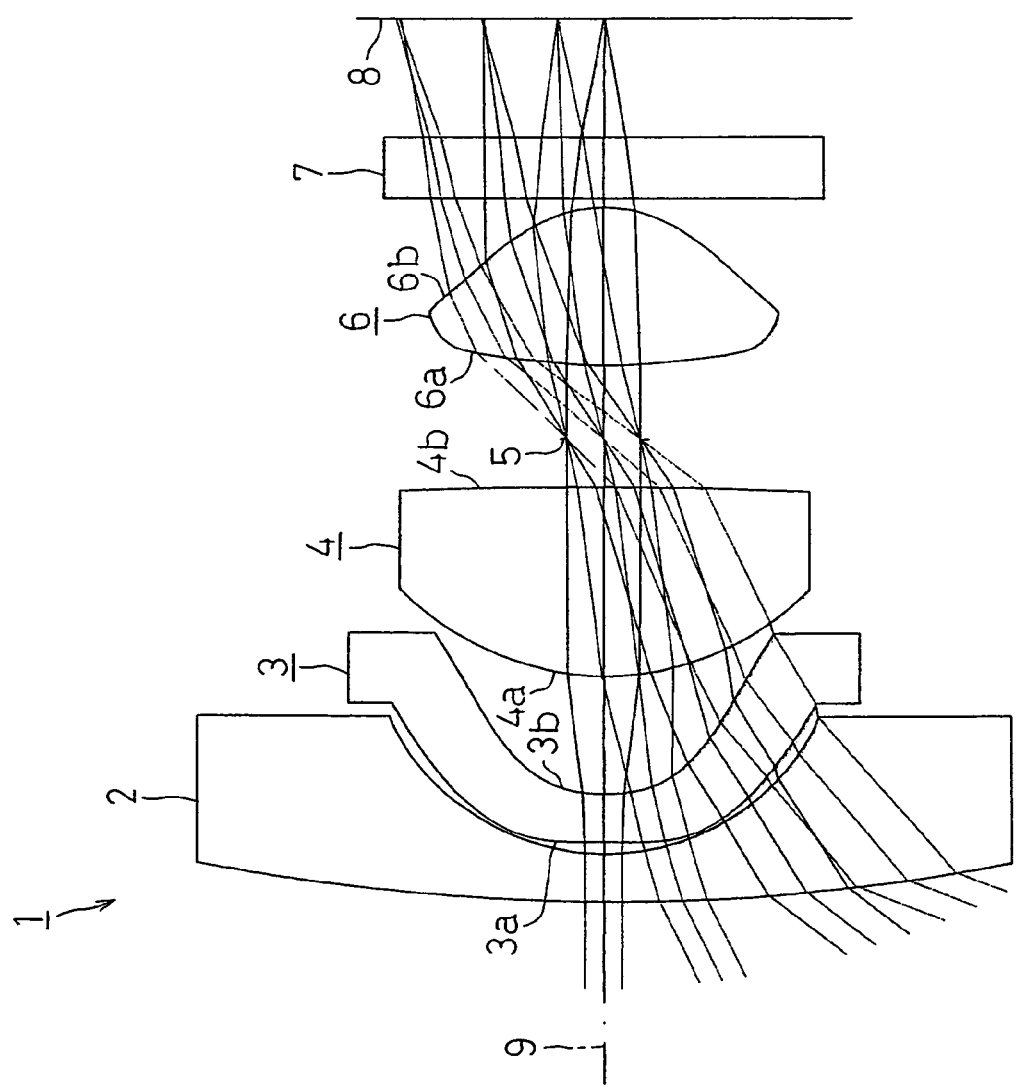
FIG. 4 is a schematic diagram for showing SECOND EXAMPLE of the imaging lens according to the present invention.

FIG. 4 shows a SECOND EXAMPLE of the present invention. In the SECOND EXAMPLE as well, the cover glass serving as the filter 7 is disposed between the second face 6b of the fourth lens 6 and the imaging surface 8.

The imaging lens 1 of the SECOND EXAMPLE was set under the following conditions:

| Lens Data |
|---|
| fl = 1.13 mm, $f_2$ = 3.40 mm, F no = 2.8, ω = 134° |

| Face Number (Object Point) | r | d | nd | vd |
|---|---|---|---|---|
| 1 (First Face of First Lens) | 21.881 | 0.550 | 1.729 | 54.67 |
| 2 (Second Face of First Lens) | 2.477 | 0.139 | | |
| 3 (First Face of Second Lens) | −16.770 | 0.553 | 1.530 | 55.50 |
| 4 (Second Face of Second Lens) | 2.045 | 1.347 | | |
| 5 (First Face of Third Lens) | 2.967 | 2.150 | 1.847 | 23.78 |
| 6 (Second Face of Third Lens) | −45.530 | 0.529 | | |
| 7 (Diaphragm) | ∞ | 0.841 | | |
| 8 (First Face of Fourth Lens) | 3.717 | 1.729 | 1.530 | 55.50 |
| 9 (Second Face of Fourth Lens) | −1.427 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 1.77E−1 | −4.89E−2 | 9.12E−3 | −9.57E−4 | 3.98E−5 |
| 4 | 0.00 | 2.46E−1 | −4.29E−2 | −1.73E−2 | 6.35E−3 | −6.81E−4 |
| 8 | 0.00 | −1.15E−1 | 8.49E−2 | −3.23E−2 | 5.04E−3 | 0.00 |
| 9 | −0.58 | 7.61E−4 | 2.08E−2 | −1.68E−2 | 7.38E−3 | −9.81E−4 |

Under such conditions, $d_2/fl=0.12$ was achieved, thereby satisfying the expression (1). $d_4/fl=1.19$ was achieved, thereby satisfying the expression (2). $f_2/fl=-3.01$ was achieved, thereby satisfying the expression (3). $(r_5-r_6)/(r_5+r_6)=-1.14$ was achieved, thereby satisfying the expression (4). $(r_8-r_9)/(r_8+r_9)=2.25$ was achieved, thereby satisfying the expression (5).

FIG. 5 shows the spherical aberration, the astigmatism, and the distortion in the imaging lens 1 of the SECOND EXAMPLE.

According to the result, each of the spherical aberration, the astigmatism, and the distortion was almost satisfied. It can be seen from the result that a sufficient optical property can be obtained.

Third Example

Figure 6:
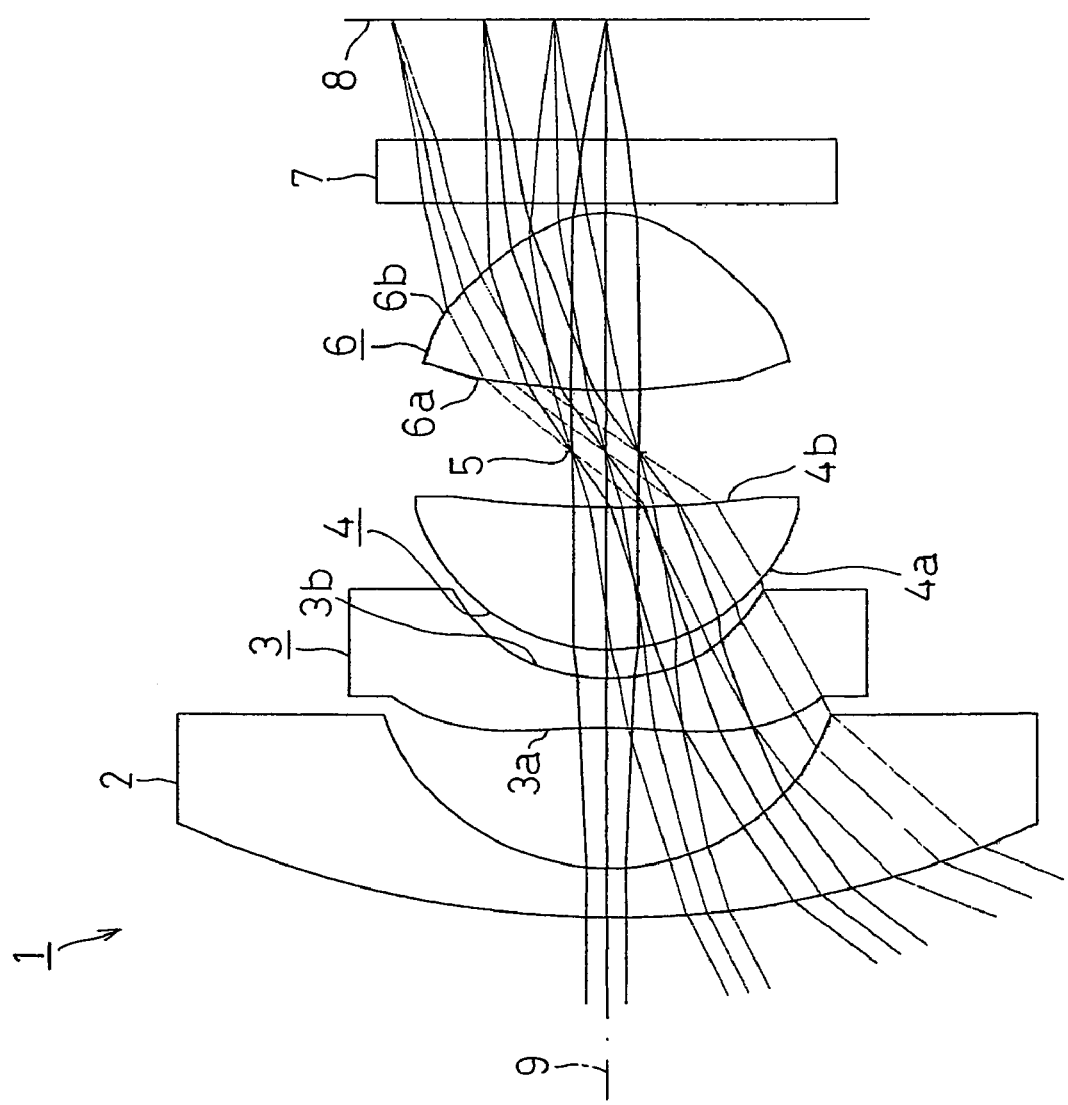
FIG. 6 is a schematic diagram for showing THIRD EXAMPLE of the imaging lens according to the present invention.

FIG. 6 shows a THIRD EXAMPLE of the present invention. In the THIRD EXAMPLE as well, the cover glass serving as the filter 7 is disposed between the second face 6b of the fourth lens 6 and the imaging surface 8.

The imaging lens 1 of the THIRD EXAMPLE was set under the following conditions:

| Lens Data |
|---|
| fl = 1.18 mm, $f_2$ = −3.25 mm, F no = 2.8, ω = 134° |

| Face Number (Object Point) | r | d | nd | vd |
|---|---|---|---|---|
| 1 (First Face of First Lens) | 10.399 | 0.550 | 1.729 | 54.67 |
| 2 (Second Face of First Lens) | 2.494 | 1.578 | | |
| 3 (First Face of Second Lens) | −6.464 | 0.550 | 1.530 | 55.50 |
| 4 (Second Face of Second Lens) | 2.406 | 0.304 | | |
| 5 (First Face of Third Lens) | 2.099 | 1.575 | 1.847 | 23.78 |
| 6 (Second Face of Third Lens) | 11.174 | 0.645 | | |
| 7 (Diaphragm) | ∞ | 0.701 | | |
| 8 (First Face of Fourth Lens) | 4.967 | 1.997 | 1.530 | 55.50 |
| 9 (Second Face of Fourth Lens) | −1.138 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 4.54E−2 | −6.08E−3 | 6.97E−4 | −3.10E−5 | −5.21E−7 |
| 4 | 0.00 | 1.95E−2 | 1.59E−2 | −3.59E−3 | 5.56E−4 | −1.42E−4 |
| 8 | 0.00 | −4.93E−2 | 3.84E−2 | −1.45E−2 | 1.11E−3 | 0.00 |
| 9 | −0.91 | 3.26E−2 | 2.46E−3 | −1.10E−2 | 6.73E−3 | −1.19E−3 |

Under such conditions, $d_2/fl=1.34$ was achieved, thereby satisfying the expression (1). $d_4/fl=0.26$ was achieved, thereby satisfying the expression (2). $f_2/fl=-2.75$ was achieved, thereby satisfying the expression (3). $(r_5-r_6)/(r_5+r_6)=-0.68$ was achieved, thereby satisfying the expression (4). $(r_8-r_9)/(r_8+r_9)=1.59$ was achieved, thereby satisfying the expression (5).

Figure 7:
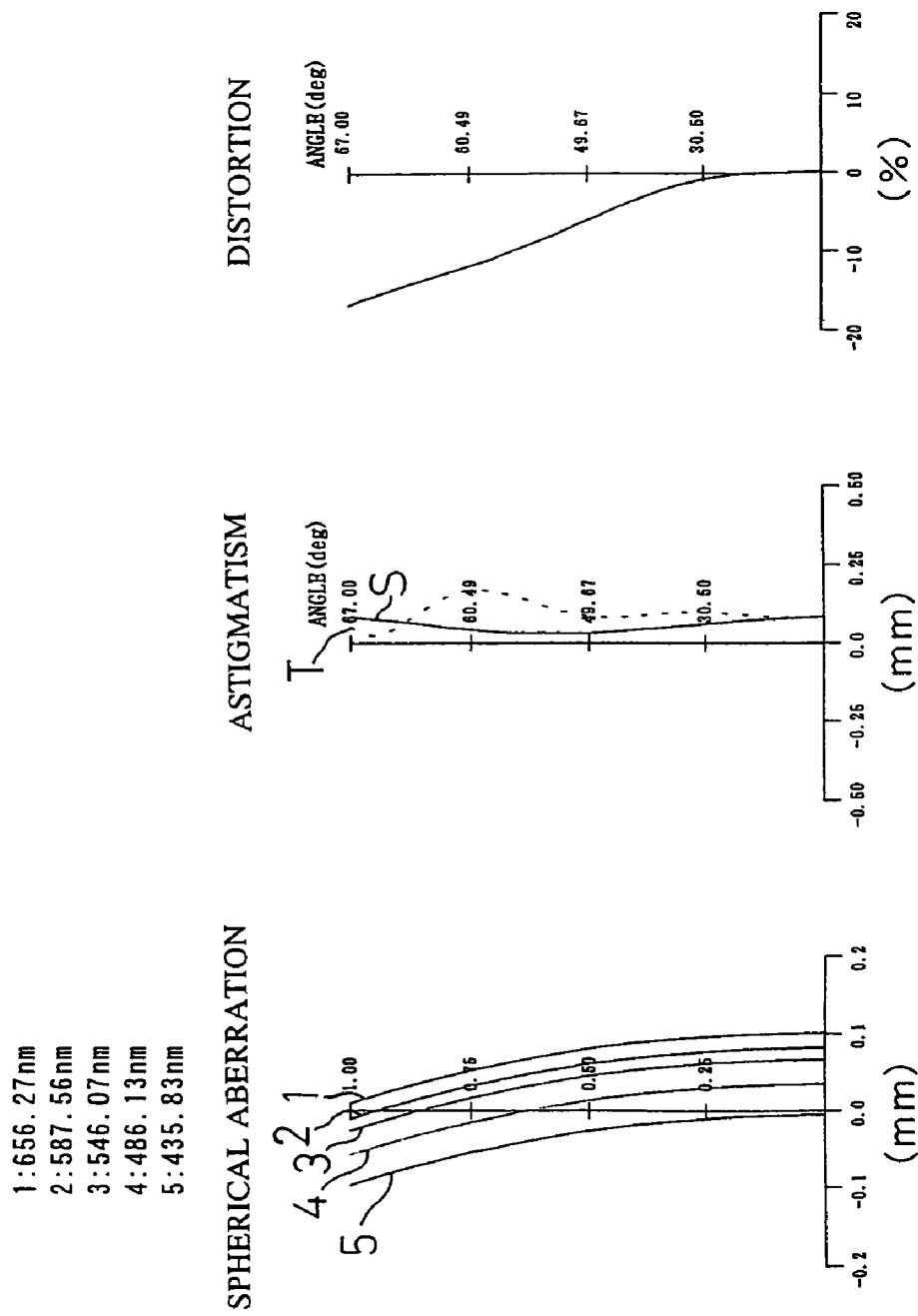
FIG. 7 shows graphs for describing the spherical aberration, astigmatism, and distortion of the imaging lens shown in FIG. 6.

FIG. 7 shows the spherical aberration, the astigmatism, and the distortion in the imaging lens 1 of the THIRD EXAMPLE.

According to the result, each of the spherical aberration, the astigmatism, and the distortion was almost satisfied. It can be seen from the result that a sufficient optical property can be obtained.

Fourth Example

Figure 8:
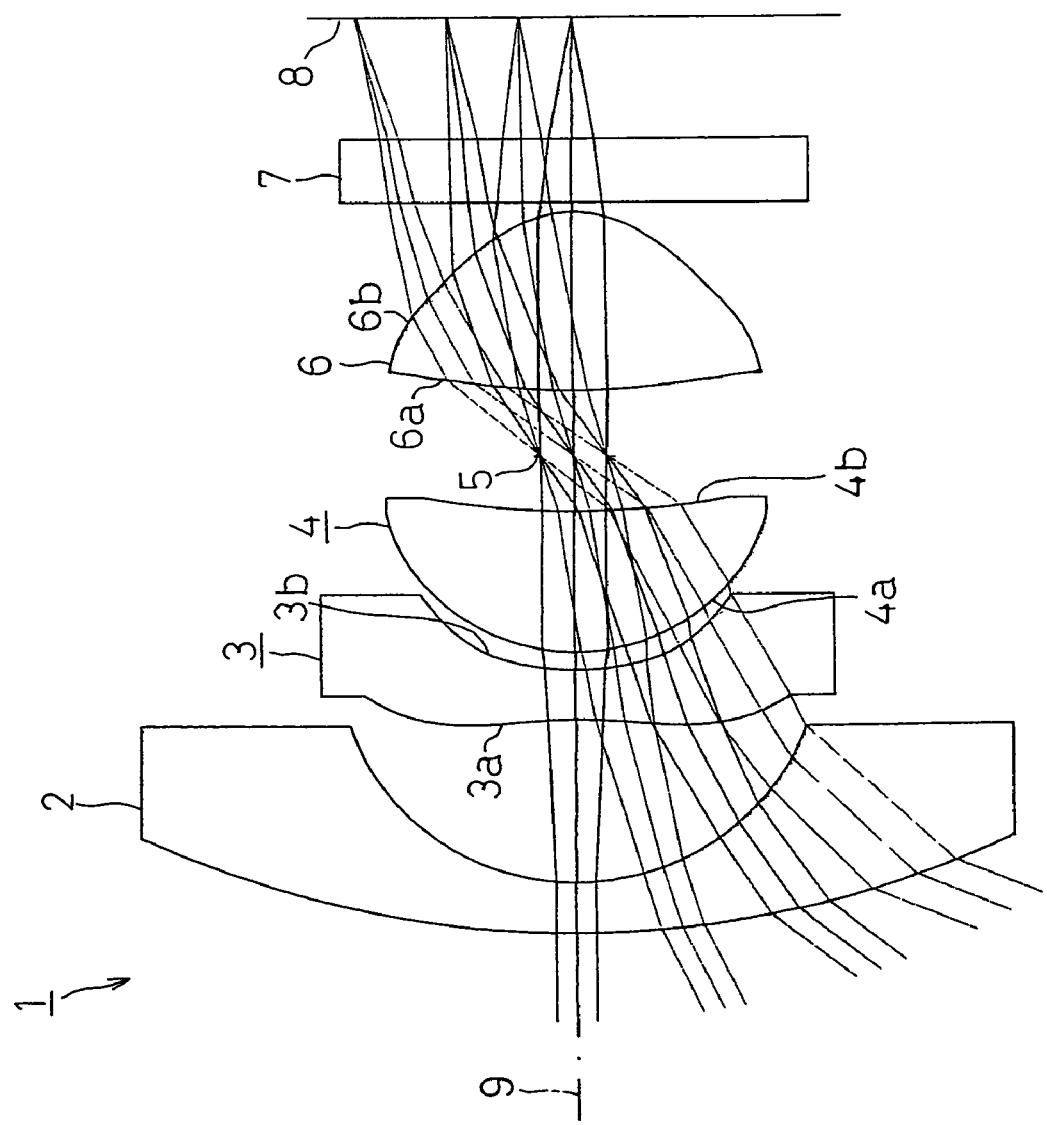
FIG. 8 is a schematic diagram for showing FOURTH EXAMPLE of the imaging lens according to the present invention.

FIG. 8 shows a FOURTH EXAMPLE of the present invention. In the FOURTH EXAMPLE as well, the cover glass serving as the filter 7 is disposed between the second face 6b of the fourth lens 6 and the imaging surface 8.

The imaging lens 1 of the FOURTH EXAMPLE was set under the following conditions:

Lens Data fl = 1.18 mm, f₂ = −3.40 mm, F no = 2.8, ω = 134°

| Face Number (Object Point) | r | d | nd | vd |
|---|---|---|---|---|
| 1 (First Face of First Lens) | 10.346 | 0.550 | 1.729 | 54.67 |
| 2 (Second Face of First Lens) | 2.502 | 1.776 | | |
| 3 (First Face of Second Lens) | −4.859 | 0.550 | 1.530 | 55.50 |
| 4 (Second Face of Second Lens) | 2.968 | 0.194 | | |
| 5 (First Face of Third Lens) | 2.047 | 1.563 | 1.847 | 23.78 |
| 6 (Second Face of Third Lens) | 8.915 | 0.608 | | |
| 7 (Diaphragm) | ∞ | 0.720 | | |
| 8 (First Face of Fourth Lens) | 5.371 | 1.940 | 1.530 | 55.50 |
| 9 (Second Face of Fourth Lens) | −1.107 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 5.31E-2 | −6.95E-3 | 7.19E-4 | −1.80E-5 | −1.70E-6 |
| 4 | 0.00 | 2.66E-2 | 1.80E-2 | −3.86E-3 | 3.93E-4 | −8.47E-5 |
| 8 | 0.00 | −4.63E-2 | 3.64E-2 | −1.35E-2 | 1.23E-3 | 0.00 |
| 9 | −0.91 | 3.43E-2 | −4.33E-4 | −9.66E-3 | 6.56E-3 | −1.19E-3 |

Under such conditions, $d_2/fl=1.51$ was achieved, thereby satisfying the expression (1). $d_4/fl=0.16$ was achieved, thereby satisfying the expression (2). $f_2/fl=-2.88$ was achieved, thereby satisfying the expression (3). $(r_5-r_6)/(r_5+r_6)=-0.63$ was achieved, thereby satisfying the expression (4). $(r_8-r_9)/(r_8+r_9)=1.52$ was achieved, thereby satisfying the expression (5).

Figure 9:
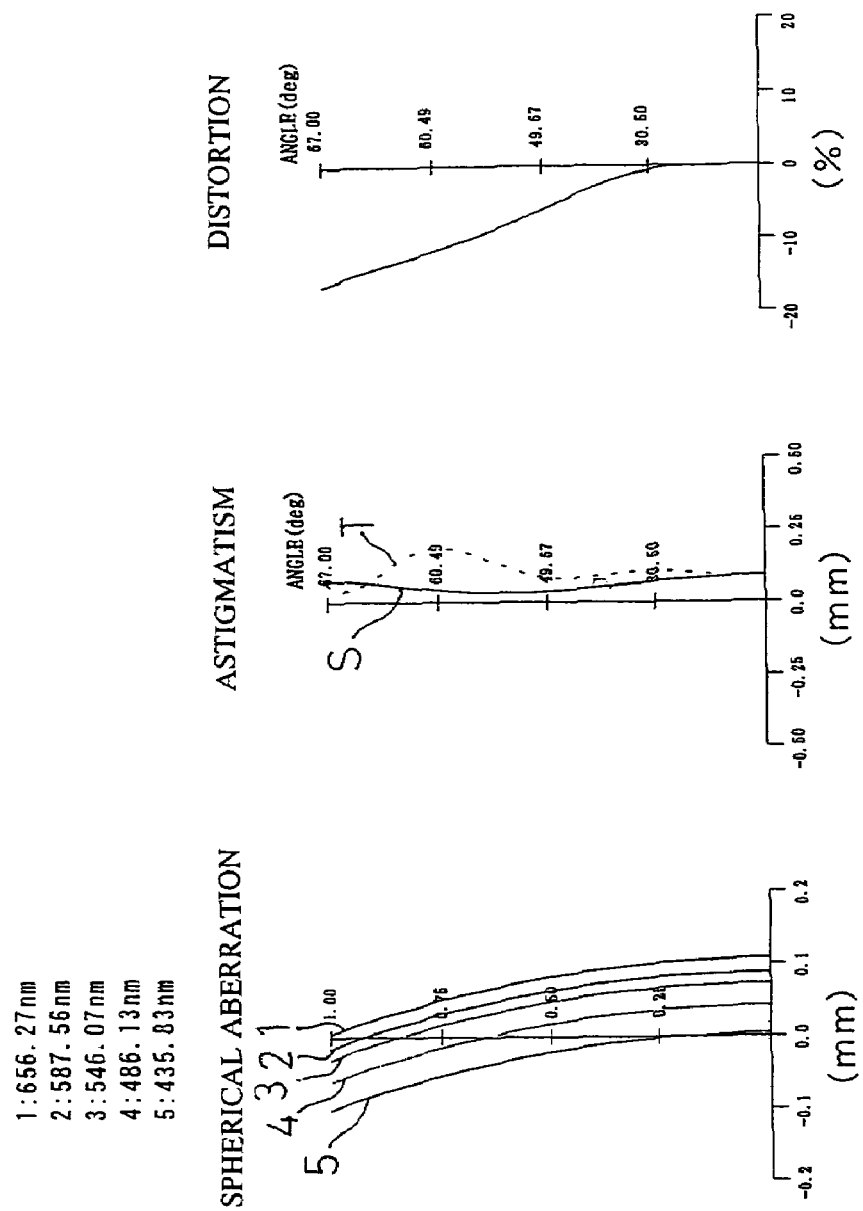
FIG. 9 shows graphs for describing the spherical aberration, astigmatism, and distortion of the imaging lens shown in FIG. 8.

FIG. 9 shows the spherical aberration, the astigmatism, and the distortion in the imaging lens 1 of the FOURTH EXAMPLE.

According to the result, each of the spherical aberration, the astigmatism, and the distortion was almost satisfied. It can be seen from the result that a sufficient optical property can be obtained.

Fifth Example

Figure 10:
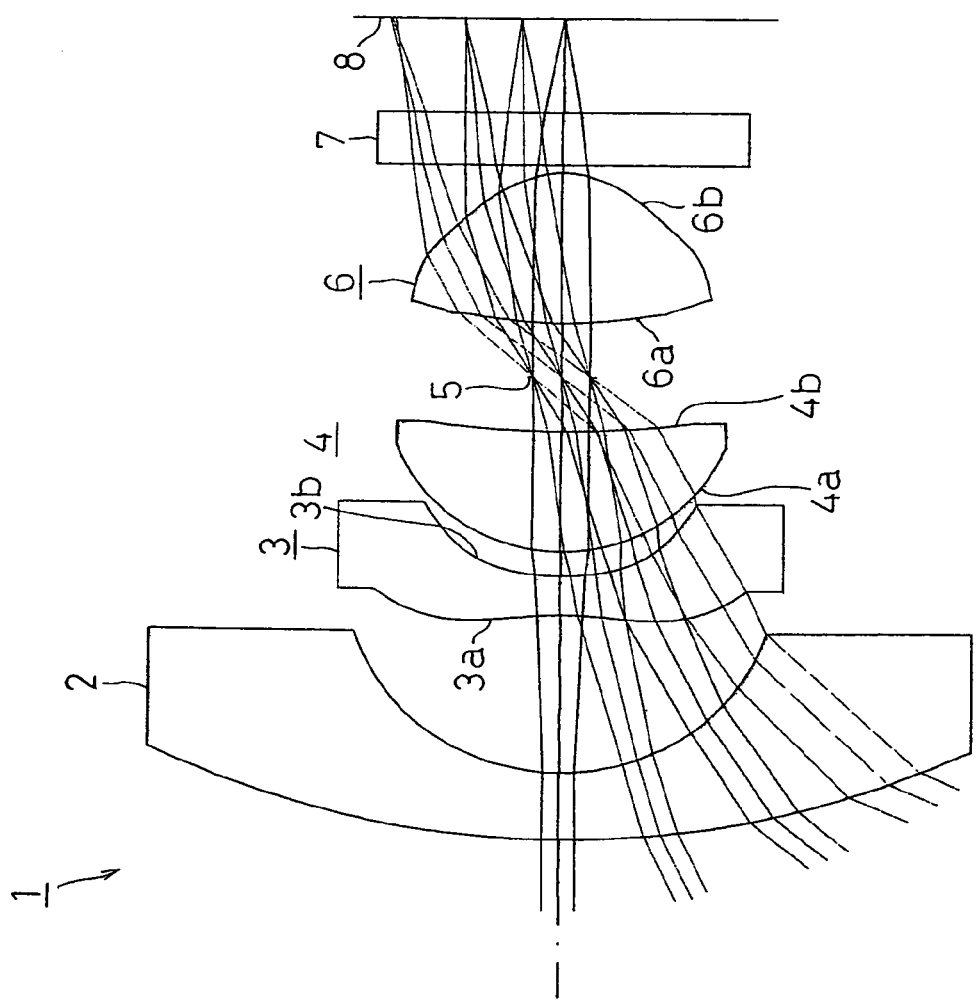
FIG. 10 is a schematic diagram for showing FIFTH EXAMPLE of the imaging lens according to the present invention.

FIG. 10 shows a FIFTH EXAMPLE of the present invention. In the FIFTH EXAMPLE as well, the cover glass serving as the filter 7 is disposed between the second face 6b of the fourth lens 6 and the imaging surface 8.

The imaging lens 1 of the FIFTH EXAMPLE was set under the following conditions:

Lens Data fl = 1.18 mm, f₂ = −3.43 mm, F no = 2.8, ω = 134°

| Face Number (Object Point) | r | d | nd | vd |
|---|---|---|---|---|
| 1 (First Face of First Lens) | 12.456 | 0.904 | 1.729 | 54.67 |
| 2 (Second Face of First Lens) | 2.837 | 2.200 | | |
| 3 (First Face of Second Lens) | −4.310 | 0.556 | 1.530 | 55.50 |
| 4 (Second Face of Second Lens) | 3.272 | 0.345 | | |
| 5 (First Face of Third Lens) | 2.304 | 1.660 | 1.847 | 23.78 |
| 6 (Second Face of Third Lens) | 13.733 | 0.744 | | |
| 7 (Diaphragm) | ∞ | 0.761 | | |
| 8 (First Face of Fourth Lens) | 4.703 | 2.015 | 1.530 | 55.50 |
| 9 (Second Face of Fourth Lens) | −1.213 | 0.109 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 5.45E-2 | −7.02E-3 | 6.94E-4 | −2.07E-5 | −1.20E-6 |
| 4 | 0.00 | 2.61E-2 | 1.72E-2 | −3.80E-3 | 4.36E-4 | −6.87E-5 |
| 8 | 0.00 | −4.72E-2 | 3.78E-2 | −1.34E-2 | 2.68E-4 | 0.00 |
| 9 | −0.90 | 3.27E-2 | 4.33E-4 | −9.64E-3 | 6.45E-3 | −1.19E-3 |

Under such conditions, $d_2/fl=1.87$ was achieved, thereby satisfying the expression (1). $d_4/fl=0.29$ was achieved, thereby satisfying the expression (2). $f_2/fl=-2.91$ was achieved, thereby satisfying the expression (3). $(r_5-r_6)/(r_5+r_6)=-0.71$ was achieved, thereby satisfying the expression (4). $(r_8-r_9)/(r_8+r_9)=1.70$ was achieved, thereby satisfying the expression (5).

Figure 11:
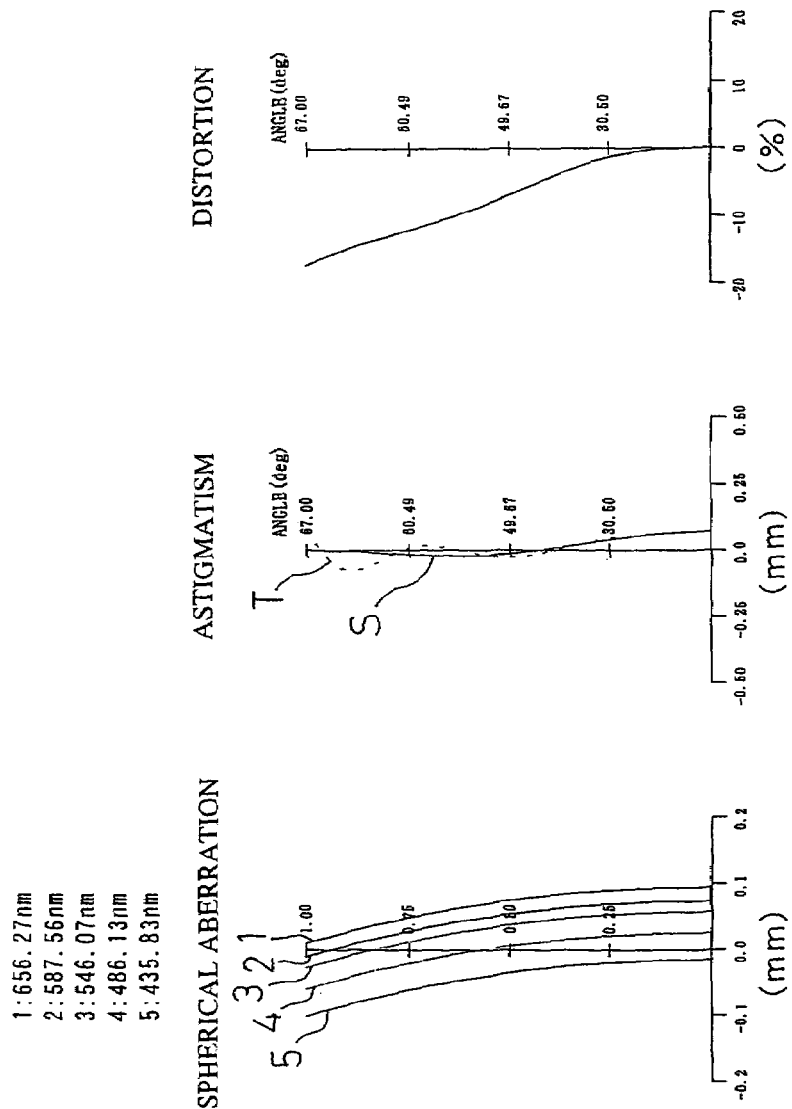
FIG. 11 shows graphs for describing the spherical aberration, astigmatism, and distortion of the imaging lens shown in FIG. 10.

FIG. 11 shows the spherical aberration, the astigmatism, and the distortion in the imaging lens 1 of the FIFTH EXAMPLE.

According to the result, each of the spherical aberration, the astigmatism, and the distortion was almost satisfied. It can be seen from the result that a sufficient optical property can be obtained.

Sixth Example

Figure 12:
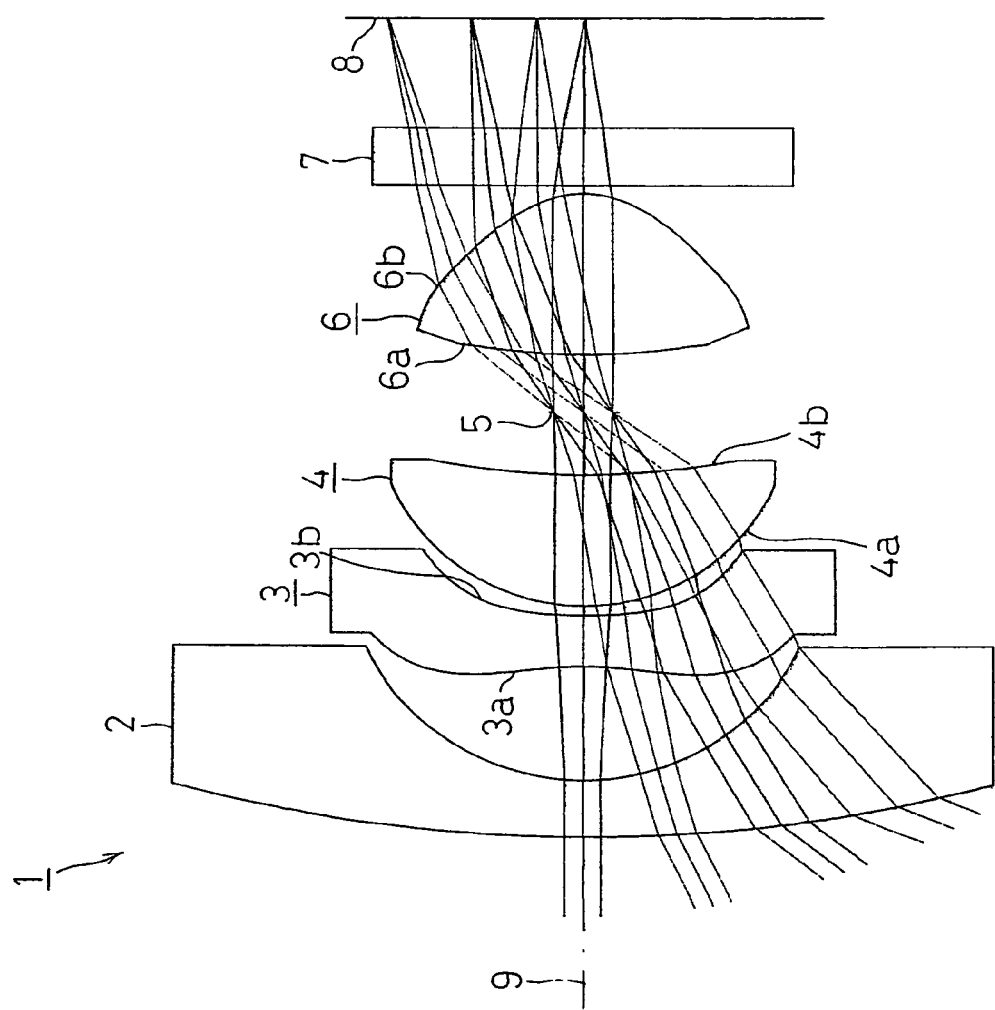
FIG. 12 is a schematic diagram for showing SIXTH EXAMPLE of the imaging lens according to the present invention.

FIG. 12 shows a SIXTH EXAMPLE of the present invention. In the SIXTH EXAMPLE as well, the cover glass serving as the filter 7 is disposed between the second face 6b of the fourth lens 6 and the imaging surface 8.

The imaging lens 1 of the SIXTH EXAMPLE was set under the following conditions:

Lens Data fl = 1.18 mm, f₂ = −4.44 mm, F no = 2.8, ω = 134°

| Face Number (Object Point) | r | d | nd | vd |
|---|---|---|---|---|
| 1 (First Face of First Lens) | 17.925 | 0.705 | 1.729 | 54.67 |
| 2 (Second Face of First Lens) | 2.739 | 1.404 | | |
| 3 (First Face of Second Lens) | −3.969 | 0.621 | 1.530 | 55.50 |
| 4 (Second Face of Second Lens) | 6.046 | 0.116 | | |
| 5 (First Face of Third Lens) | 2.392 | 1.616 | 1.847 | 23.78 |
| 6 (Second Face of Third Lens) | 8.973 | 0.768 | | |
| 7 (Diaphragm) | ∞ | 0.694 | | |
| 8 (First Face of Fourth Lens) | 5.556 | 1.975 | 1.530 | 55.50 |
| 9 (Second Face of Fourth Lens) | −1.067 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 5.06E-2 | −5.70E-3 | 6.49E-4 | −3.32E-5 | 1.31E-6 |
| 4 | 0.00 | 2.83E-2 | 9.37E-3 | −3.02E-3 | 7.74E-4 | −9.28E-5 |
| 8 | 0.00 | −4.41E-2 | 3.40E-2 | −1.18E-2 | 8.08E-4 | 0.00 |
| 9 | −0.91 | 3.55E-2 | −2.42E-4 | −9.71E-3 | 6.58E-3 | −1.18E-3 |

Under such conditions, $d_2/fl=1.19$ was achieved, thereby satisfying the expression (1). $d_4/fl=0.10$ was achieved, thereby satisfying the expression (2). $f_2/fl=-3.76$ was achieved, thereby satisfying the expression (3). $(r_5-r_6)/(r_5+$ $r_6$)=−0.58 was achieved, thereby satisfying the expression (4). $(r_8−r_9)/(r_8+r_9)$=1.48 was achieved, thereby satisfying the expression (5).

Figure 13:
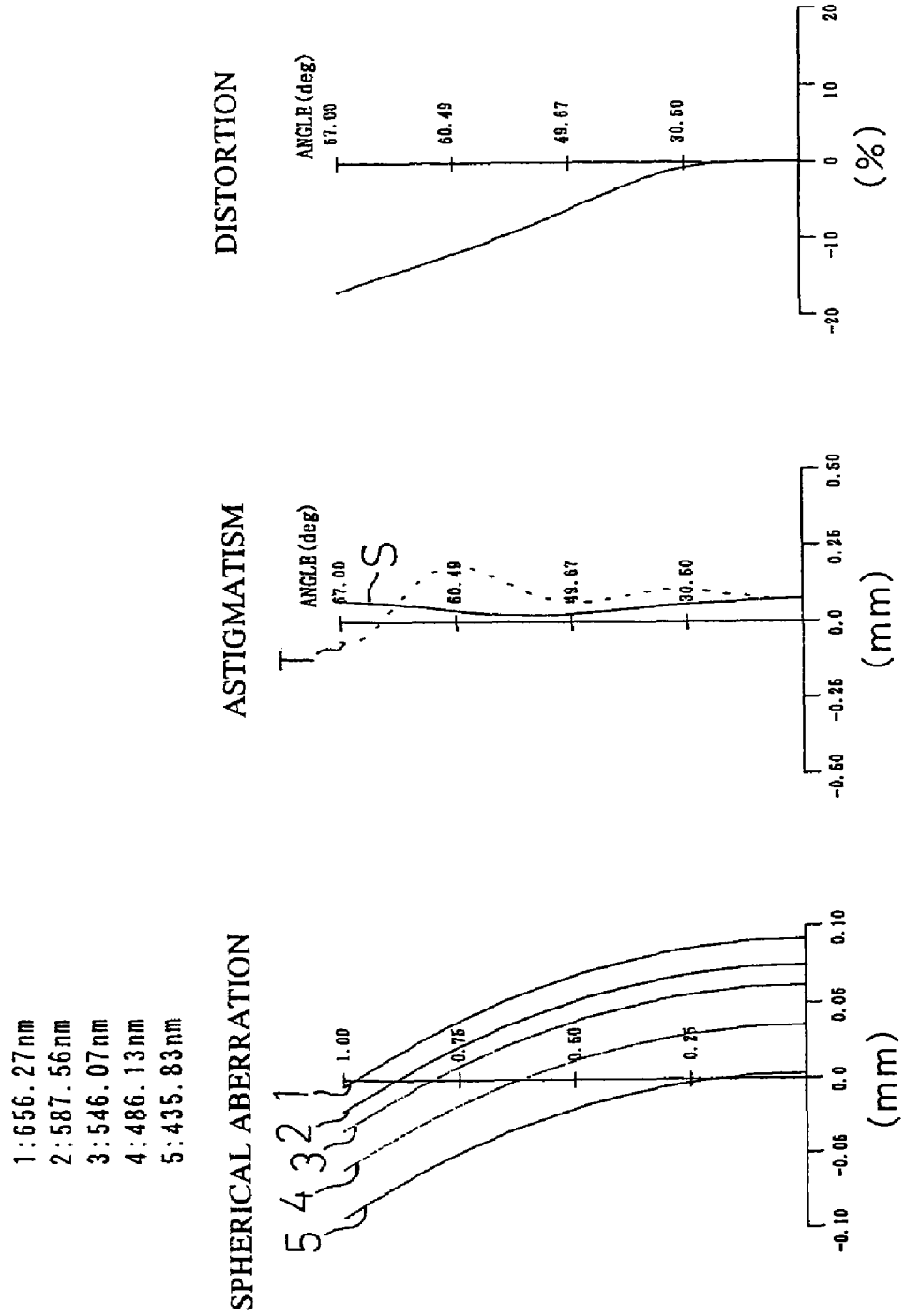
FIG. 13 shows graphs for describing the spherical aberration, astigmatism, and distortion of the imaging lens shown in FIG. 12.

FIG. 13 shows the spherical aberration, the astigmatism, and the distortion in the imaging lens 1 of the SIXTH EXAMPLE.

According to the result, each of the spherical aberration, the astigmatism, and the distortion was almost satisfied. It can be seen from the result that a sufficient optical property can be obtained.

Seventh Example

Figure 14:
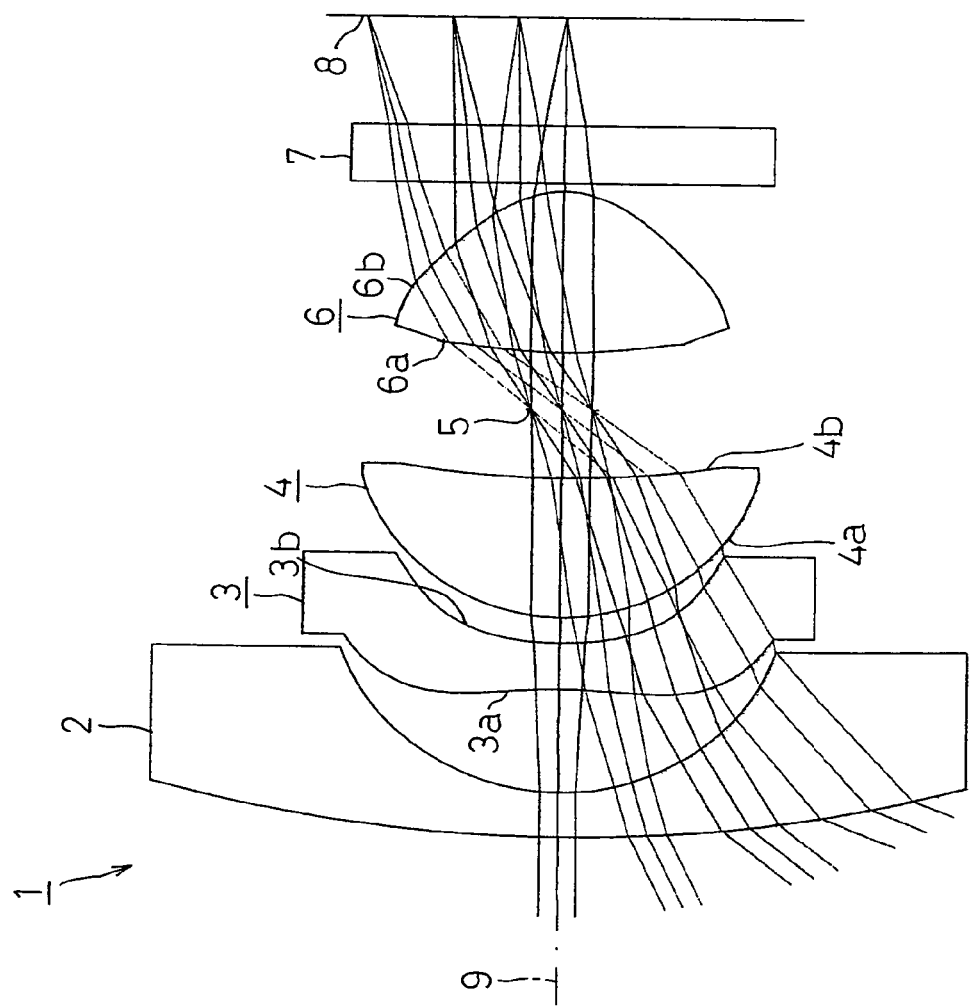
FIG. 14 is a schematic diagram for showing SEVENTH EXAMPLE of the imaging lens according to the present invention.

FIG. 14 shows a SEVENTH EXAMPLE of the present invention. In the SEVENTH EXAMPLE as well, the cover glass serving as the filter 7 is disposed between the second face 6b of the fourth lens 6 and the imaging surface 8.

The imaging lens 1 of the SEVENTH EXAMPLE was set under the following conditions:

Lens Data fl = 1.17 mm, $f_2$ = −4.06 mm, F no = 2.8, ω = 134°

| Face Number (Object Point) | r | d | nd | vd |
|---|---|---|---|---|
| 1 (First Face of First Lens) | 17.775 | 0.550 | 1.729 | 54.67 |
| 2 (Second Face of First Lens) | 2.675 | 1.292 | | |
| 3 (First Face of Second Lens) | −5.381 | 0.550 | 1.530 | 55.50 |
| 4 (Second Face of Second Lens) | 3.736 | 0.309 | | |
| 5 (First Face of Third Lens) | 2.392 | 1.692 | 1.847 | 23.78 |
| 6 (Second Face of Third Lens) | 11.591 | 0.818 | | |
| 7 (Diaphragm) | ∞ | 0.709 | | |
| 8 (First Face of Fourth Lens) | 5.042 | 1.979 | 1.530 | 55.50 |
| 9 (Second Face of Fourth Lens) | −1.121 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 4.41E−2 | −4.65E−3 | 6.01E−4 | −3.44E−5 | 1.67E−6 |
| 4 | 0.00 | 2.35E−2 | 8.76E−3 | −2.13E−3 | 8.35E−4 | −1.36E−4 |
| 8 | 0.00 | −4.88E−2 | 3.70E−2 | −1.32E−2 | 8.98E−4 | 0.00 |
| 9 | −0.91 | 3.37E−2 | 1.50E−3 | −1.04E−2 | 6.63E−3 | −1.19E−3 |

Under such conditions, $d_2$/fl=1.10 was achieved, thereby satisfying the expression (1). $d_4$/fl=0.26 was achieved, thereby satisfying the expression (2). $f_2$/fl=−3.47 was achieved, thereby satisfying the expression (3). $(r_5−r_6)/(r_5+r_6)$=−0.66 was achieved, thereby satisfying the expression (4). $(r_8−r_9)/(r_8+r_9)$=1.57 was achieved, thereby satisfying the expression (5).

Figure 15:
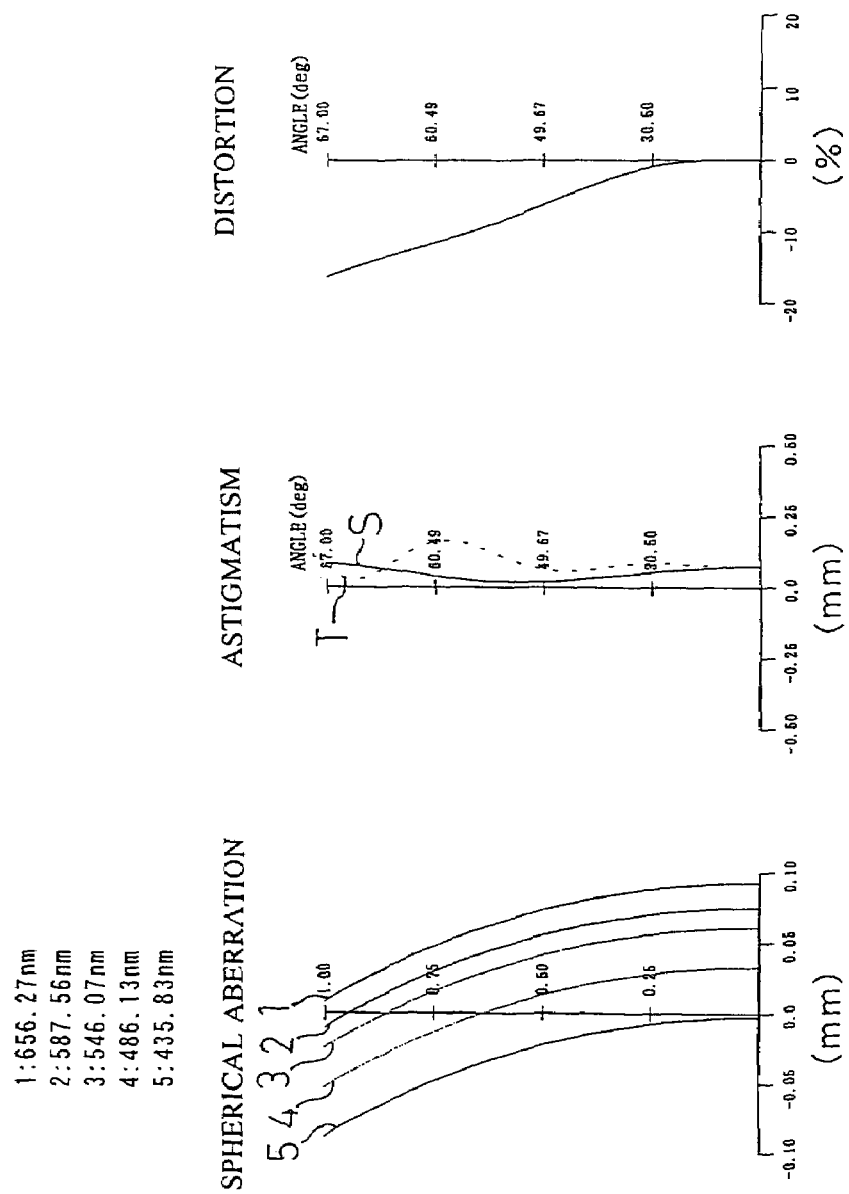
FIG. 15 shows graphs for describing the spherical aberration, astigmatism, and distortion of the imaging lens shown in FIG. 14.

FIG. 15 shows the spherical aberration, the astigmatism, and the distortion in the imaging lens 1 of the SEVENTH EXAMPLE.

According to the result, each of the spherical aberration, the astigmatism, and the distortion was almost satisfied. It can be seen from the result that a sufficient optical property can be obtained.

Eighth Example

Figure 16:
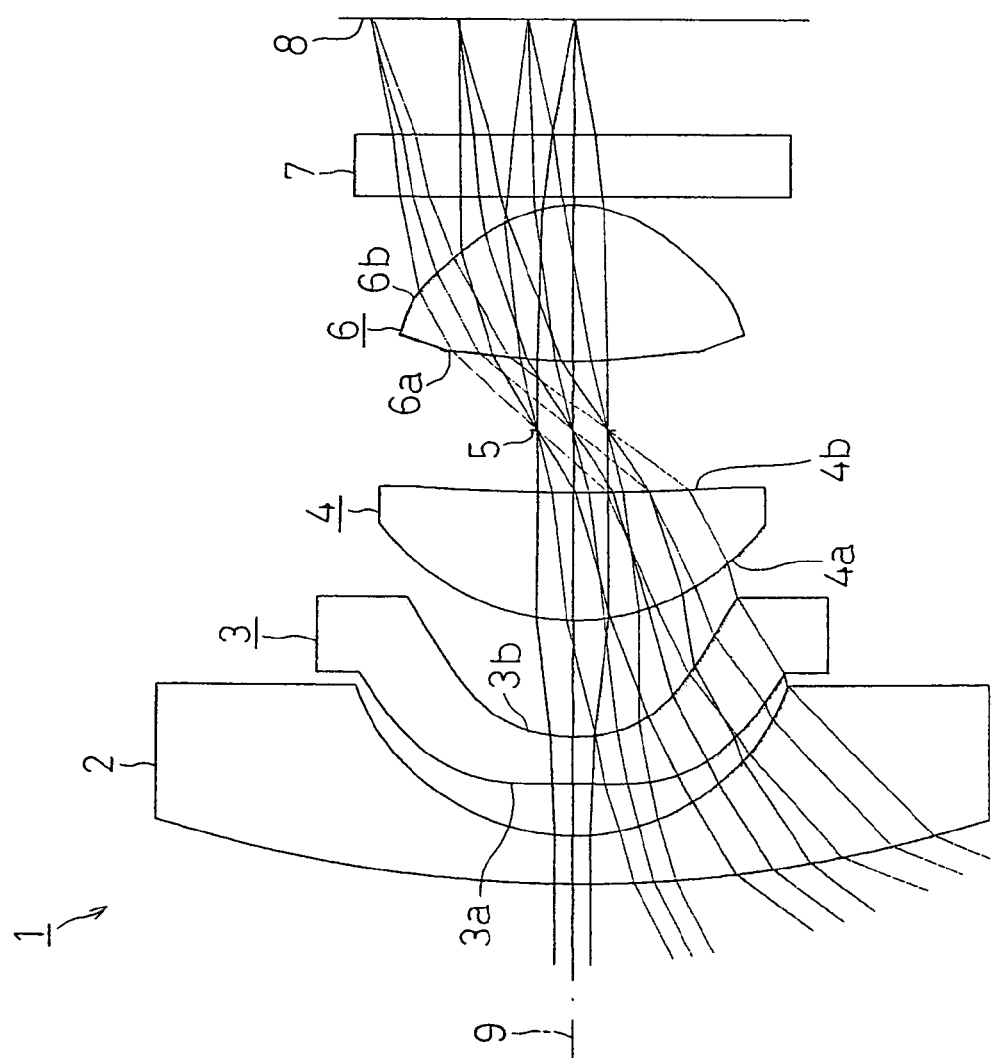
FIG. 16 is a schematic diagram for showing EIGHTH EXAMPLE of the imaging lens according to the present invention.

FIG. 16 shows a EIGHTH EXAMPLE of the present invention. In the EIGHTH EXAMPLE as well, the cover glass serving as the filter 7 is disposed between the second face 6b of the fourth lens 6 and the imaging surface 8.

The imaging lens 1 of the EIGHTH EXAMPLE was set under the following conditions:

Lens Data fl = 1.11 mm, $f_2$ = −3.41 mm, F no = 2.8, ω = 134°

| Face Number (Object Point) | r | d | nd | vd |
|---|---|---|---|---|
| 1 (First Face of First Lens) | 15.053 | 0.550 | 1.729 | 54.67 |
| 2 (Second Face of First Lens) | 2.518 | 0.605 | | |
| 3 (First Face of Second Lens) | −16.294 | 0.550 | 1.530 | 55.50 |
| 4 (Second Face of Second Lens) | 2.045 | 1.350 | | |
| 5 (First Face of Third Lens) | 2.638 | 1.469 | 1.847 | 23.78 |
| 6 (Second Face of Third Lens) | 26.349 | 0.741 | | |
| 7 (Diaphragm) | ∞ | 0.808 | | |
| 8 (First Face of Fourth Lens) | 4.132 | 1.827 | 1.530 | 55.50 |
| 9 (Second Face of Fourth Lens) | −1.367 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 9.37E−2 | −1.51E−2 | 1.08E−3 | 1.54E−4 | −2.36E−5 |
| 4 | 0.00 | 9.48E−2 | 3.61E−3 | −5.38E−3 | −3.26E−4 | 5.02E−5 |
| 8 | 0.00 | −9.34E−2 | 6.59E−2 | −2.36E−2 | 2.52E−3 | 0.00 |
| 9 | −0.77 | 2.71E−2 | −3.43E−3 | −9.05E−3 | 6.59E−3 | −1.19E−3 |

Under such conditions, $d_2$/fl=0.55 was achieved, thereby satisfying the expression (1). $d_4$/fl=1.22 was achieved, thereby satisfying the expression (2). $f_2$/fl=−3.07 was achieved, thereby satisfying the expression (3). $(r_5−r_6)/(r_5+r_6)$=−0.82 was achieved, thereby satisfying the expression (4). $(r_8−r_9)/(r_8+r_9)$=1.99 was achieved, thereby satisfying the expression (5).

Figure 17:
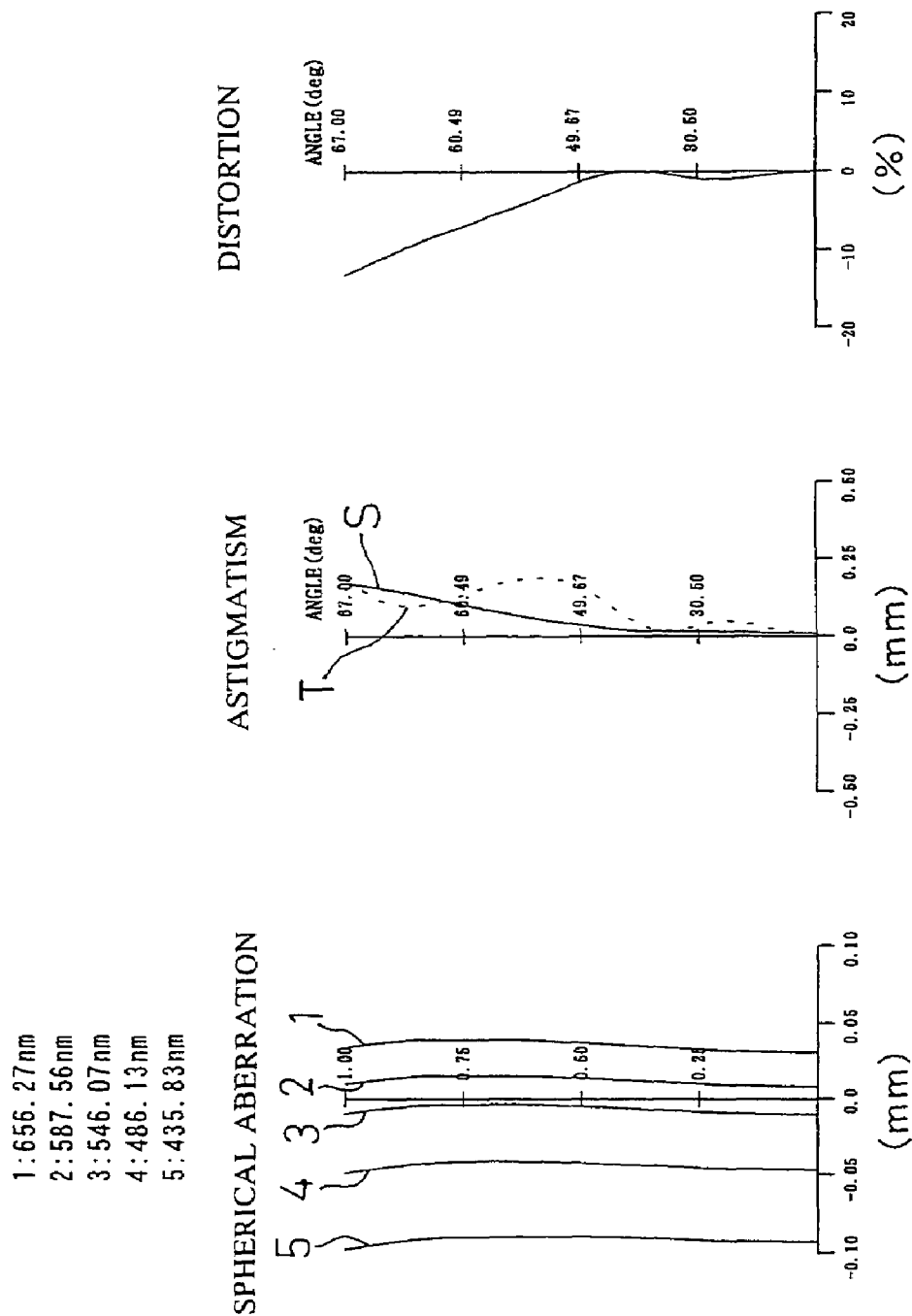
FIG. 17 shows graphs for describing the spherical aberration, astigmatism, and distortion of the imaging lens shown in FIG. 16.

FIG. 17 shows the spherical aberration, the astigmatism, and the distortion in the imaging lens 1 of the EIGHTH EXAMPLE.

According to the result, each of the spherical aberration, the astigmatism, and the distortion was almost satisfied. It can be seen from the result that a sufficient optical property can be obtained.

Ninth Example

Figure 18:
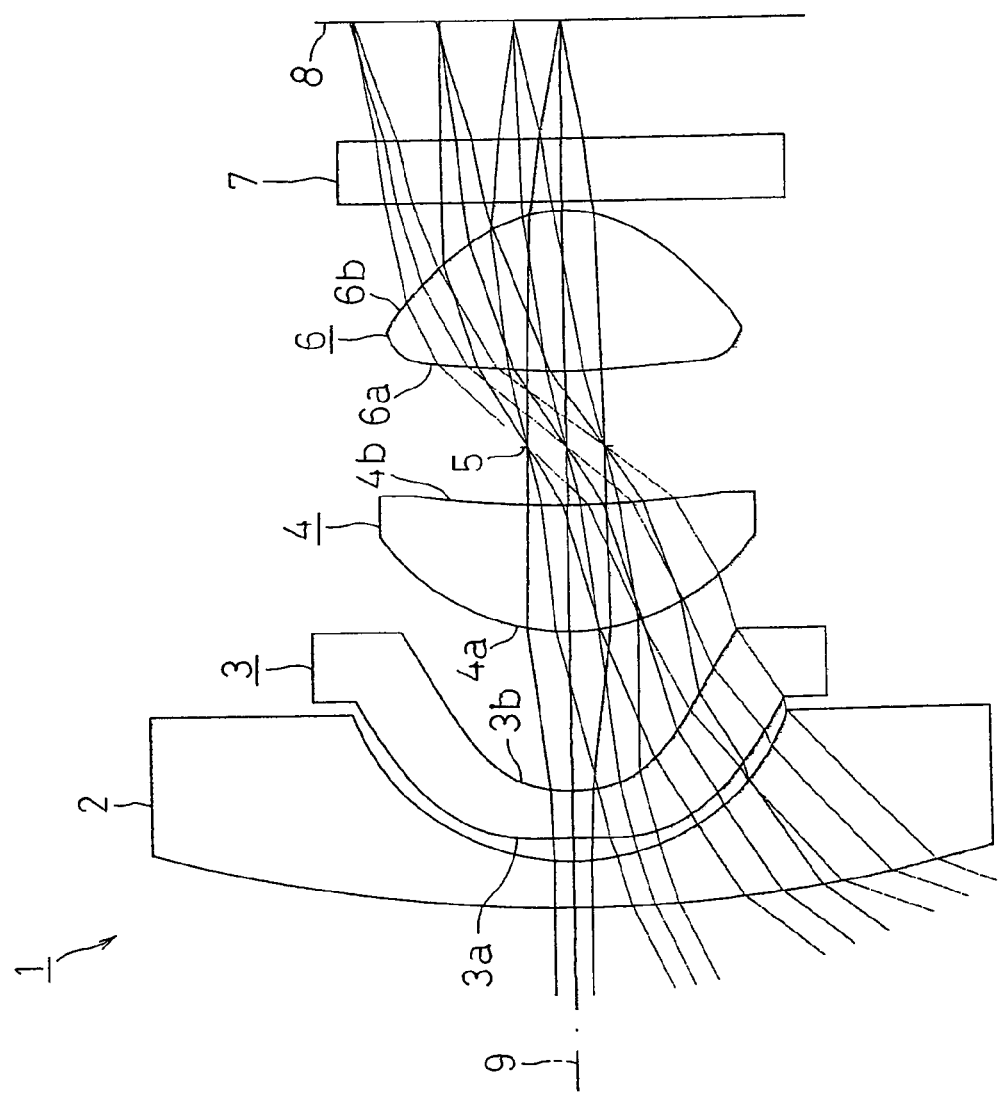
FIG. 18 is a schematic diagram for showing NINTH EXAMPLE of the imaging lens according to the present invention.

FIG. 18 shows a NINTH EXAMPLE of the present invention. In the NINTH EXAMPLE as well, the cover glass serving as the filter 7 is disposed between the second face 6b of the fourth lens 6 and the imaging surface 8.

The imaging lens 1 of the NINTH EXAMPLE was set under the following conditions:

Lens Data fl = 1.11 mm, $f_2$ = −3.25 mm, F no = 2.8, ω = 134°

| Face Number (Object Point) | r | d | nd | vd |
|---|---|---|---|---|
| 1 (First Face of First Lens) | 15.591 | 0.550 | 1.729 | 54.67 |
| 2 (Second Face of First Lens) | 2.445 | 0.270 | | |
| 3 (First Face of Second Lens) | −13.883 | 0.550 | 1.530 | 55.50 |
| 4 (Second Face of Second Lens) | 2.005 | 1.786 | | |
| 5 (First Face of Third Lens) | 2.412 | 1.425 | 1.847 | 23.78 |
| 6 (Second Face of Third Lens) | 12.150 | 0.653 | | |
| 7 (Diaphragm) | ∞ | 0.867 | | |

-continued

| | r | d | nd | vd |
|---|---|---|---|---|
| 8 (First Face of Fourth Lens) | 4.293 | 1.798 | 1.530 | 55.50 |
| 9 (Second Face of Fourth Lens) | −1.455 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 1.75E−1 | −4.89E−2 | 9.13E−3 | −9.52E−4 | 4.12E−5 |
| 4 | 0.00 | 2.46E−1 | −4.29E−2 | −1.73E−2 | 6.33E−3 | −6.96E−4 |
| 8 | 0.00 | −1.15E−1 | 8.46E−2 | −3.25E−2 | 4.97E−3 | 0.00 |
| 9 | −0.54 | −2.68E−3 | 2.12E−2 | −1.69E−2 | 7.22E−3 | −9.81E−4 |

Under such conditions, $d_2/fl=0.24$ was achieved, thereby satisfying the expression (1). $d_4/fl=1.60$ was achieved, thereby satisfying the expression (2). $f_2/fl=-2.93$ was achieved, thereby satisfying the expression (3). $(r_5-r_6)/(r_5+r_6)=-0.67$ was achieved, thereby satisfying the expression (4). $(r_8-r_9)/(r_8+r_9)=2.03$ was achieved, thereby satisfying the expression (5).

Figure 19:
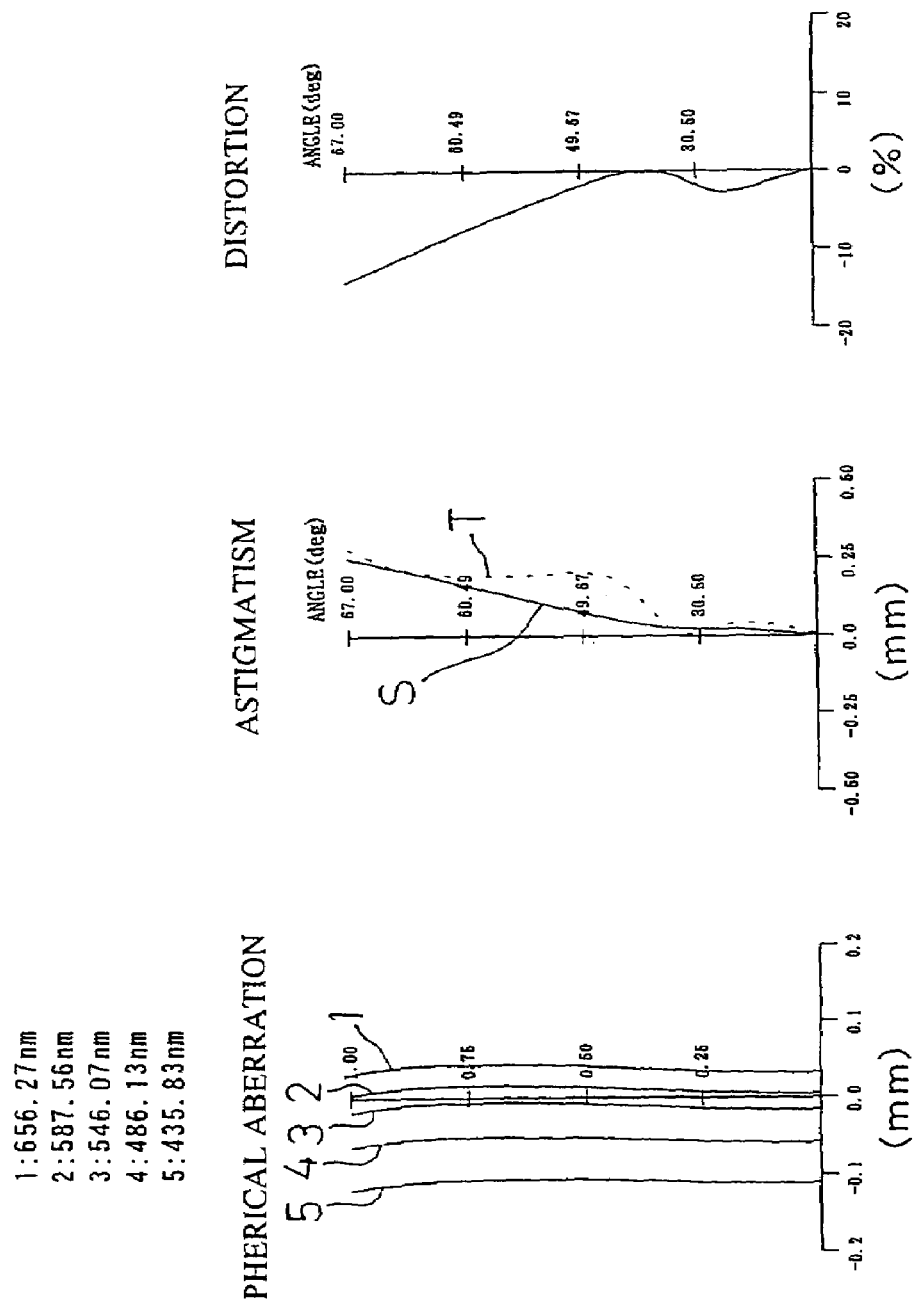
FIG. 19 shows graphs for describing the spherical aberration, astigmatism, and distortion of the imaging lens shown in FIG. 18.

FIG. 19 shows the spherical aberration, the astigmatism, and the distortion in the imaging lens 1 of the NINTH EXAMPLE.

According to the result, each of the spherical aberration, the astigmatism, and the distortion was almost satisfied. It can be seen from the result that a sufficient optical property can be obtained.

Tenth Example

Figure 20:
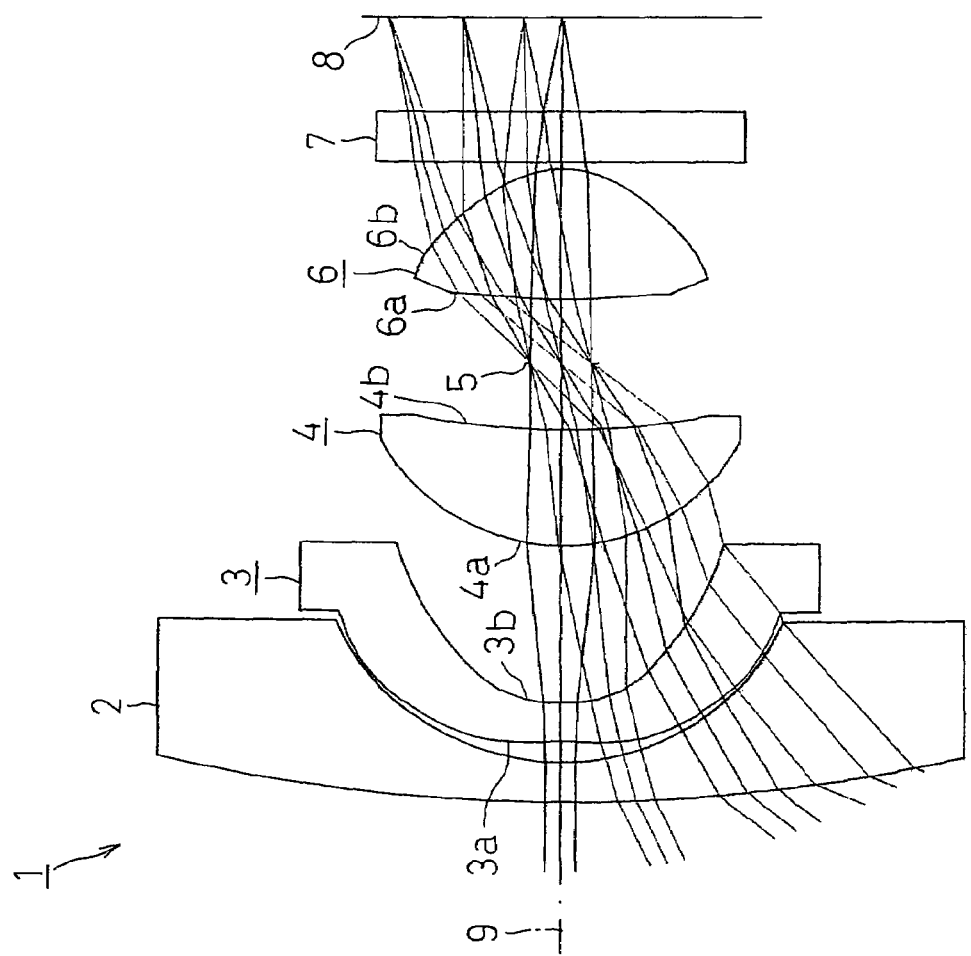
FIG. 20 is a schematic diagram for showing TENTH EXAMPLE of the imaging lens according to the present invention.

FIG. 20 shows a TENTH EXAMPLE of the present invention. In the TENTH EXAMPLE as well, the cover glass serving as the filter 7 is disposed between the second face 6b of the fourth lens 6 and the imaging surface 8.

The imaging lens 1 of the TENTH EXAMPLE was set under the following conditions:

Lens Data fl = 1.13 mm, $f_2$ = −3.60 mm, F no = 2.8, ω = 134°

| Face Number (Object Point) | r | d | nd | vd |
|---|---|---|---|---|
| 1 (First Face of First Lens) | 24.036 | 0.550 | 1.729 | 54.67 |
| 2 (Second Face of First Lens) | 3.226 | 0.289 | | |
| 3 (First Face of Second Lens) | −9.507 | 0.550 | 1.530 | 55.50 |
| 4 (Second Face of Second Lens) | 2.442 | 2.193 | | |
| 5 (First Face of Third Lens) | 2.646 | 1.652 | 1.847 | 23.78 |
| 6 (Second Face of Third Lens) | 9.798 | 0.933 | | |
| 7 (Diaphragm) | ∞ | 0.883 | | |
| 8 (First Face of Fourth Lens) | 5.593 | 1.850 | 1.530 | 55.50 |
| 9 (Second Face of Fourth Lens) | −1.361 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 1.05E−1 | −2.52E−2 | 3.33E−3 | −2.29E−4 | 7.74E−6 |
| 4 | 0.00 | 1.23E−1 | −9.82E−3 | −1.46E−2 | 4.48E−3 | −3.68E−4 |
| 8 | 0.00 | −6.97E−2 | 4.95E−2 | −1.87E−2 | 2.31E−3 | 0.00 |
| 9 | −1.16 | −1.43E−2 | 1.65E−2 | −1.62E−2 | 6.83E−3 | −9.96E−4 |

Under such conditions, $d_2/fl=0.26$ was achieved, thereby satisfying the expression (1). $d_4/fl=1.94$ was achieved, thereby satisfying the expression (2). $f_2/fl=-3.19$ was achieved, thereby satisfying the expression (3). $(r_5-r_6)/(r_5+r_6)=-0.57$ was achieved, thereby satisfying the expression (4). $(r_8-r_9)/(r_8+r_9)=1.64$ was achieved, thereby satisfying the expression (5).

Figure 21:
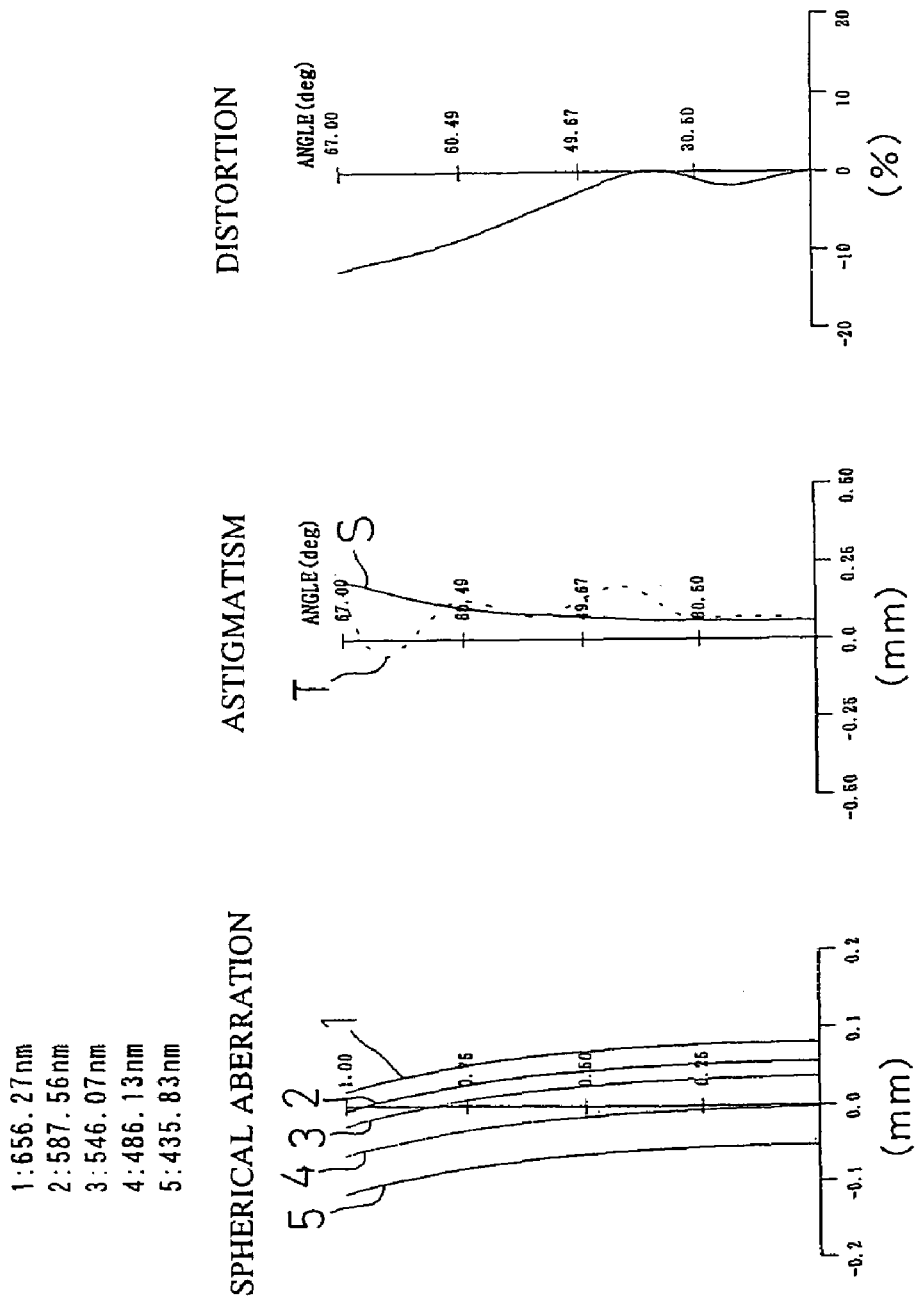
FIG. 21 shows graphs for describing the spherical aberration, astigmatism, and distortion of the imaging lens shown in FIG. 20.

FIG. 21 shows the spherical aberration, the astigmatism, and the distortion in the imaging lens 1 of the TENTH EXAMPLE.

According to the result, each of the spherical aberration, the astigmatism, and the distortion was almost satisfied. It can be seen from the result that a sufficient optical property can be obtained.

Eleventh Example

Figure 22:
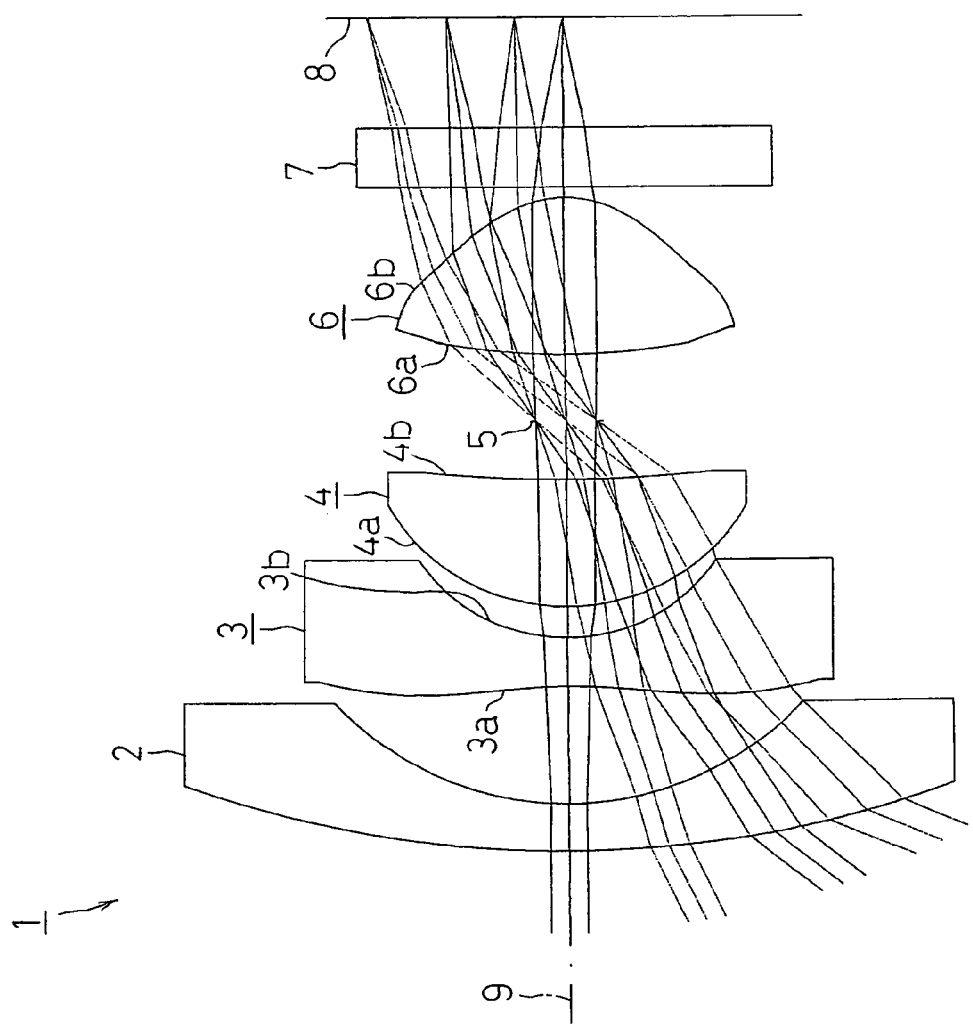
FIG. 22 is a schematic diagram for showing ELEVENTH EXAMPLE of the imaging lens according to the present invention.

FIG. 22 shows a ELEVENTH EXAMPLE of the present invention. In the ELEVENTH EXAMPLE as well, the cover glass serving as the filter 7 is disposed between the second face 6b of the fourth lens 6 and the imaging surface 8.

The imaging lens 1 of the ELEVENTH EXAMPLE was set under the following conditions:

Lens Data fl = 1.16 mm, $f_2$ = −2.69 mm, F no = 2.8, ω = 134°

| Face Number (Object Point) | r | d | nd | vd |
|---|---|---|---|---|
| 1 (First Face of First Lens) | 13.064 | 0.550 | 1.729 | 54.67 |
| 2 (Second Face of First Lens) | 3.567 | 1.410 | | |
| 3 (First Face of Second Lens) | −5.438 | 0.589 | 1.530 | 55.50 |
| 4 (Second Face of Second Lens) | 2.016 | 0.367 | | |
| 5 (First Face of Third Lens) | 2.332 | 1.535 | 1.847 | 23.78 |
| 6 (Second Face of Third Lens) | 15.773 | 0.707 | | |
| 7 (Diaphragm) | ∞ | 0.797 | | |
| 8 (First Face of Fourth Lens) | 5.745 | 1.897 | 1.530 | 55.50 |
| 9 (Second Face of Fourth Lens) | −1.093 | 0.120 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 3.09E−2 | −5.33E−3 | 7.52E−4 | −6.38E−5 | 2.28E−6 |
| 4 | 0.00 | −8.27E−3 | 6.18E−3 | −1.51E−3 | 5.02E−4 | −1.24E−4 |
| 8 | 0.00 | −4.75E−2 | 4.14E−2 | −1.49E−2 | 1.52E−3 | 0.00 |
| 9 | −0.92 | 2.87E−2 | 3.65E−3 | −9.93E−3 | 6.68E−3 | −1.19E−3 |

Under such conditions, $d_2/fl=1.21$ was achieved, thereby satisfying the expression (1). $d_4/fl=0.32$ was achieved, thereby satisfying the expression (2). $f_2/fl=-2.32$ was achieved, thereby satisfying the expression (3). $(r_5-r_6)/(r_5+r_6)=-0.74$ was achieved, thereby satisfying the expression (4). $(r_8-r_9)/(r_8+r_9)=1.47$ was achieved, thereby satisfying the expression (5).

Figure 23:
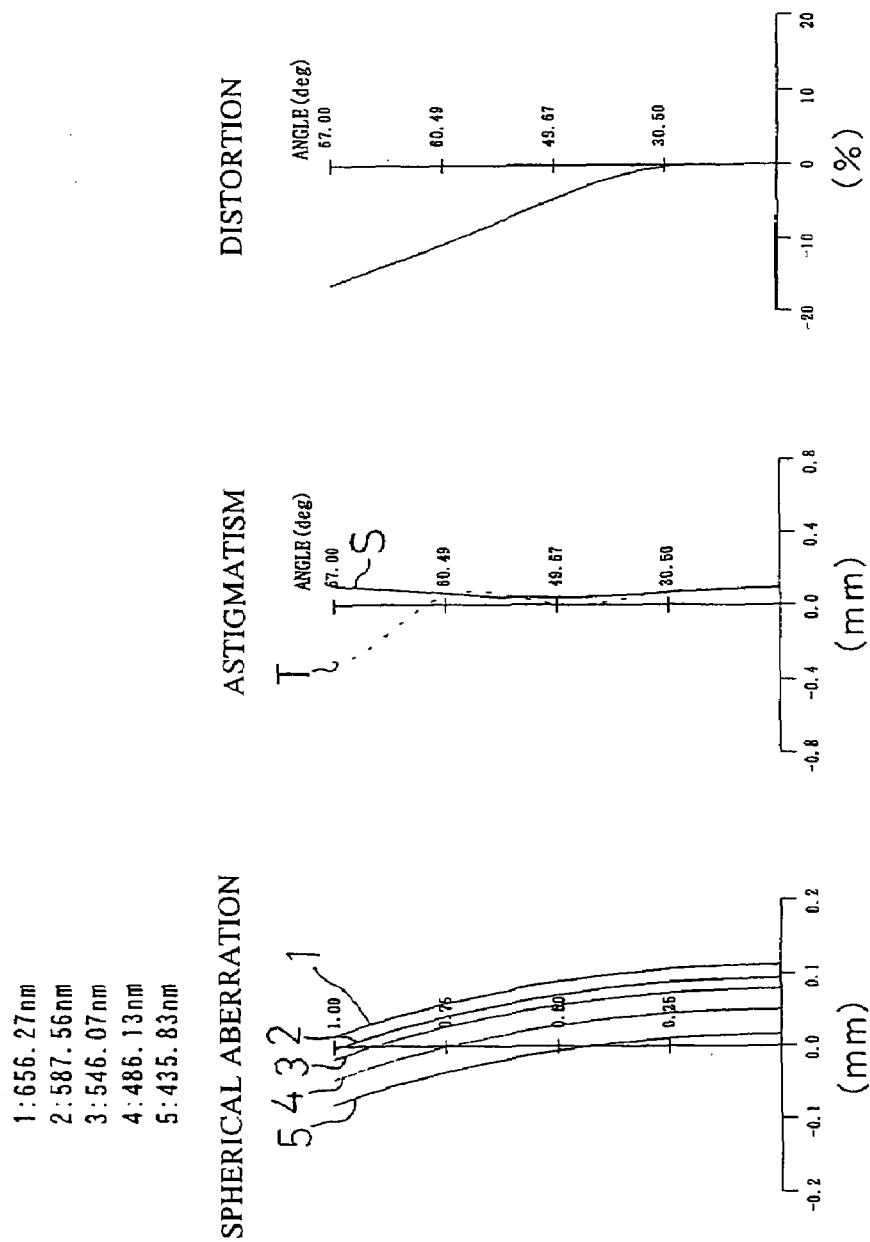
FIG. 23 shows graphs for describing the spherical aberration, astigmatism, and distortion of the imaging lens shown in FIG. 22.

FIG. 23 shows the spherical aberration, the astigmatism, and the distortion in the imaging lens 1 of the ELEVENTH EXAMPLE.

According to the result, each of the spherical aberration, the astigmatism, and the distortion was almost satisfied. It can be seen from the result that a sufficient optical property can be obtained.

Twelfth Example

Figure 24:
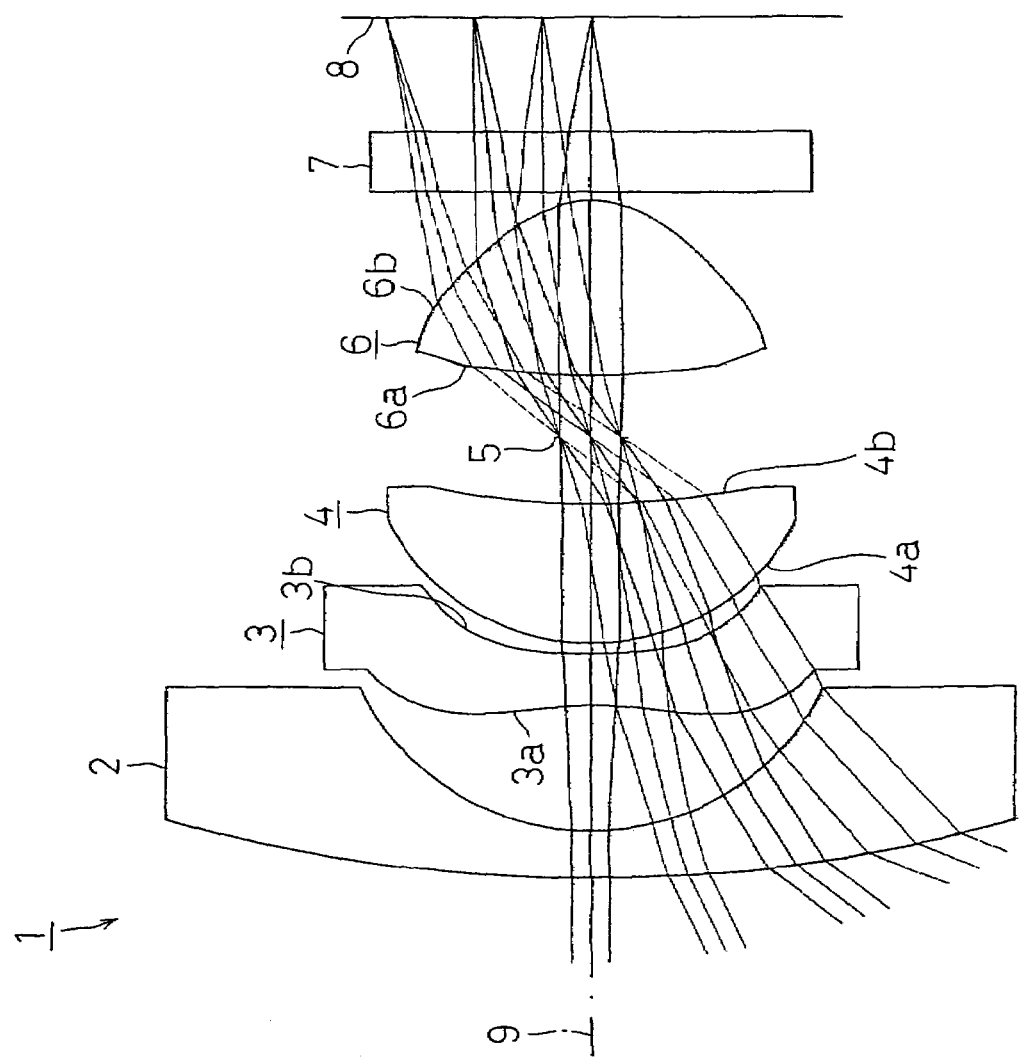
FIG. 24 is a schematic diagram for showing TWELFTH EXAMPLE of the imaging lens according to the present invention.

FIG. 24 shows a TWELFTH EXAMPLE of the present invention. In the TWELFTH EXAMPLE as well, the cover glass serving as the filter 7 is disposed between the second face 6b of the fourth lens 6 and the imaging surface 8.

The imaging lens 1 of the TWELFTH EXAMPLE was set under the following conditions:

Lens Data $fl = 1.17$ mm, $f_2 = -4.60$ mm, F no = 2.8, $\omega = 134°$

| Face Number (Object Point) | r | d | nd | vd |
|---|---|---|---|---|
| 1 (First Face of First Lens) | 16.855 | 0.550 | 1.729 | 54.67 |
| 2 (Second Face of First Lens) | 2.779 | 1.469 | | |
| 3 (First Face of Second Lens) | −3.969 | 0.610 | 1.530 | 55.50 |
| 4 (Second Face of Second Lens) | 6.702 | 0.123 | | |
| 5 (First Face of Third Lens) | 2.461 | 1.630 | 1.847 | 23.78 |
| 6 (Second Face of Third Lens) | 8.636 | 0.773 | | |
| 7 (Diaphragm) | ∞ | 0.718 | | |
| 8 (First Face of Fourth Lens) | 5.493 | 2.010 | 1.530 | 55.50 |
| 9 (Second Face of Fourth Lens) | −1.070 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 5.06E−2 | −5.71E−3 | 6.50E−4 | −3.32E−5 | 1.31E−6 |
| 4 | 0.00 | 2.83E−2 | 9.36E−3 | −3.02E−3 | 7.73E−4 | −9.28E−5 |
| 8 | 0.00 | −4.38E−2 | 3.38E−2 | −1.18E−2 | 8.28E−4 | 0.00 |
| 9 | −0.91 | 3.55E−2 | −2.42E−4 | −9.71E−3 | 6.58E−3 | −1.18E−3 |

Under such conditions, $d_2/fl=1.25$ was achieved, thereby satisfying the expression (1). $d_4/fl=0.10$ was achieved, thereby satisfying the expression (2). $f_2/fl=-3.93$ was achieved, thereby satisfying the expression (3). $(r_5-r_6)/(r_5+r_6)=-0.56$ was achieved, thereby satisfying the expression (4). $(r_8-r_9)/(r_8+r_9)=1.48$ was achieved, thereby satisfying the expression (5).

Figure 25:
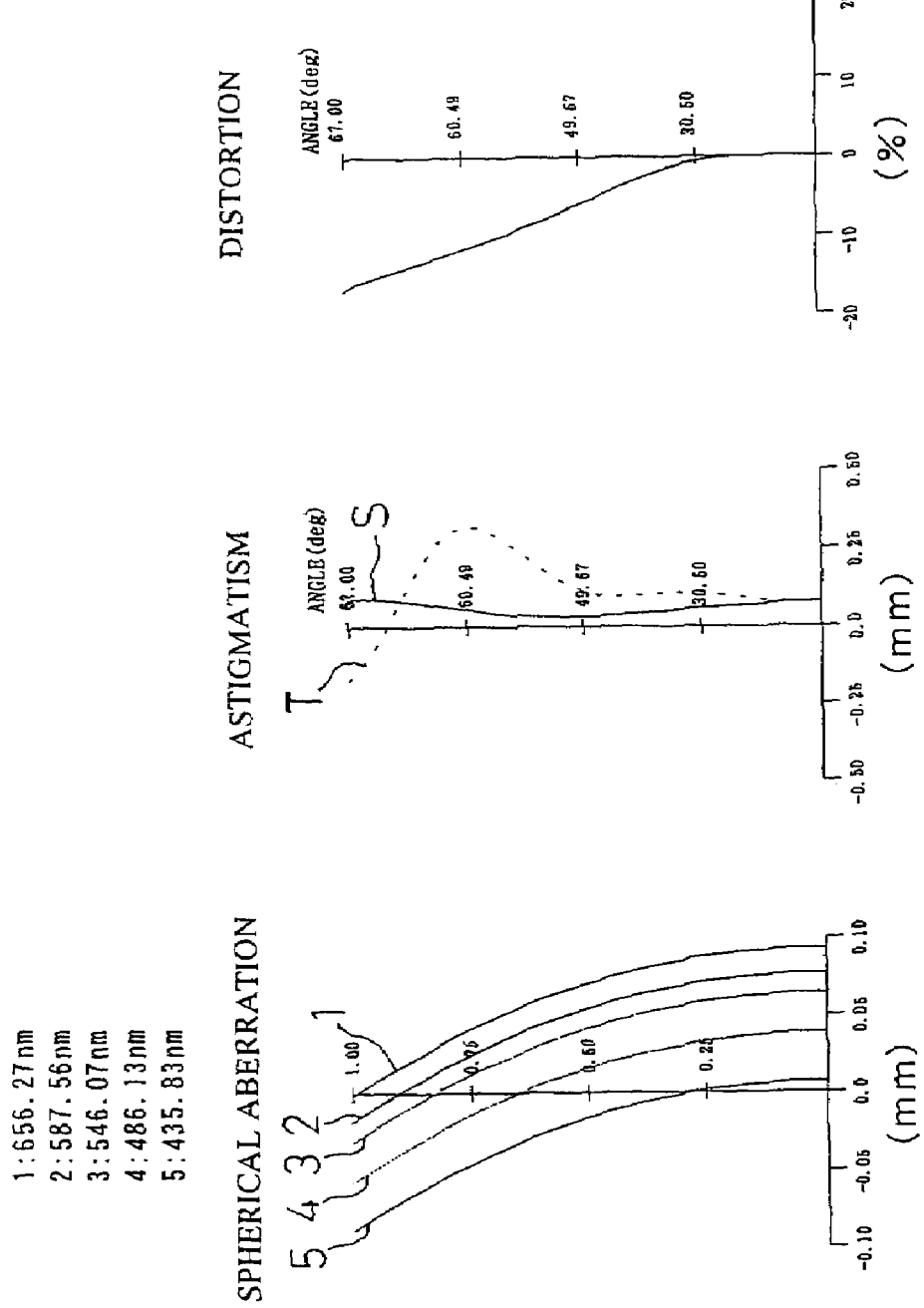
FIG. 25 shows graphs for describing the spherical aberration, astigmatism, and distortion of the imaging lens shown in FIG. 24.

FIG. 25 shows the spherical aberration, the astigmatism, and the distortion in the imaging lens 1 of the TWELFTH EXAMPLE.

According to the result, each of the spherical aberration, the astigmatism, and the distortion was almost satisfied. It can be seen from the result that a sufficient optical property can be obtained.

Thirteenth Example

Figure 26:
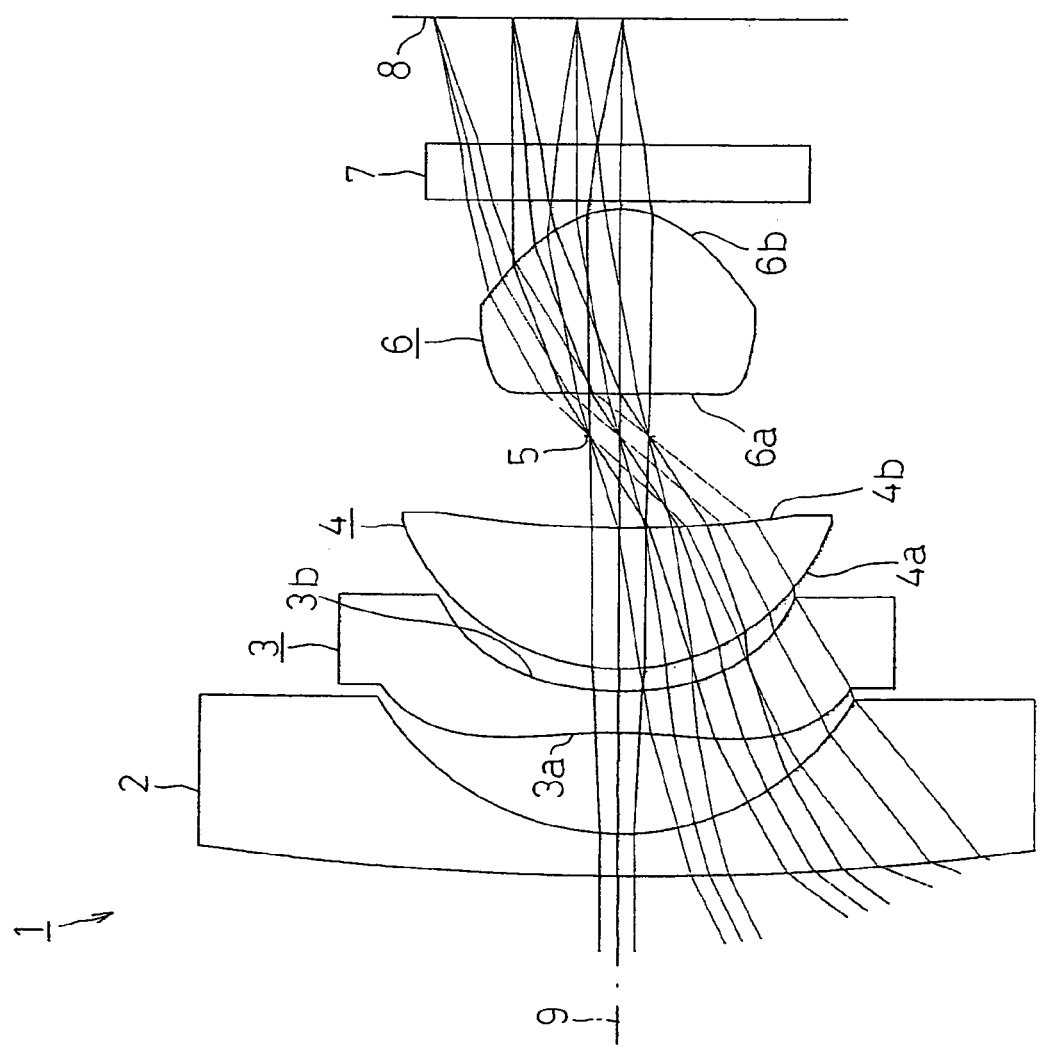
FIG. 26 is a schematic diagram for showing THIRTEENTH EXAMPLE of the imaging lens according to the present invention.

FIG. 26 shows a THIRTEENTH EXAMPLE of the present invention. In the THIRTEENTH EXAMPLE as well, the cover glass serving as the filter 7 is disposed between the second face 6b of the fourth lens 6 and the imaging surface 8.

The imaging lens 1 of the THIRTEENTH EXAMPLE was set under the following conditions:

Lens Data $fl = 1.18$ mm, $f_2 = -4.34$ mm, F no = 2.8, $\omega = 134°$

| Face Number (Object Point) | r | d | nd | vd |
|---|---|---|---|---|
| 1 (First Face of First Lens) | 36.954 | 0.550 | 1.729 | 54.67 |
| 2 (Second Face of First Lens) | 3.267 | 1.308 | | |
| 3 (First Face of Second Lens) | −6.237 | 0.550 | 1.530 | 55.50 |
| 4 (Second Face of Second Lens) | 3.746 | 0.281 | | |
| 5 (First Face of Third Lens) | 2.756 | 1.807 | 1.847 | 23.78 |
| 6 (Second Face of Third Lens) | 13.367 | 1.201 | | |
| 7 (Diaphragm) | ∞ | 0.537 | | |
| 8 (First Face of Fourth Lens) | 14.378 | 2.383 | 1.530 | 55.50 |
| 9 (Second Face of Fourth Lens) | −1.092 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 2.92E−2 | −4.06E−3 | 5.96E−4 | −4.38E−5 | 1.67E−6 |
| 4 | 0.00 | 5.01E−3 | 8.10E−3 | −3.43E−3 | 8.11E−4 | −6.10E−5 |
| 8 | 0.00 | −8.03E−2 | 9.82E−2 | −6.97E−2 | 1.96E−2 | 0.00 |
| 9 | −0.89 | 6.91E−3 | 2.79E−2 | −2.61E−2 | 9.46E−3 | −1.19E−3 |

Under such conditions, $d_2/fl=1.11$ was achieved, thereby satisfying the expression (1). $d_4/fl=0.24$ was achieved, thereby satisfying the expression (2). $f_2/fl=-3.68$ was achieved, thereby satisfying the expression (3). $(r_5-r_6)/(r_5+r_6)=-0.66$ was achieved, thereby satisfying the expression (4). $(r_8-r_9)/(r_8+r_9)=1.16$ was achieved, thereby satisfying the expression (5).

FIG. 27 shows the spherical aberration, the astigmatism, and the distortion in the imaging lens 1 of the THIRTEENTH EXAMPLE.

According to the result, each of the spherical aberration, the astigmatism, and the distortion was almost satisfied. It can be seen from the result that a sufficient optical property can be obtained.

Fourteenth Example

Figure 28:
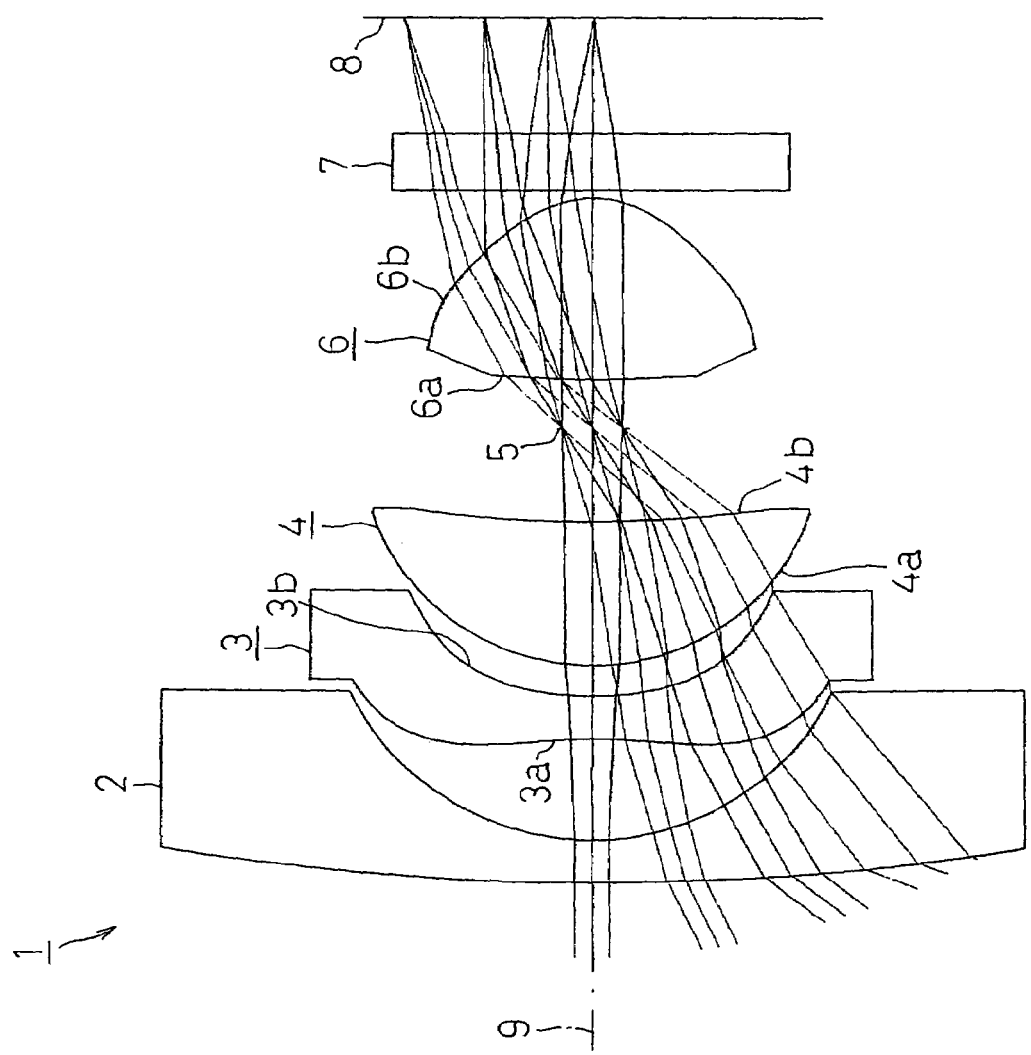
FIG. 28 is a schematic diagram for showing FOURTEENTH EXAMPLE of the imaging lens according to the present invention.

FIG. 28 shows a FOURTEENTH EXAMPLE of the present invention. In the FOURTEENTH EXAMPLE as well, the cover glass serving as the filter 7 is disposed between the second face 6b of the fourth lens 6 and the imaging surface 8.

The imaging lens 1 of the FOURTEENTH EXAMPLE was set under the following conditions:

Lens Data $fl = 1.18$ mm, $f_2 = -4.37$ mm, F no = 2.8, $\omega = 134°$

| Face Number (Object Point) | r | d | nd | vd |
|---|---|---|---|---|
| 1 (First Face of First Lens) | 31.887 | 0.550 | 1.729 | 54.67 |
| 2 (Second Face of First Lens) | 3.188 | 1.293 | | |
| 3 (First Face of Second Lens) | −5.851 | 0.550 | 1.530 | 55.50 |
| 4 (Second Face of Second Lens) | 3.942 | 0.396 | | |
| 5 (First Face of Third Lens) | 2.773 | 1.824 | 1.847 | 23.78 |
| 6 (Second Face of Third Lens) | 15.071 | 1.195 | | |
| 7 (Diaphragm) | ∞ | 0.617 | | |
| 8 (First Face of Fourth Lens) | 7.675 | 2.318 | 1.530 | 55.50 |
| 9 (Second Face of Fourth Lens) | −1.125 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 3.15E−2 | −3.95E−3 | 5.63E−4 | −4.01E−5 | 1.51E−6 |
| 4 | 0.00 | 1.26E−2 | 6.45E−3 | −2.96E−3 | 8.31E−4 | −7.34E−5 |
| 8 | 0.00 | −5.32E−2 | 5.10E−2 | −2.51E−2 | 2.27E−3 | 0.00 |
| 9 | −0.90 | 2.27E−2 | 1.36−E2 | −1.80E−2 | 8.00E−3 | −1.19E−3 |

Under such conditions, $d_2/fl=1.10$ was achieved, thereby satisfying the expression (1). $d_4/fl=0.34$ was achieved, thereby satisfying the expression (2). $f_2/fl=-3.70$ was achieved, thereby satisfying the expression (3). $(r_5-r_6)/(r_5+r_6)=-0.69$ was achieved, thereby satisfying the expression (4). $(r_8-r_9)/(r_8+r_9)=1.34$ was achieved, thereby satisfying the expression (5).

Figure 29:
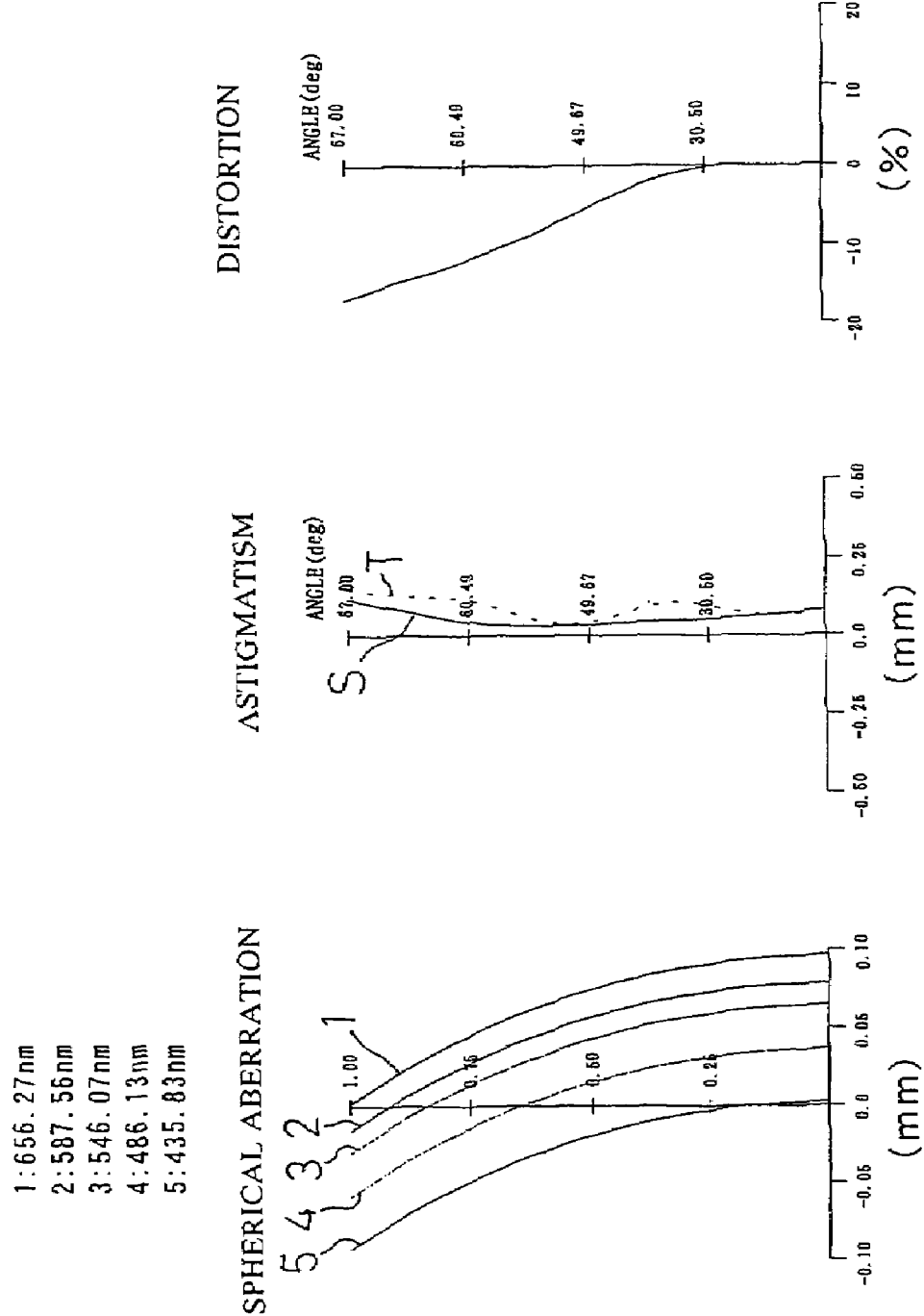
FIG. 29 shows graphs for describing the spherical aberration, astigmatism, and distortion of the imaging lens shown in FIG. 28.

FIG. 29 shows the spherical aberration, the astigmatism, and the distortion in the imaging lens 1 of the FOURTEENTH EXAMPLE.

According to the result, each of the spherical aberration, the astigmatism, and the distortion was almost satisfied. It can be seen from the result that a sufficient optical property can be obtained.

Fifteenth Example

Figure 30:
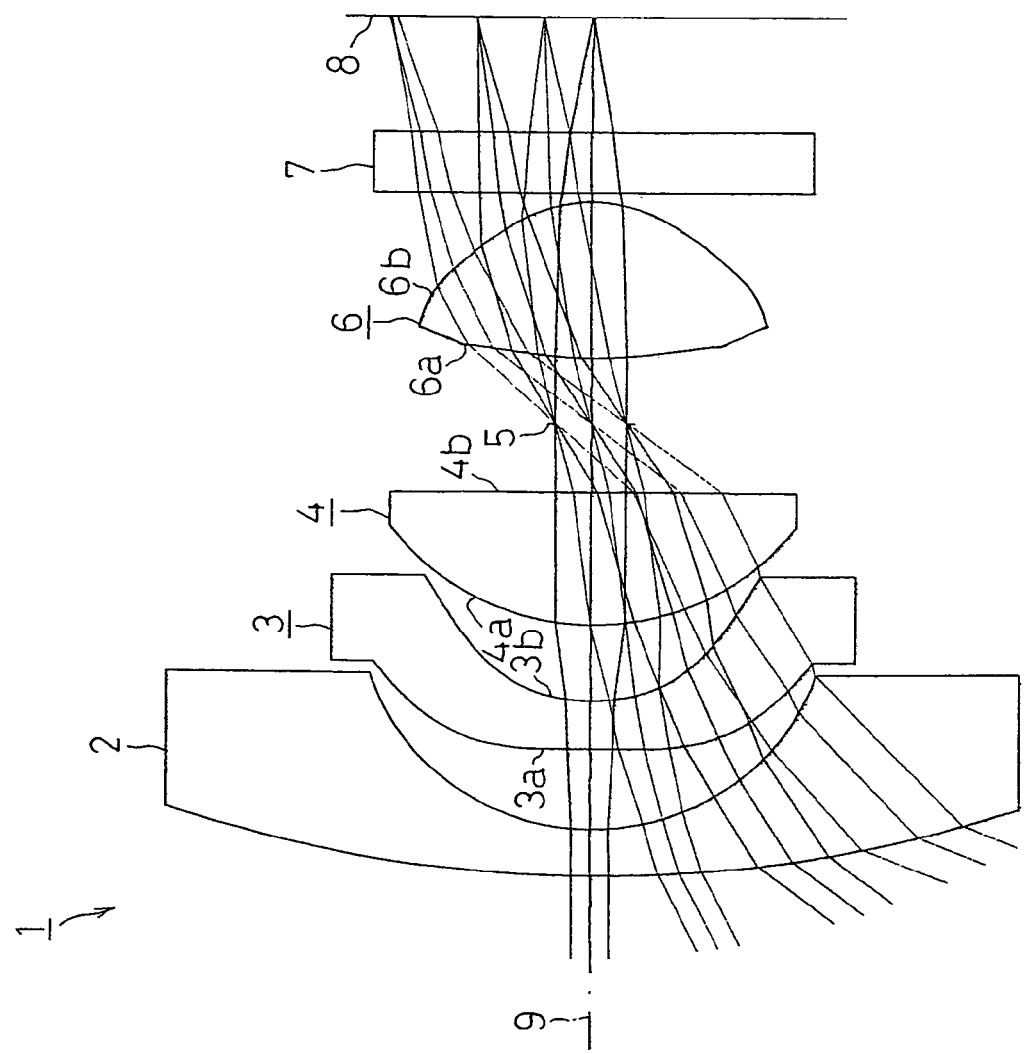
FIG. 30 is a schematic diagram for showing FIFTEENTH EXAMPLE of the imaging lens according to the present invention.

FIG. 30 shows a FIFTEENTH EXAMPLE of the present invention. In the FIFTEENTH EXAMPLE as well, the cover glass serving as the filter 7 is disposed between the second face 6b of the fourth lens 6 and the imaging surface 8.

The imaging lens 1 of the FIFTEENTH EXAMPLE was set under the following conditions:

| Lens Data | | | | |
|---|---|---|---|---|
| fl = 1.18 mm, $f_2$ = −3.55 mm, F no = 2.8, ω = 134° | | | | |
| Face Number (Object Point) | r | d | nd | νd |
| 1 (First Face of First Lens) | 14.634 | 0.550 | 1.729 | 54.67 |
| 2 (Second Face of First Lens) | 2.603 | 0.946 | | |
| 3 (First Face of Second Lens) | −22.070 | 0.550 | 1.530 | 55.50 |
| 4 (Second Face of Second Lens) | 2.069 | 0.891 | | |
| 5 (First Face of Third Lens) | 2.801 | 1.541 | 1.847 | 23.78 |
| 6 (Second Face of Third Lens) | −255.358 | 0.808 | | |
| 7 (Diaphragm) | ∞ | 0.783 | | |
| 8 (First Face of Fourth Lens) | 3.705 | 1.833 | 1.530 | 55.50 |
| 9 (Second Face of Fourth Lens) | −1.393 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 6.30E−2 | −1.13E−2 | 1.68E−3 | −1.29E−4 | 3.33E−6 |
| 4 | 0.00 | 4.39E−2 | 1.20E−2 | −6.45E−3 | 6.74E−4 | −8.88E−5 |
| 8 | 0.00 | −7.60E−2 | 4.64E−2 | −1.38E−2 | 6.79E−4 | 0.00 |
| 9 | −0.85 | 1.93E−2 | 8.81E−3 | −1.45E−2 | 7.36E−3 | −1.19E−3 |

Under such conditions, $d_2/fl=0.80$ was achieved, thereby satisfying the expression (1). $d_4/fl=0.76$ was achieved, thereby satisfying the expression (2). $f_2/fl=-3.01$ was achieved, thereby satisfying the expression (3). $(r_5-r_6)/(r_5+r_6)=-1.02$ was achieved, thereby satisfying the expression (4). $(r_8-r_9)/(r_8+r_9)=2.21$ was achieved, thereby satisfying the expression (5).

Figure 31:
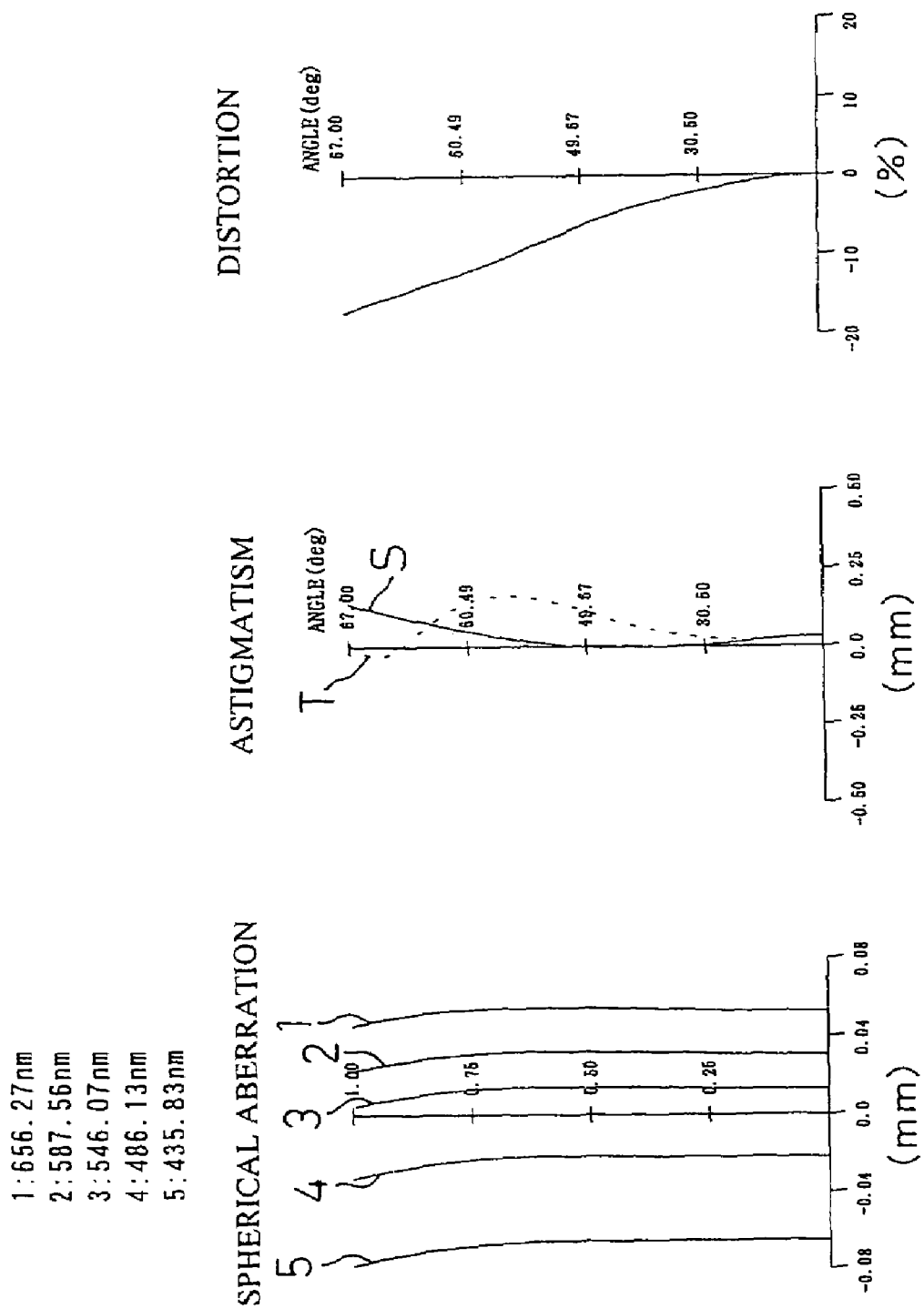
FIG. 31 shows graphs for describing the spherical aberration, astigmatism, and distortion of the imaging lens shown in FIG. 30.

FIG. 31 shows the spherical aberration, the astigmatism, and the distortion in the imaging lens 1 of the FIFTEENTH EXAMPLE.

According to the result, each of the spherical aberration, the astigmatism, and the distortion was almost satisfied. It can be seen from the result that a sufficient optical property can be obtained.

Sixteenth Example

Figure 32:
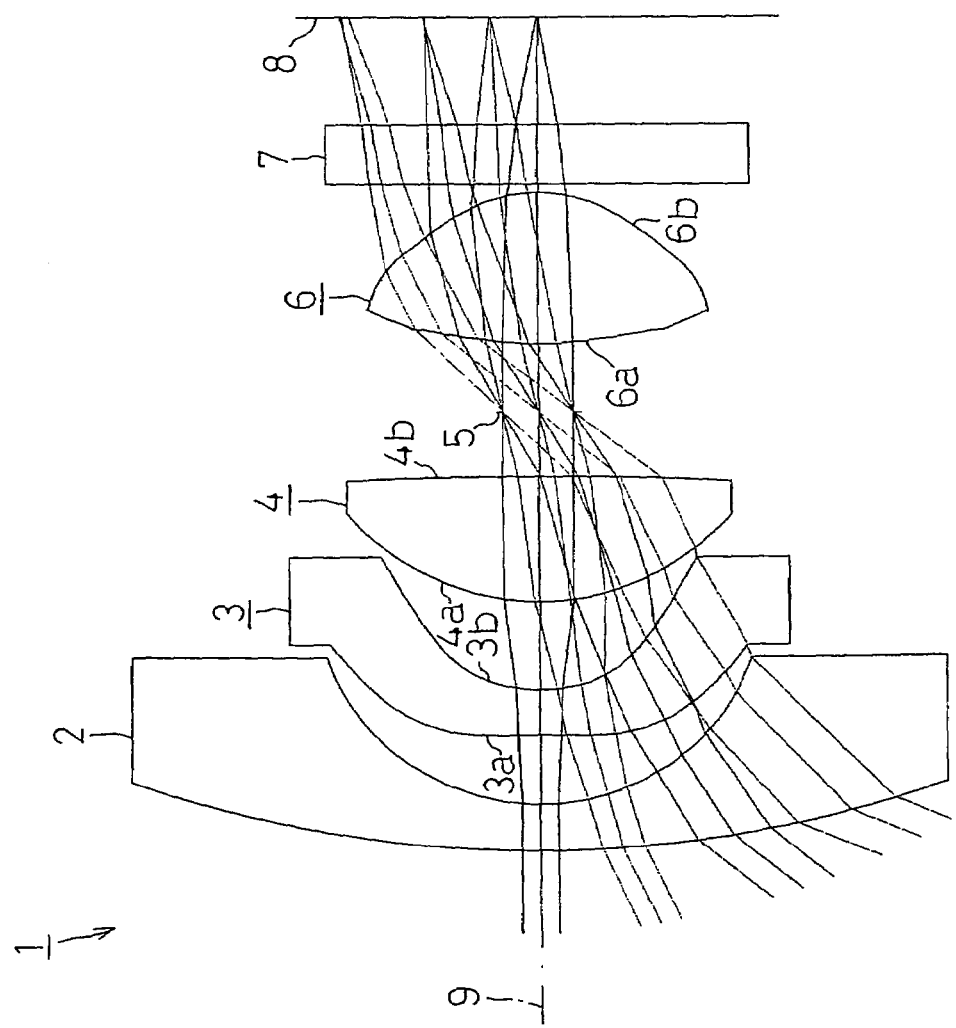
FIG. 32 is a schematic diagram for showing SIXTEENTH EXAMPLE of the imaging lens according to the present invention.

FIG. 32 shows a SIXTEENTH EXAMPLE of the present invention. In the SIXTEENTH EXAMPLE as well, the cover glass serving as the filter 7 is disposed between the second face 6b of the fourth lens 6 and the imaging surface 8.

The imaging lens 1 of the SIXTEENTH EXAMPLE was set under the following conditions:

| Lens Data | | | | |
|---|---|---|---|---|
| fl = 1.18 mm, $f_2$ = −3.26 mm, F no = 2.8, ω = 134° | | | | |
| Face Number (Object Point) | r | d | nd | νd |
| 1 (First Face of First Lens) | 13.905 | 0.550 | 1.729 | 54.67 |
| 2 (Second Face of First Lens) | 2.562 | 0.848 | | |
| 3 (First Face of Second Lens) | −12.814 | 0.550 | 1.530 | 55.50 |
| 4 (Second Face of Second Lens) | 2.018 | 1.039 | | |
| 5 (First Face of Third Lens) | 2.848 | 1.519 | 1.847 | 23.78 |
| 6 (Second Face of Third Lens) | −41.070 | 0.778 | | |
| 7 (Diaphragm) | ∞ | 0.810 | | |
| 8 (First Face of Fourth Lens) | 3.356 | 1.806 | 1.530 | 55.50 |
| 9 (Second Face of Fourth Lens) | −1.548 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 9.08E−2 | −1.89E−2 | 2.89E−3 | −2.31E−4 | 5.41E−6 |
| 4 | 0.00 | 7.58E−2 | 1.98E−2 | −1.26E−2 | 1.08E−3 | −4.13E−5 |
| 8 | 0.00 | −8.47E−2 | 4.74E−2 | −1.27E−2 | 5.98E−4 | 0.00 |
| 9 | −0.87 | 1.07E−2 | 1.17E−2 | −1.70E−2 | 7.94E−3 | −1.19E−3 |

Under such conditions, $d_2/fl=0.72$ was achieved, thereby satisfying the expression (1). $d_4/fl=0.88$ was achieved, thereby satisfying the expression (2). $f_2/fl=-2.76$ was achieved, thereby satisfying the expression (3). $(r_5-r_6)/(r_5+r_6)=-1.15$ was achieved, thereby satisfying the expression (4). $(r_8-r_9)/(r_8+r_9)=2.71$ was achieved, thereby satisfying the expression (5).

Figure 33:
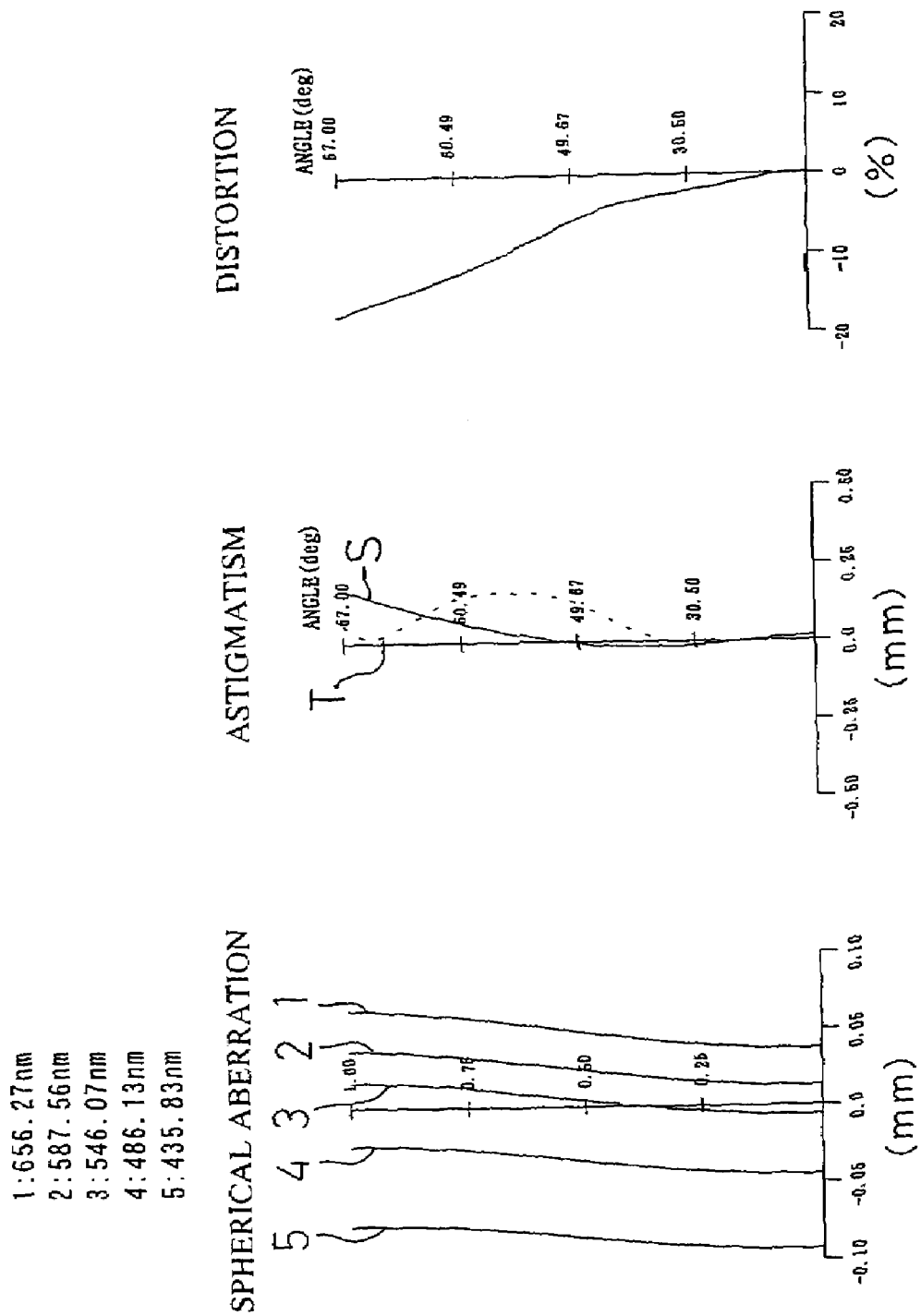
FIG. 33 shows graphs for describing the spherical aberration, astigmatism, and distortion of the imaging lens shown in FIG. 32.

FIG. 33 shows the spherical aberration, the astigmatism, and the distortion in the imaging lens 1 of the SIXTEENTH EXAMPLE.

According to the result, each of the spherical aberration, the astigmatism, and the distortion was almost satisfied. It can be seen from the result that a sufficient optical property can be obtained.

Seventeenth Example

Figure 34:
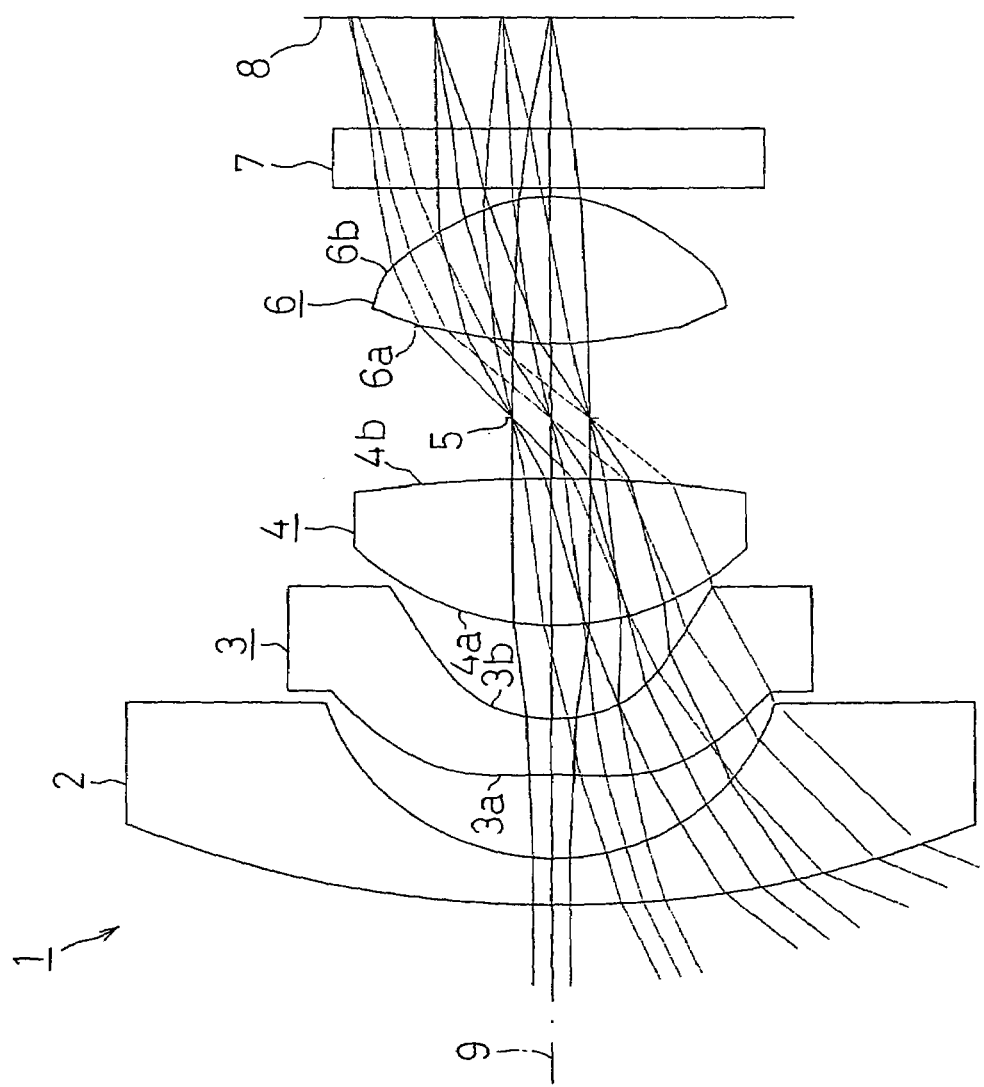
FIG. 34 is a schematic diagram for showing SEVENTEENTH EXAMPLE of the imaging lens according to the present invention.

FIG. 34 shows a SEVENTEENTH EXAMPLE of the present invention. In the SEVENTEENTH EXAMPLE as well, the cover glass serving as the filter 7 is disposed between the second face 6b of the fourth lens 6 and the imaging surface 8.

The imaging lens 1 of the SEVENTEENTH EXAMPLE was set under the following conditions:

Lens Data fl = 1.18 mm, $f_2$ = −3.09 mm, F no = 2.8, ω = 134°

| Face Number (Object Point) | r | d | nd | νd |
|---|---|---|---|---|
| 1 (First Face of First Lens) | 12.733 | 0.550 | 1.729 | 54.67 |
| 2 (Second Face of First Lens) | 2.654 | 0.992 | | |
| 3 (First Face of Second Lens) | −9.845 | 0.674 | 1.530 | 55.50 |
| 4 (Second Face of Second Lens) | 2.004 | 1.100 | | |
| 5 (First Face of Third Lens) | 3.103 | 1.742 | 1.847 | 23.78 |
| 6 (Second Face of Third Lens) | −14.966 | 0.713 | | |
| 7 (Diaphragm) | ∞ | 0.885 | | |
| 8 (First Face of Fourth Lens) | 3.145 | 1.744 | 1.530 | 55.50 |
| 9 (Second Face of Fourth Lens) | −1.778 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 9.63E−2 | −2.27E−2 | 3.75E−3 | −3.56E−4 | 1.34E−5 |
| 4 | 0.00 | 9.22E−2 | 1.71E−2 | −1.64E−2 | 2.29E−3 | −1.40E−4 |
| 8 | 0.00 | −7.56E−2 | 3.34E−2 | −5.82E−3 | −4.38E−4 | 0.00 |
| 9 | −0.85 | 4.91E−3 | 1.85E−2 | −2.05E−2 | 8.56E−3 | −1.19E−3 |

Under such conditions, $d_2/fl$=0.84 was achieved, thereby satisfying the expression (1). $d_4/fl$=0.93 was achieved, thereby satisfying the expression (2). $f_2/fl$=−2.62 was achieved, thereby satisfying the expression (3). $(r_5-r_6)/(r_5+r_6)$=−1.52 was achieved, thereby satisfying the expression (4). $(r_8-r_9)/(r_8+r_9)$=3.60 was achieved, thereby satisfying the expression (5).

Figure 35:
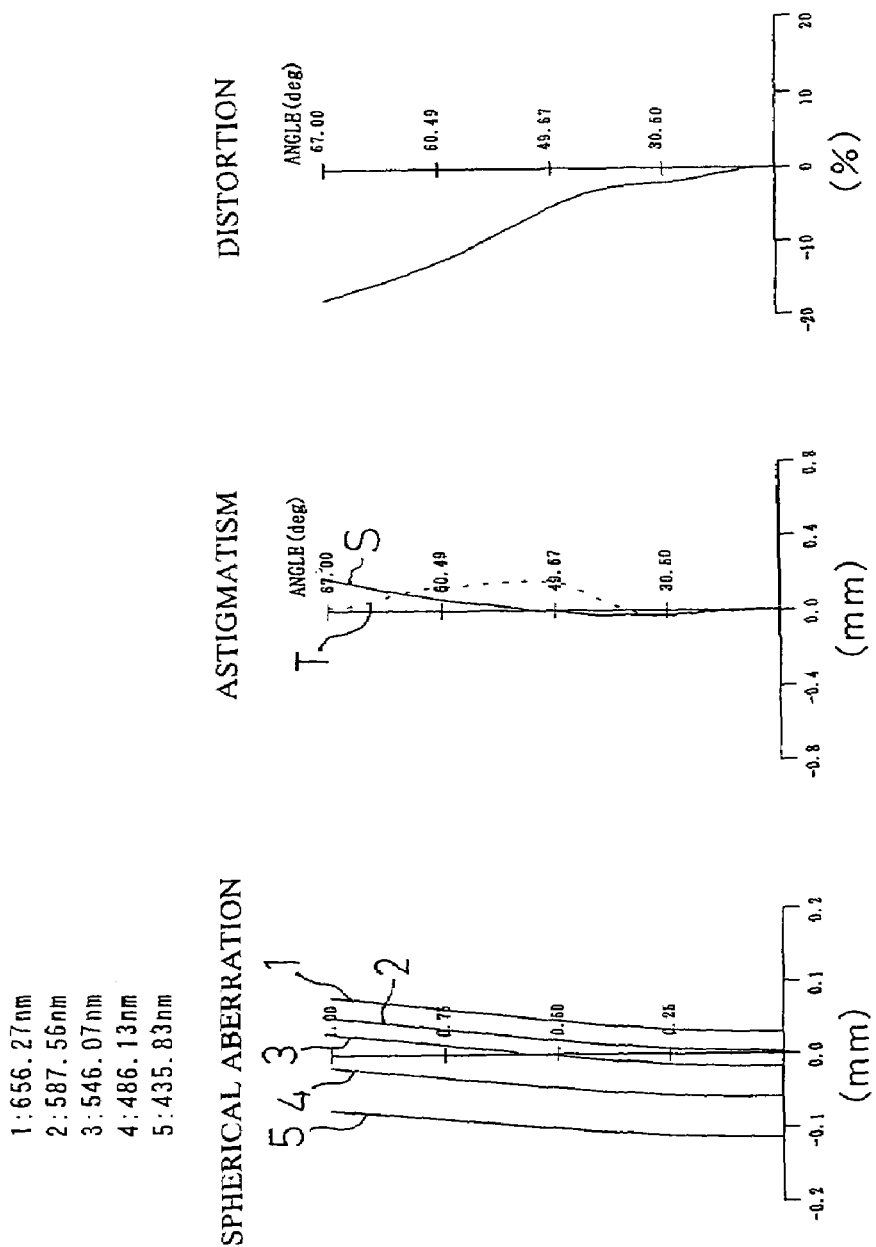
FIG. 35 shows graphs for describing the spherical aberration, astigmatism, and distortion of the imaging lens shown in FIG. 34.

FIG. 35 shows the spherical aberration, the astigmatism, and the distortion in the imaging lens 1 of the SEVENTEENTH EXAMPLE.

According to the result, each of the spherical aberration, the astigmatism, and the distortion was almost satisfied. It can be seen from the result that a sufficient optical property can be obtained.

Eighteenth Example

Figure 36:
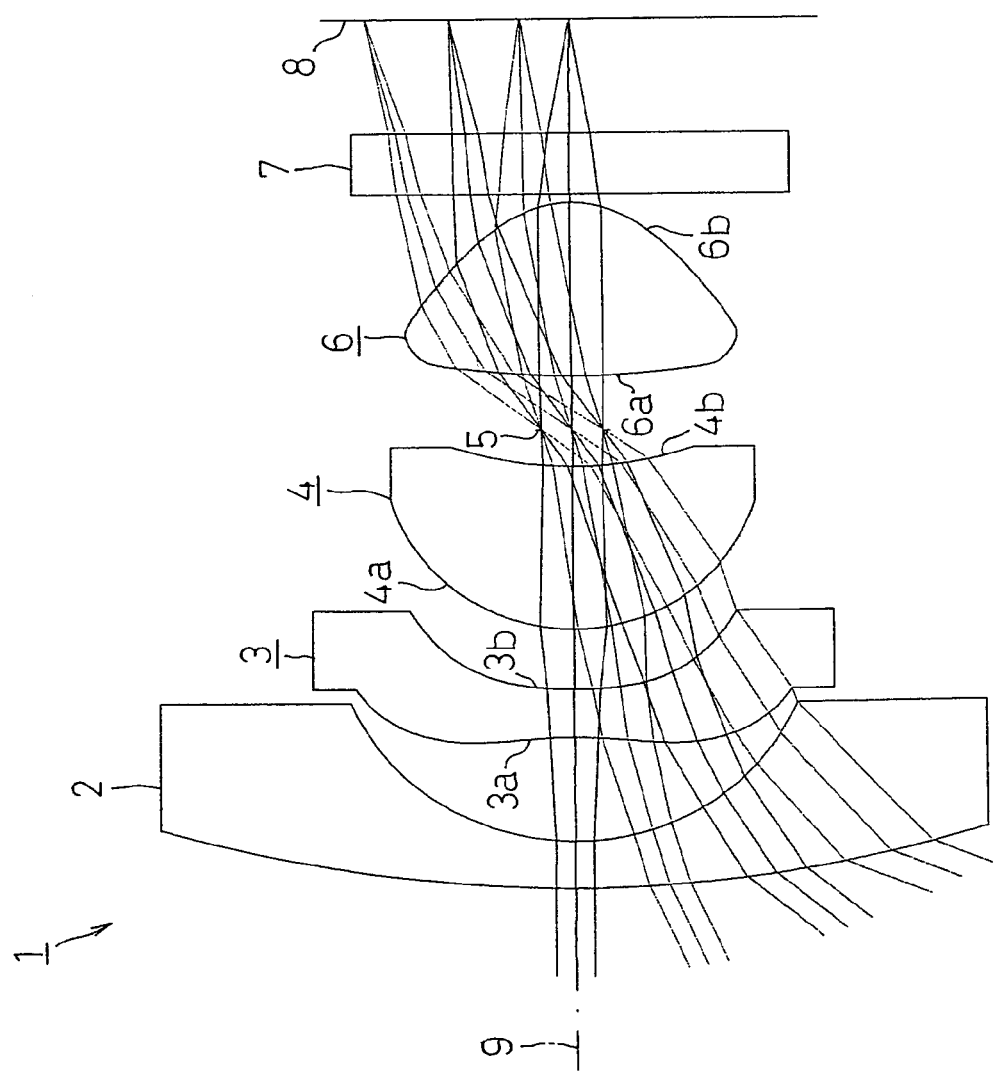
FIG. 36 is a schematic diagram for showing EIGHTEENTH EXAMPLE of the imaging lens according to the present invention.

FIG. 36 shows a EIGHTEENTH EXAMPLE of the present invention. In the EIGHTEENTH EXAMPLE as well, the cover glass serving as the filter 7 is disposed between the second face 6b of the fourth lens 6 and the imaging surface 8.

The imaging lens 1 of the EIGHTEENTH EXAMPLE was set under the following conditions:

Lens Data fl = 1.16 mm, $f_2$ = −4.19 mm, F no = 2.8, ω = 134°

| Face Number (Object Point) | r | d | nd | νd |
|---|---|---|---|---|
| 1 (First Face of First Lens) | 15.357 | 0.550 | 1.729 | 54.67 |
| 2 (Second Face of First Lens) | 2.671 | 1.213 | | |
| 3 (First Face of Second Lens) | −4.177 | 0.550 | 1.530 | 55.50 |
| 4 (Second Face of Second Lens) | 4.946 | 0.672 | | |
| 5 (First Face of Third Lens) | 2.090 | 1.874 | 1.847 | 23.78 |
| 6 (Second Face of Third Lens) | 4.202 | 0.418 | | |
| 7 (Diaphragm) | ∞ | 0.628 | | |
| 8 (First Face of Fourth Lens) | 5.659 | 1.996 | 1.530 | 55.50 |
| 9 (Second Face of Fourth Lens) | −1.060 | 0.100 | | |
| 10 (First Face of Cover Glass) | ∞ | 0.700 | 1.523 | 58.59 |
| 11 (Second Face of Cover Glass) (Image Surface) | ∞ | | | |

-continued

| Face Number | k | A | B | C | D | E |
|---|---|---|---|---|---|---|
| 3 | 0.00 | 7.40E−2 | −1.61E−2 | 3.04E−3 | −3.16E−4 | 1.68E−5 |
| 4 | 0.00 | 4.95E−2 | 7.56E−3 | −8.10E−3 | 2.93E−3 | −3.24E−4 |
| 8 | 0.00 | −6.41E−2 | 6.05E−2 | −2.98E−2 | 5.59E−3 | 0.00 |
| 9 | −1.75 | −6.01E−2 | 2.82E−2 | −1.99E−2 | 8.20E−3 | −1.19E−3 |

Under such conditions, $d_2/fl$=1.05 was achieved, thereby satisfying the expression (1). $d_4/fl$=0.58 was achieved, thereby satisfying the expression (2). $f_2/fl$=−3.61 was achieved, thereby satisfying the expression (3). $(r_5-r_6)/(r_5+r_6)$=−0.34 was achieved, thereby satisfying the expression (4). $(r_8-r_9)/(r_8+r_9)$=1.46 was achieved, thereby satisfying the expression (5).

FIG. 37 shows the spherical aberration, the astigmatism, and the distortion in the imaging lens 1 of the EIGHTEENTH EXAMPLE.

According to the result, each of the spherical aberration, the astigmatism, and the distortion was almost satisfied. It can seen from the result that a sufficient optical property can be obtained.

Nineteenth Example

Figure 38:
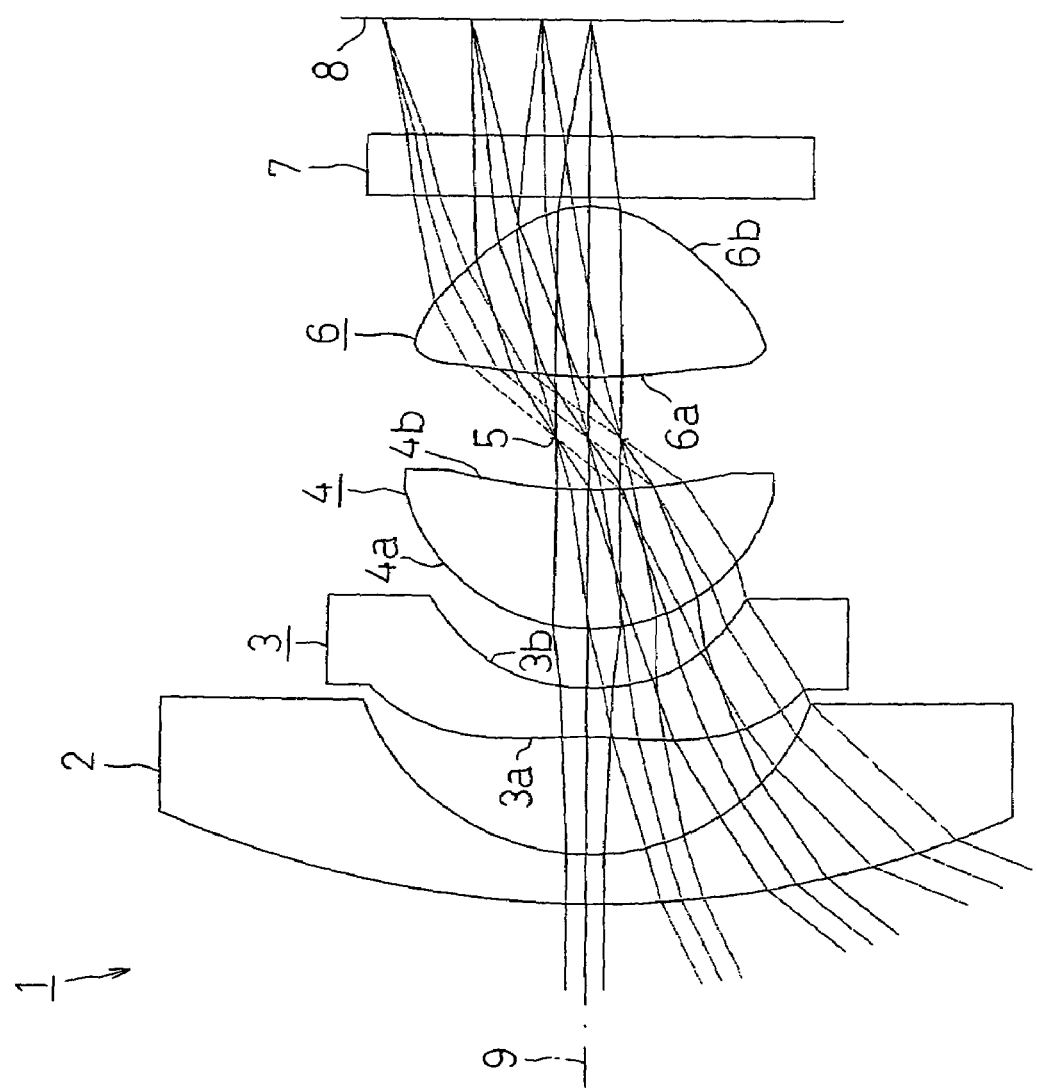
FIG. 38 is a schematic diagram for showing NINETEENTH EXAMPLE of the imaging lens according to the present invention.

FIG. 38 shows a NINETEENTH EXAMPLE of the present invention. In the NINETEENTH EXAMPLE as well, the cover glass serving as the filter 7 is disposed between the second face 6b of the fourth lens 6 and the imaging surface 8.

The imaging lens 1 of the NINETEENTH EXAMPLE was set under the following conditions:

Lens Data fl = 1.16 mm, $f_2$ = −3.56 mm, F no = 2.8, ω = 134°

| Face Number (Object Point) | r | d | nd | νd |
|---|---|---|---|---|
| 1 (First Face of First Lens) | 11.181 | 0.550 | 1.729 | 54.67 |
| 2 (Second Face of First Lens) | 2.547 | 1.334 | | |
| 3 (First Face of Second Lens) | −6.775 | 0.550 | 1.530 | 55.50 |
| 4 (Second Face of Second Lens) | 2.681 | 0.667 | | |
| 5 (First Face of Third Lens) | 2.058 | 1.585 | 1.847 | 23.78 |
| 6 (Second Face of Third Lens) | 5.791 | 0.582 | | |
| 7 (Diaphragm) | ∞ | 0.695 | | |
| 8 (First Face of Fourth Lens) | 5.216 | 1.937 | 1.530 | 55.50 |
| 9 (Second Face of Fourth Lens) | −1.130 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 6.84E−2 | −1.72E−2 | 3.34E−3 | −3.32E−4 | 1.39E−5 |
| 4 | 0.00 | 5.46E−2 | 4.51E−4 | −6.71E−3 | 3.51E−3 | −5.54E−4 |
| 8 | 0.00 | −5.95E−2 | 5.51E−2 | −2.52E−2 | 3.98E−3 | 0.00 |
| 9 | −2.19 | −7.34E−2 | 3.14E−2 | −1.74E−2 | 7.45E−3 | −1.19E−3 |

Under such conditions, $d_2/fl$=1.15 was achieved, thereby satisfying the expression (1). $d_4/fl$=0.58 was achieved, thereby satisfying the expression (2). $f_2/fl$=−3.07 was achieved, thereby satisfying the expression (3). $(r_5-r_6)/(r_5+$ $r_6$)=−0.48 was achieved, thereby satisfying the expression (4). $(r_8-r_9)/(r_8+r_9)$=1.55 was achieved, thereby satisfying the expression (5).

Figure 39:
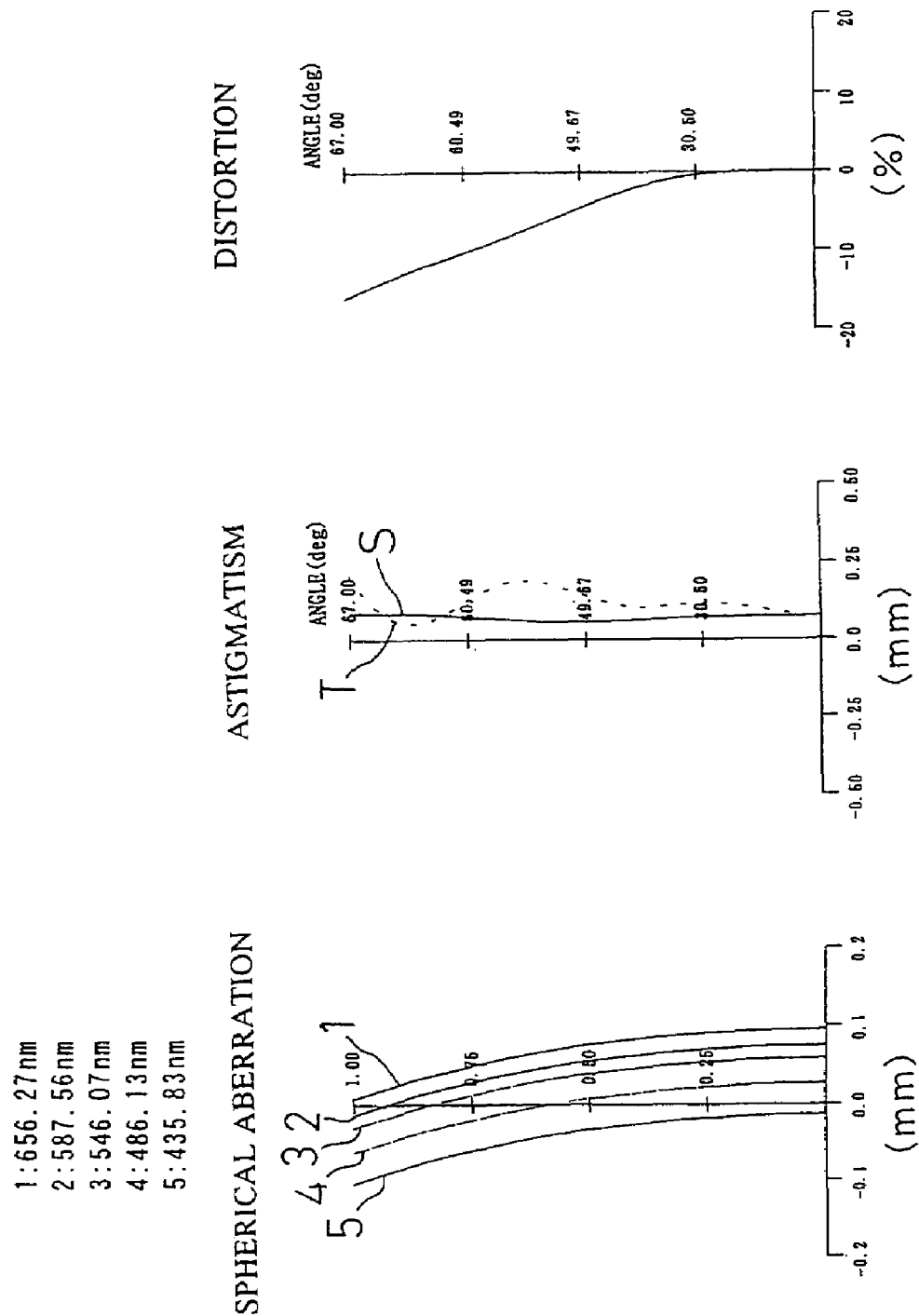
FIG. 39 shows graphs for describing the spherical aberration, astigmatism, and distortion of the imaging lens shown in FIG. 38.

FIG. 39 shows the spherical aberration, the astigmatism, and the distortion in the imaging lens 1 of the NINETEENTH EXAMPLE.

According to the result, each of the spherical aberration, the astigmatism, and the distortion was almost satisfied. It can be seen from the result that a sufficient optical property can be obtained.

Twentieth Example

Figure 40:
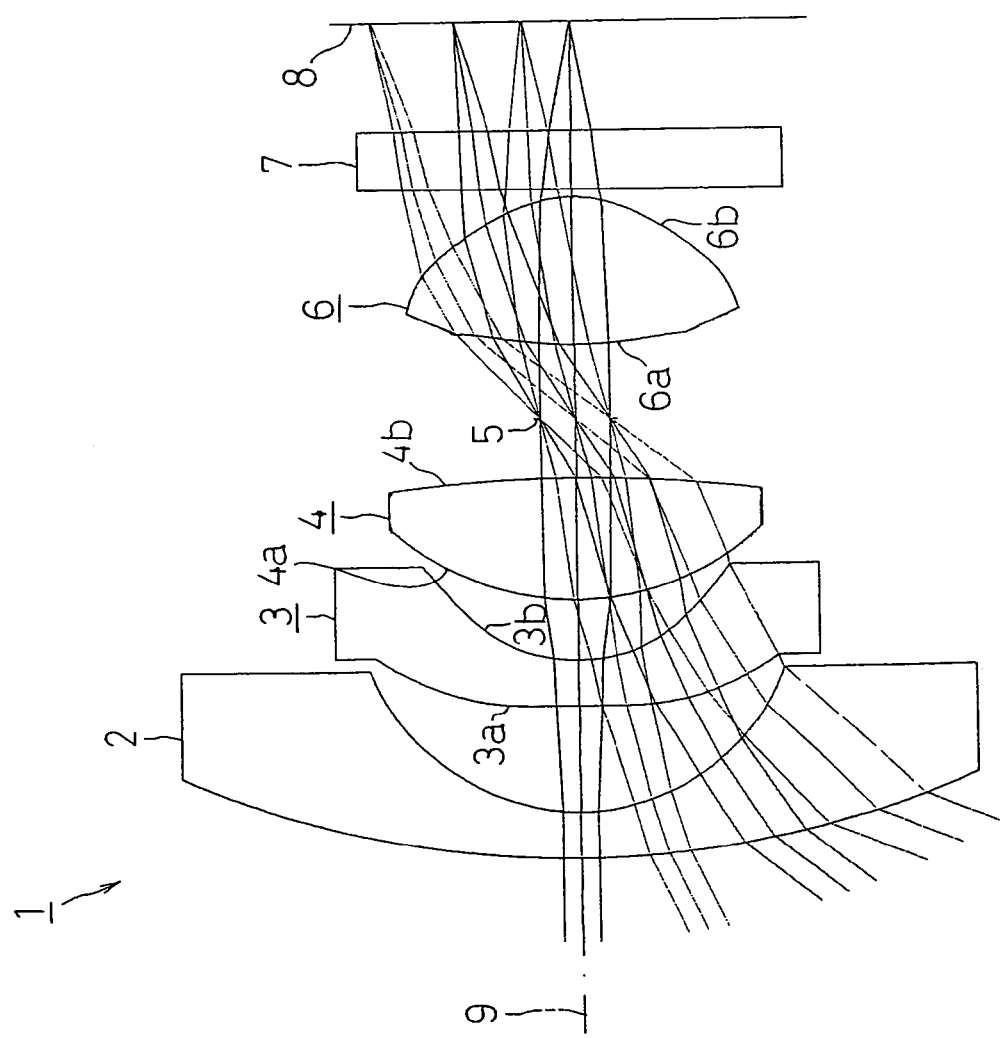
FIG. 40 is a schematic diagram for showing TWENTIETH EXAMPLE of the imaging lens according to the present invention.

FIG. 40 shows a TWENTIETH EXAMPLE of the present invention. In the TWENTIETH EXAMPLE as well, the cover glass serving as the filter 7 is disposed between the second face 6b of the fourth lens 6 and the imaging surface 8.

The imaging lens 1 of the TWENTIETH EXAMPLE was set under the following conditions:

| Lens Data | | | | |
|---|---|---|---|---|
| fl = 1.16 mm, $f_2$ = −3.39 mm, F no = 2.8, ω = 134° | | | | |
| Face Number (Object Point) | r | d | nd | vd |
| 1 (First Face of First Lens) | 11.145 | 0.550 | 1.729 | 54.67 |
| 2 (Second Face of First Lens) | 2.483 | 1.270 | | |
| 3 (First Face of Second Lens) | −24.304 | 0.550 | 1.530 | 55.50 |
| 4 (Second Face of Second Lens) | 1.950 | 0.728 | | |
| 5 (First Face of Third Lens) | 3.070 | 1.450 | 1.847 | 23.78 |
| 6 (Second Face of Third Lens) | −14.812 | 0.720 | | |
| 7 (Diaphragm) | ∞ | 0.879 | | |
| 8 (First Face of Fourth Lens) | 4.256 | 1.753 | 1.530 | 55.50 |
| 9 (Second Face of Fourth Lens) | −1.373 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 7.09E-2 | −2.09E-2 | 4.21E-3 | −4.81E-4 | 2.32E-5 |
| 4 | 0.00 | 4.28E-2 | 5.71E-3 | −1.36E-2 | 4.29E-3 | −5.93E-4 |
| 8 | 0.00 | −2.59E-2 | −5.54E-3 | 1.05E-2 | −4.44E-3 | 0.00 |
| 9 | −2.31 | −3.30E-2 | 2.86E-2 | −2.07E-2 | 7.84E-3 | −1.19E-3 |

Under such conditions, $d_2$/fl=1.10 was achieved, thereby satisfying the expression (1). $d_4$/fl=0.63 was achieved, thereby satisfying the expression (2). $f_2$/fl=−2.92 was achieved, thereby satisfying the expression (3). $(r_5-r_6)/(r_5+r_6)$=−1.52 was achieved, thereby satisfying the expression (4). $(r_8-r_9)/(r_8+r_9)$=1.95 was achieved, thereby satisfying the expression (5).

Figure 41:
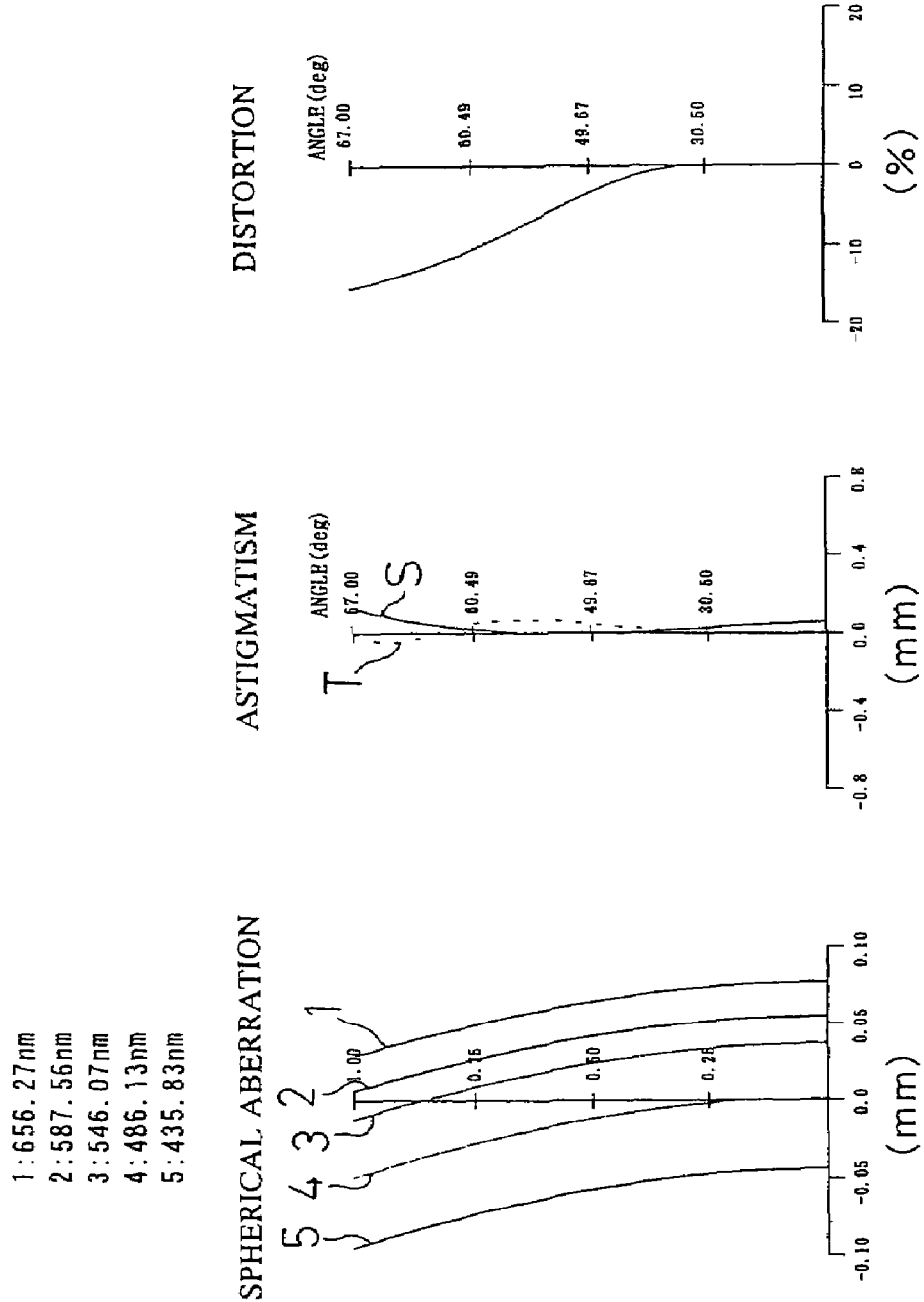
FIG. 41 shows graphs for describing the spherical aberration, astigmatism, and distortion of the imaging lens shown in FIG. 40.

FIG. 41 shows the spherical aberration, the astigmatism, and the distortion in the imaging lens 1 of the TWENTIETH EXAMPLE.

According to the result, each of the spherical aberration, the astigmatism, and the distortion was almost satisfied. It can be seen from the result that a sufficient optical property can be obtained.

Twenty-First Example

Figure 42:
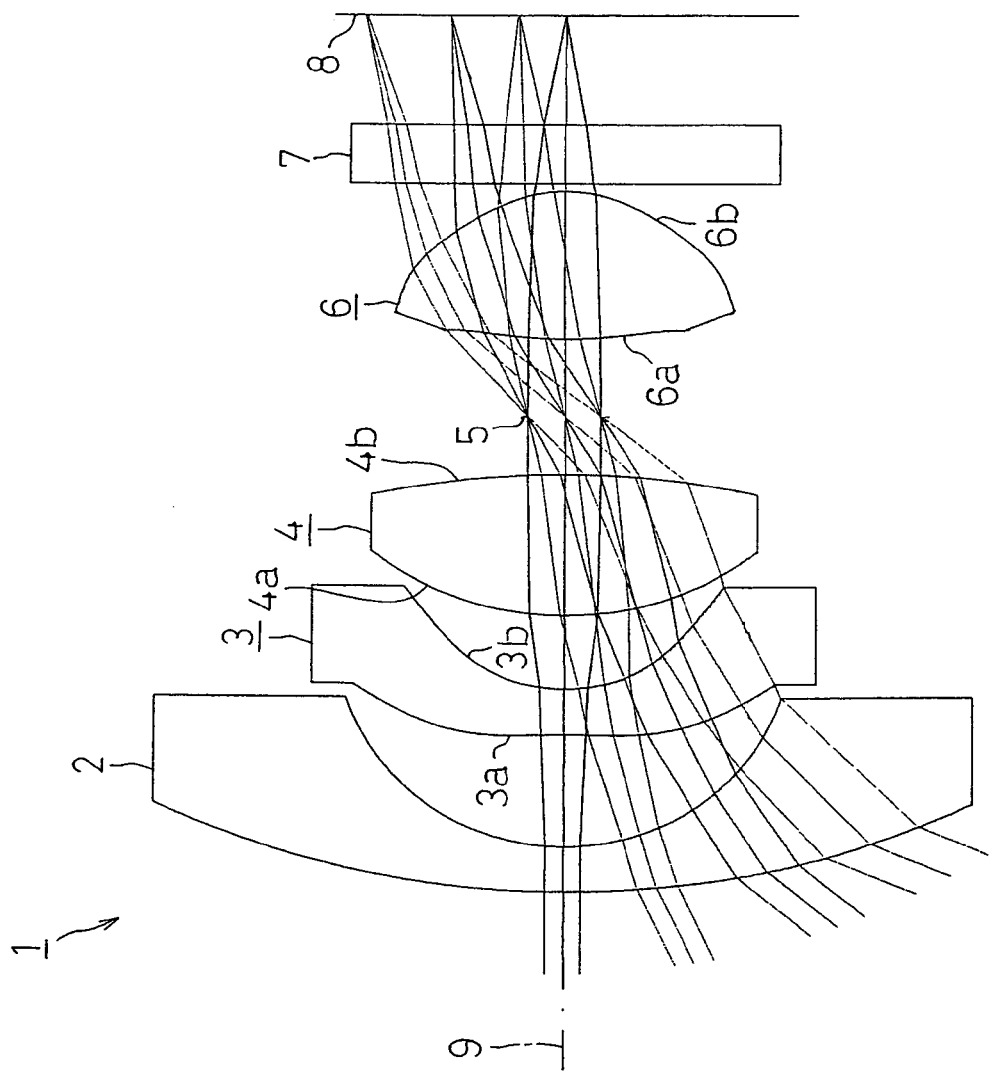
FIG. 42 is a schematic diagram for showing TWENTY-FIRST EXAMPLE of the imaging lens according to the present invention.

FIG. 42 shows a TWENTY-FIRST EXAMPLE of the present invention. In the TWENTY-FIRST EXAMPLE as well, the cover glass serving as the filter 7 is disposed between the second face 6b of the fourth lens 6 and the imaging surface 8.

The imaging lens 1 of the TWENTY-FIRST EXAMPLE was set under the following conditions:

| Lens Data | | | | |
|---|---|---|---|---|
| fl = 1.12 mm, $f_2$ = −3.27 mm, F no = 2.8, ω = 134° | | | | |
| Face Number (Object Point) | r | d | nd | vd |
| 1 (First Face of First Lens) | 10.938 | 0.550 | 1.729 | 54.67 |
| 2 (Second Face of First Lens) | 2.616 | 1.335 | | |
| 3 (First Face of Second Lens) | −10.566 | 0.550 | 1.530 | 55.50 |
| 4 (Second Face of Second Lens) | 2.112 | 0.883 | | |
| 5 (First Face of Third Lens) | 3.506 | 1.699 | 1.847 | 23.78 |
| 6 (Second Face of Third Lens) | −10.079 | 0.698 | | |
| 7 (Diaphragm) | ∞ | 0.935 | | |
| 8 (First Face of Fourth Lens) | 4.481 | 1.750 | 1.530 | 55.50 |
| 9 (Second Face of Fourth Lens) | −1.420 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 7.97E-2 | −2.08E-2 | 3.67E-3 | −3.92E-4 | 1.79E-5 |
| 4 | 0.00 | 5.31E-2 | 1.33E-2 | −1.42E-2 | 2.96E-3 | −2.55E-4 |
| 8 | 0.00 | −2.34E-2 | −1.38E-2 | 1.45E-2 | −5.25E-3 | 0.00 |
| 9 | −1.08 | 1.74E-2 | 2.06E-2 | −2.22E-2 | 8.34E-3 | −1.19E-3 |

Under such conditions, $d_2$/fl=1.19 was achieved, thereby satisfying the expression (1). $d_4$/fl=0.79 was achieved, thereby satisfying the expression (2). $f_2$/fl=−2.92 was achieved, thereby satisfying the expression (3). $(r_5-r_6)/(r_5+r_6)$=−2.07 was achieved, thereby satisfying the expression (4). $(r_8-r_9)/(r_8+r_9)$=1.93 was achieved, thereby satisfying the expression (5).

Figure 43:
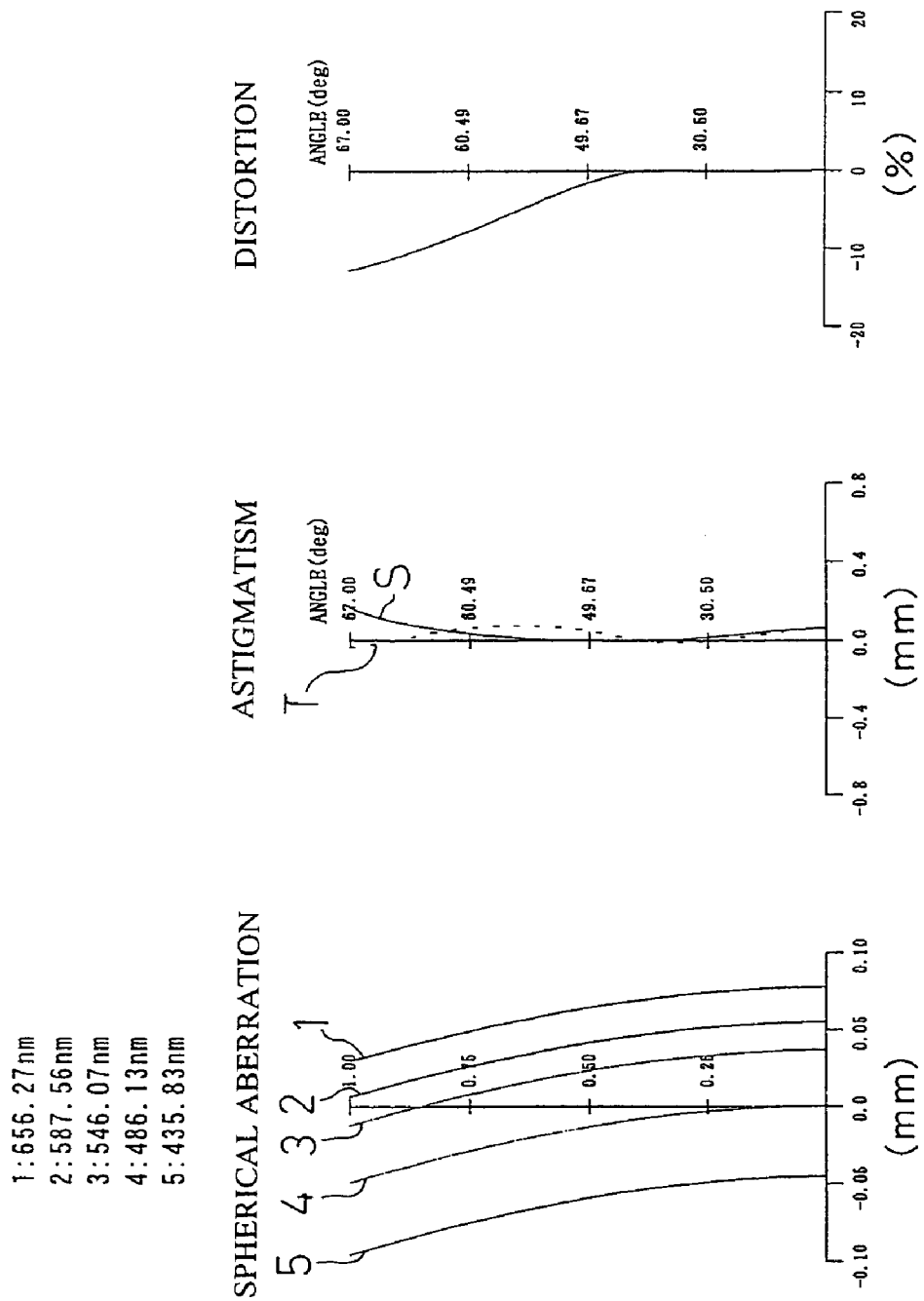
FIG. 43 shows graphs for describing the spherical aberration, astigmatism, and distortion of the imaging lens shown in FIG. 42.

FIG. 43 shows the spherical aberration, the astigmatism, and the distortion in the imaging lens 1 of the TWENTY-FIRST EXAMPLE.

According to the result, each of the spherical aberration, the astigmatism, and the distortion was almost satisfied. It can be seen from the result that a sufficient optical property can be obtained.

Twenty-Second Example

Figure 44:
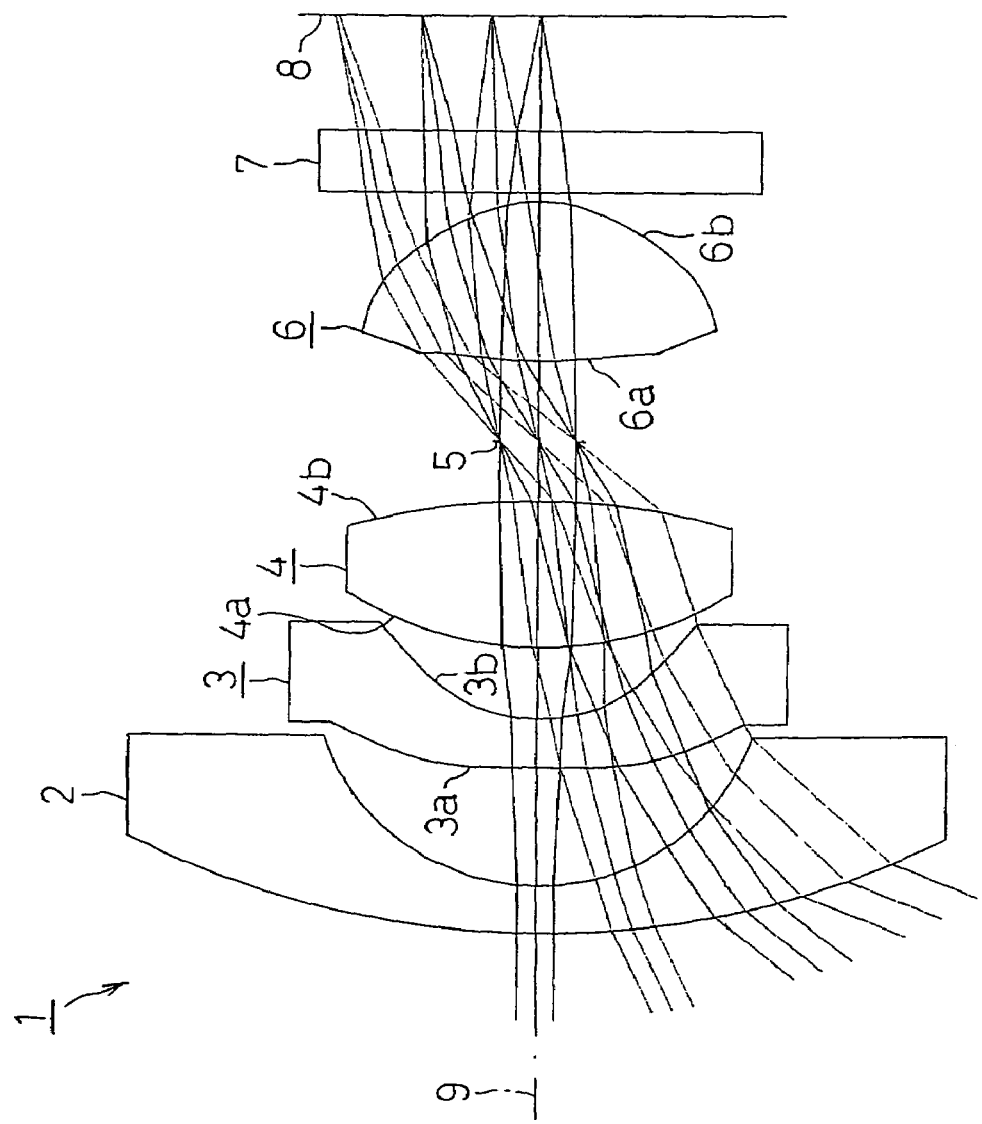
FIG. 44 is a schematic diagram for showing TWENTY-SECOND EXAMPLE of the imaging lens according to the present invention.

FIG. 44 shows a TWENTY-SECOND EXAMPLE of the present invention. In the TWENTY-SECOND EXAMPLE as well, the cover glass serving as the filter 7 is disposed between the second face 6b of the fourth lens 6 and the imaging surface 8.

The imaging lens 1 of the TWENTY-SECOND EXAMPLE was set under the following conditions:

| Lens Data | | | | |
|---|---|---|---|---|
| fl = 1.14 mm, $f_2$ = −3.34 mm, F no = 2.8, ω = 134° | | | | |
| Face Number (Object Point) | r | d | nd | vd |
| 1 (First Face of First Lens) | 9.737 | 0.550 | 1.729 | 54.67 |
| 2 (Second Face of First Lens) | 2.465 | 1.350 | | |
| 3 (First Face of Second Lens) | −22.354 | 0.550 | 1.530 | 55.50 |
| 4 (Second Face of Second Lens) | 1.934 | 0.826 | | |
| 5 (First Face of Third Lens) | 3.811 | 1.678 | 1.847 | 23.78 |
| 6 (Second Face of Third Lens) | −7.454 | 0.680 | | |

-continued

| | | | | | |
|---|---|---|---|---|---|
| 7 (Diaphragm) | ∞ | 0.930 | | | |
| 8 (First Face of Fourth Lens) | 4.736 | 1.837 | 1.530 | 55.50 | |
| 9 (Second Face of Fourth Lens) | −1.427 | 0.100 | | | |
| 10 (First Face of Cover Glass) | ∞ | 0.700 | 1.523 | 58.59 | |
| 11 (Second Face of Cover Glass) (Image Surface) | ∞ | | | | |

| Face Number | k | A | B | C | D | E |
|---|---|---|---|---|---|---|
| 3 | 0.00 | 7.03E−2 | −1.99E−2 | 3.78E−3 | −4.34E−4 | 2.04E−5 |
| 4 | 0.00 | 4.09E−2 | 1.04E−2 | −1.40E−2 | 3.36E−3 | −4.18E−4 |
| 8 | 0.00 | −1.78E−2 | −2.48E−2 | 2.27E−2 | −8.22E−3 | 0.00 |
| 9 | −1.10 | 1.69E−2 | 2.19E−2 | −2.30E−2 | 8.46E−3 | −1.19E−3 |

Under such conditions, $d_2/fl=1.19$ was achieved, thereby satisfying the expression (1). $d_4/fl=0.73$ was achieved, thereby satisfying the expression (2). $f_2/fl=-2.93$ was achieved, thereby satisfying the expression (3). $(r_5-r_6)/(r_5+r_6)=-3.09$ was achieved, thereby satisfying the expression (4). $(r_8-r_9)/(r_8+r_9)=1.86$ was achieved, thereby satisfying the expression (5).

Figure 45:
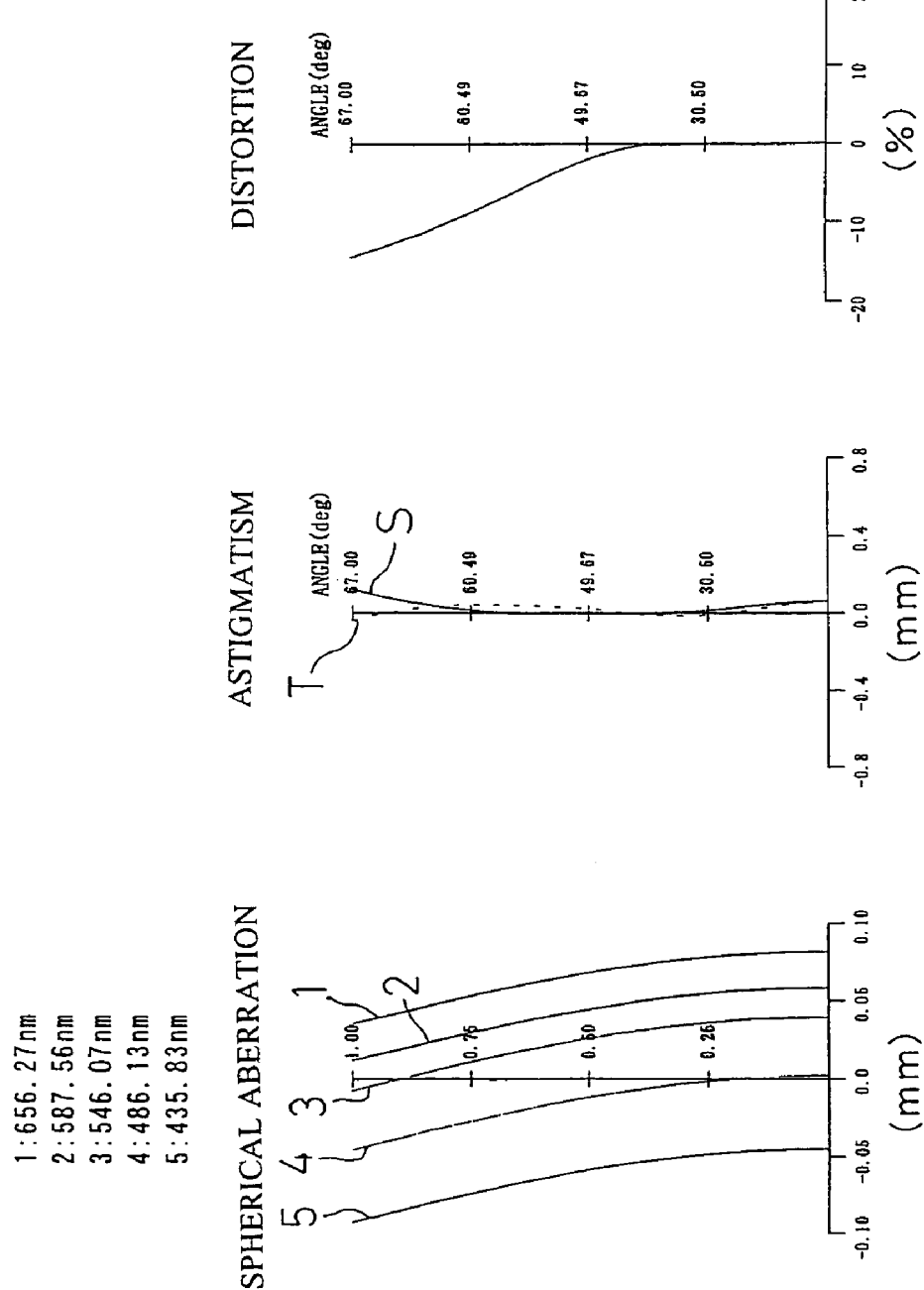
FIG. 45 shows graphs for describing the spherical aberration, astigmatism, and distortion of the imaging lens shown in FIG. 44.

FIG. 45 shows the spherical aberration, the astigmatism, and the distortion in the imaging lens 1 of the TWENTY-SECOND EXAMPLE.

According to the result, each of the spherical aberration, the astigmatism, and the distortion was almost satisfied. It can be seen from the result that a sufficient optical property can be obtained.

Twenty-Third Example

Figure 46:
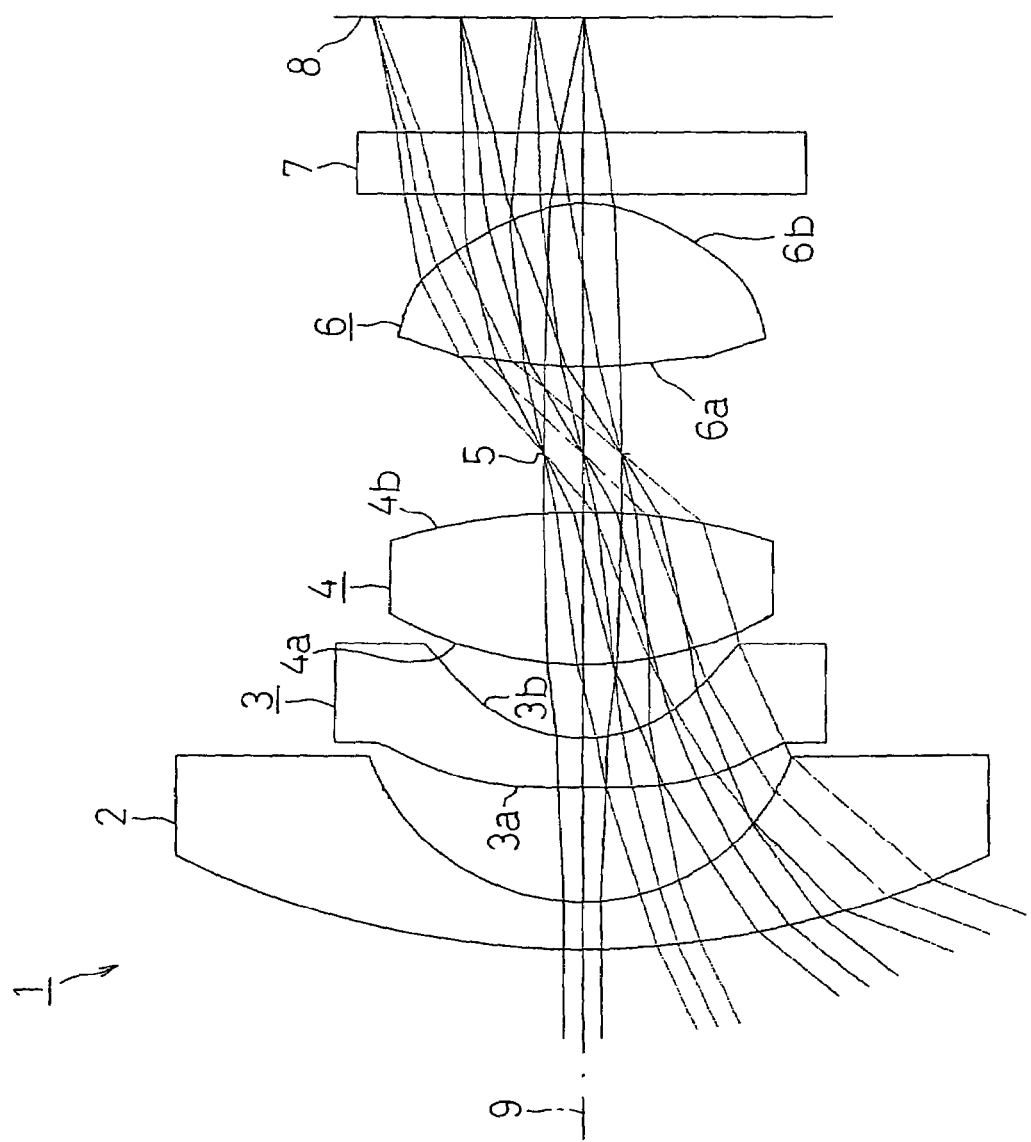
FIG. 46 is a schematic diagram for showing TWENTY-THIRD EXAMPLE of the imaging lens according to the present invention.

FIG. 46 shows a TWENTY-THIRD EXAMPLE of the present invention. In the TWENTY-THIRD EXAMPLE as well, the cover glass serving as the filter 7 is disposed between the second face 6b of the fourth lens 6 and the imaging surface 8.

The imaging lens 1 of the TWENTY-THIRD EXAMPLE was set under the following conditions:

Lens Data fl = 1.14 mm, $f_2$ = −3.39 mm, F no = 2.8, ω = 134°

| Face Number (Object Point) | r | d | nd | vd |
|---|---|---|---|---|
| 1 (First Face of First Lens) | 9.599 | 0.550 | 1.729 | 54.67 |
| 2 (Second Face of First Lens) | 2.384 | 1.299 | | |
| 3 (First Face of Second Lens) | −41.641 | 0.550 | 1.530 | 55.50 |
| 4 (Second Face of Second Lens) | 1.886 | 0.820 | | |
| 5 (First Face of Third Lens) | 4.015 | 1.723 | 1.847 | 23.78 |
| 6 (Second Face of Third Lens) | −6.580 | 0.655 | | |
| 7 (Diaphragm) | ∞ | 0.976 | | |
| 8 (First Face of Fourth Lens) | 4.605 | 1.828 | 1.530 | 55.50 |
| 9 (Second Face of Fourth Lens) | −1.468 | 0.100 | | |
| 10 (First Face of Cover Glass) | ∞ | 0.700 | 1.523 | 58.59 |
| 11 (Second Face of Cover Glass) (Image Surface) | ∞ | | | |

| Face Number | k | A | B | C | D | E |
|---|---|---|---|---|---|---|
| 3 | 0.00 | 7.13E−2 | −2.06E−2 | 4.01E−3 | −4.77E−4 | 2.25E−5 |
| 4 | 0.00 | 4.23E−2 | 1.01E−2 | −1.53E−2 | 3.72E−3 | −4.88E−4 |
| 8 | 0.00 | −1.50E−2 | −2.39E−2 | 2.14E−2 | −7.14E−3 | 0.00 |
| 9 | −1.11 | 1.77E−2 | 2.26E−2 | −2.33E−2 | 8.61E−3 | −1.19E−3 |

Under such conditions, $d_2/fl=1.14$ was achieved, thereby satisfying the expression (1). $d_4/fl=0.72$ was achieved, thereby satisfying the expression (2). $f_2/fl=-2.97$ was achieved, thereby satisfying the expression (3). $(r_5-r_6)/(r_5+r_6)=-4.13$ was achieved, thereby satisfying the expression (4). $(r_8-r_9)/(r_8+r_9)=1.94$ was achieved, thereby satisfying the expression (5).

FIG. 47 shows the spherical aberration, the astigmatism, and the distortion in the imaging lens 1 of the TWENTY-THIRD EXAMPLE.

According to the result, each of the spherical aberration, the astigmatism, and the distortion was almost satisfied. It can be seen from the result that a sufficient optical property can be obtained.

The present invention is not limited to the above-described embodiments and EXAMPLES, and various modifications are possible as required.

What is claimed is:

1. An imaging lens, comprising:
   in order from an object side towards an image surface side, a first lens which is a meniscus lens having a negative power whose convex surface faces the object side, a second lens which is a lens having a negative power whose concave surface faces the image surface side, a third lens which is a lens having a positive power whose convex surface faces the object side, a diaphragm, and a fourth lens which is a lens having a positive power whose convex surface faces the image surface side, wherein conditions expressed by each of following expressions (1) to (4) are to be satisfied:

$$0 \leq d_2/fl \leq 2.0 \quad (1)$$

$$0 \leq d_4/fl \leq 2.0 \quad (2)$$

$$-4.5 \leq f_2/fl \leq -1.5 \quad (3)$$

$$-4.5 \leq (r_5-r_6)/(r_5+r_6) \leq -0.2 \quad (4)$$

where,
   fl: focal distance of the entire lens system
   $f_2$: focal distance of the second lens
   $d_2$: space between the first lens and the second lens on an optical axis
   $d_4$: space between the second lens and the third lens on the optical axis
   $r_5$: center radius curvature of the object side face of the third lens
   $r_6$: center radius curvature of the imaging surface side face of the third lens.

2. The imaging lens according to claim 1, wherein:
   the object side face of the fourth lens is convex, and the fourth lens satisfies the conditions expressed by the following expression (5):

$$0.8 \leq (r_8-r_9)/(r_8+r_9) \leq 4.0 \quad (5)$$

where,
- $r_8$: center radius curvature of the object side face of the fourth lens
- $r_9$: center radius curvature of the imaging surface side face of the fourth lens.

3. The imaging lens according to claim 2, wherein the object side face of the fourth lens has an aspherical shape in which the curvature radius increases from the center towards the periphery.

4. The imaging lens according to claim 3, wherein the object side face of the second lens has an aspherical shape that curves toward the image surface side, from the center toward the periphery.

* * * * *